(12) United States Patent
Bando et al.

(10) Patent No.: US 7,817,153 B2
(45) Date of Patent: Oct. 19, 2010

(54) GRAPHIC RENDERING APPARATUS WHICH PARALLEL-PROCESSES PIXELS AT A TIME

(75) Inventors: Yosuke Bando, Fuchu (JP); Takahiro Saito, Yokohama (JP); Kenichi Mori, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 545 days.

(21) Appl. No.: 11/483,276

(22) Filed: Jul. 7, 2006

(65) Prior Publication Data

US 2006/0250399 A1 Nov. 9, 2006

Related U.S. Application Data

(63) Continuation of application No. PCT/JP2004/003092, filed on Mar. 10, 2004.

(51) Int. Cl.
*G06F 15/00* (2006.01)
*G06T 15/30* (2006.01)

(52) U.S. Cl. ...................... 345/501; 345/423
(58) Field of Classification Search ............... 345/501, 345/423
See application file for complete search history.

(56) References Cited

U.S. PATENT DOCUMENTS

| 5,727,190 | A | 3/1998 | Derby et al. | |
|---|---|---|---|---|
| 5,767,858 | A | 6/1998 | Kawase et al. | |
| 5,841,444 | A | 11/1998 | Mun et al. | |
| 6,476,816 | B1 | 11/2002 | Deming et al. | |
| 6,535,218 | B1 | 3/2003 | Schlapp | |
| 6,809,422 | B2* | 10/2004 | Saito et al. | 257/778 |
| 7,180,518 | B2* | 2/2007 | Saito et al. | 345/505 |
| 2003/0052886 | A1* | 3/2003 | Naegle | 345/501 |
| 2003/0058247 | A1* | 3/2003 | Naegle | 345/501 |
| 2003/0169259 | A1* | 9/2003 | Lavelle et al. | 345/501 |
| 2004/0178507 | A1* | 9/2004 | Saito et al. | 257/778 |
| 2004/0212619 | A1* | 10/2004 | Saito et al. | 345/441 |
| 2005/0179695 | A1* | 8/2005 | Saito et al. | 345/582 |
| 2006/0250399 | A1* | 11/2006 | Bando et al. | 345/441 |

FOREIGN PATENT DOCUMENTS

| JP | 2901945 | 3/1999 |
|---|---|---|
| JP | 2004-054647 | 2/2004 |
| TW | 376669 | 12/1999 |
| TW | 449730 | 8/2001 |
| WO | WO 2005/088548 A1 | 9/2005 |

OTHER PUBLICATIONS

Office Action and Translation issued in counterpart Taiwan Application No. 093106309, Aug. 1, 2007.
Fuchs, et al., "Pixel-Planes 5: A Heterogenrous Multiprocessor Graphics System Using Processor-Enhanced Memories" Computer Graphics, 23(3), pp. 79-88, Jul. 1989.

(Continued)

*Primary Examiner*—Chante Harrison
(74) *Attorney, Agent, or Firm*—Sprinkle IP Law Group

(57) ABSTRACT

A rendering apparatus includes a rasterizer, pixel processing units and memories. The rasterizer generates pixels corresponding to graphics. The pixel processing units execute rendering operations for the pixels generated by the rasterizer. The pixels rendered by the same pixel processing unit are positioned substantially equidistantly and isotropically within a rendering area. The memories are provided in association with the respective pixel processing units and store data of the pixels rendered by the associated pixel processing units.

22 Claims, 35 Drawing Sheets

OTHER PUBLICATIONS

Fuchs, et al., "Fast Spheres, Shadows, Textures, Transparencies and Image Enchancements in Pixel-Planes," Computer Graphics, 19(3), 111-120, Jul. 1985.

International Search Report for PCT/JP2004/003092, May 12, 2004.

* cited by examiner

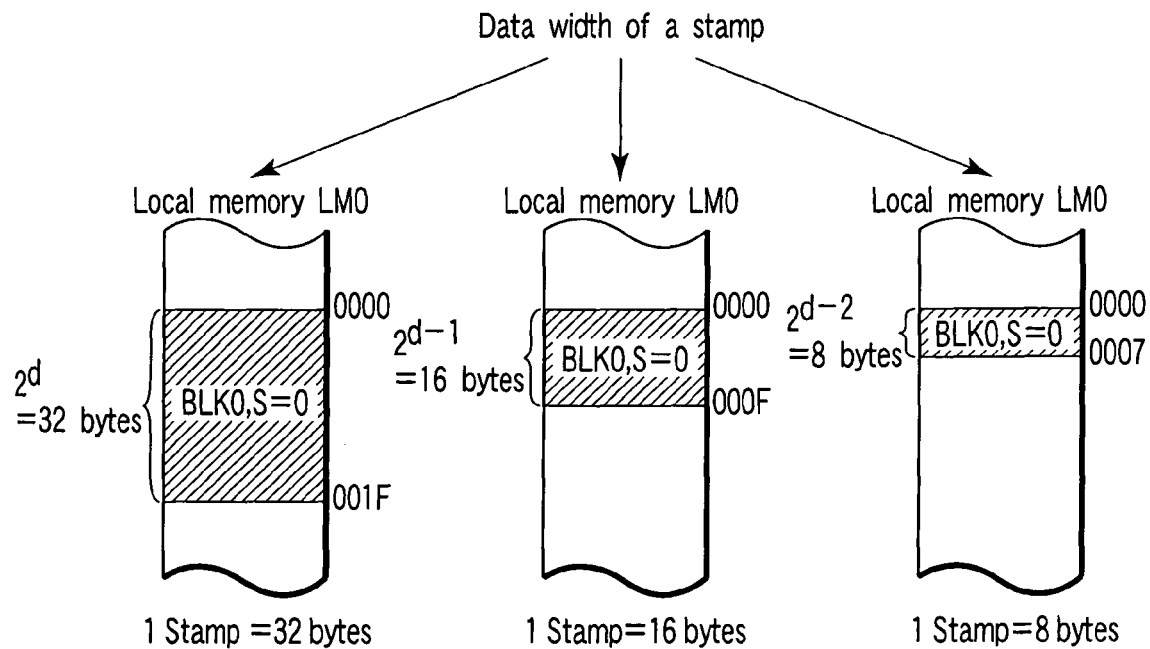
F I G. 23
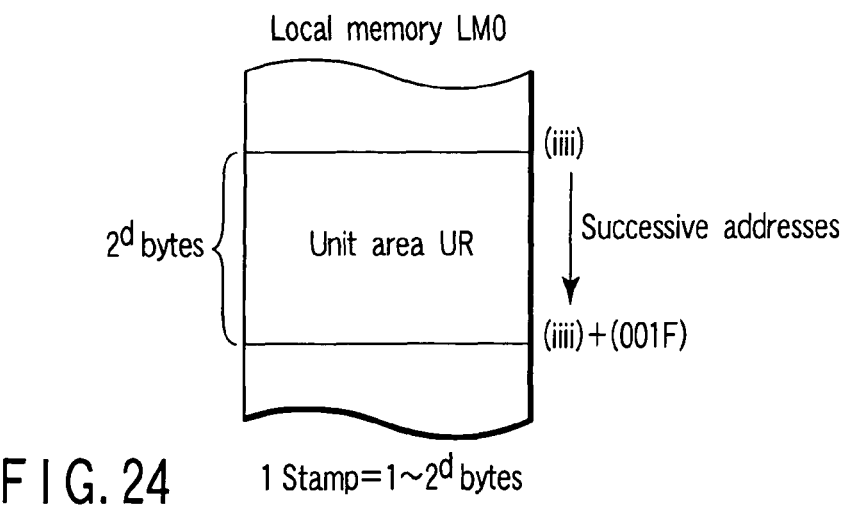
F I G. 24

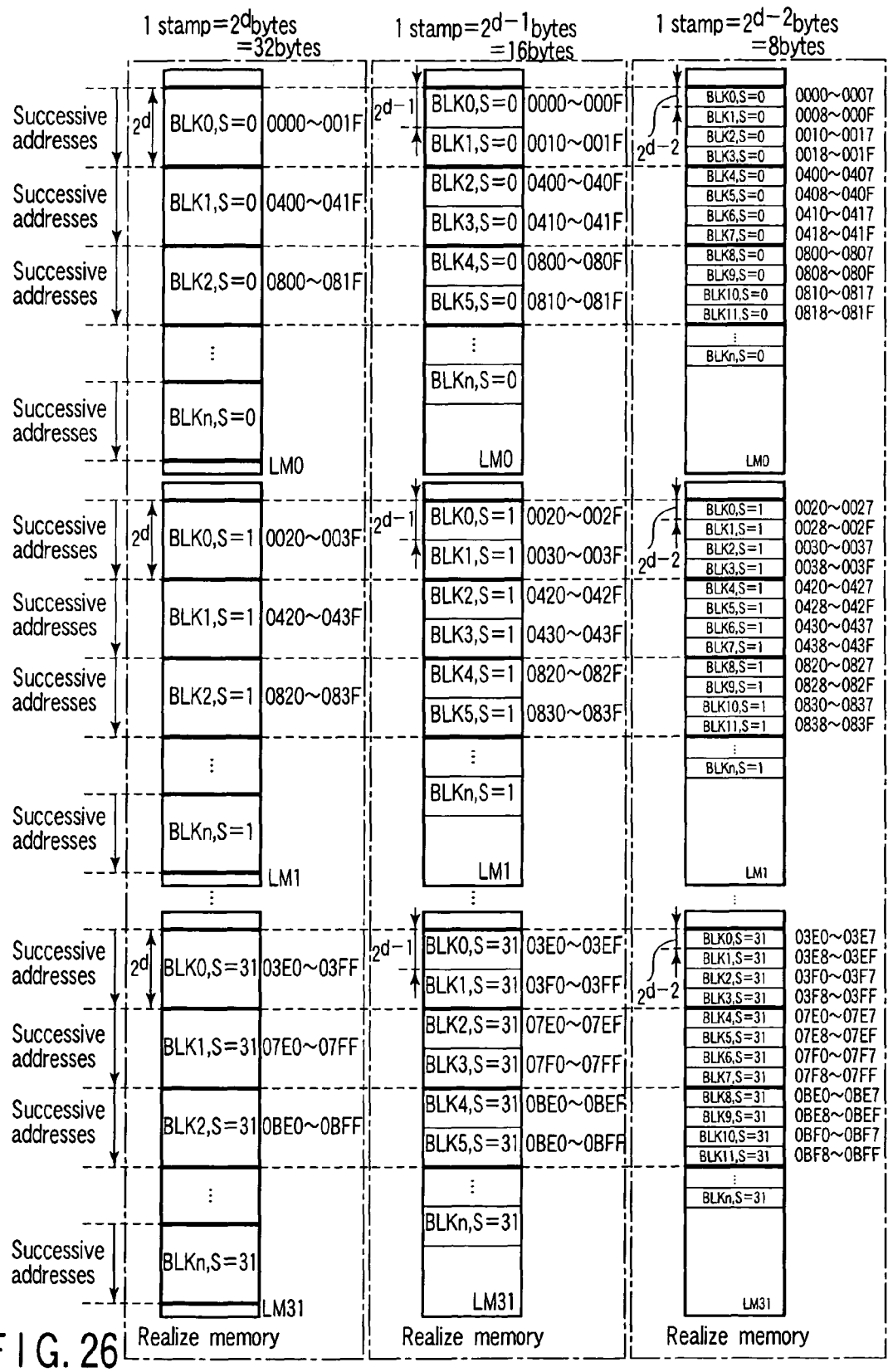
F I G. 26

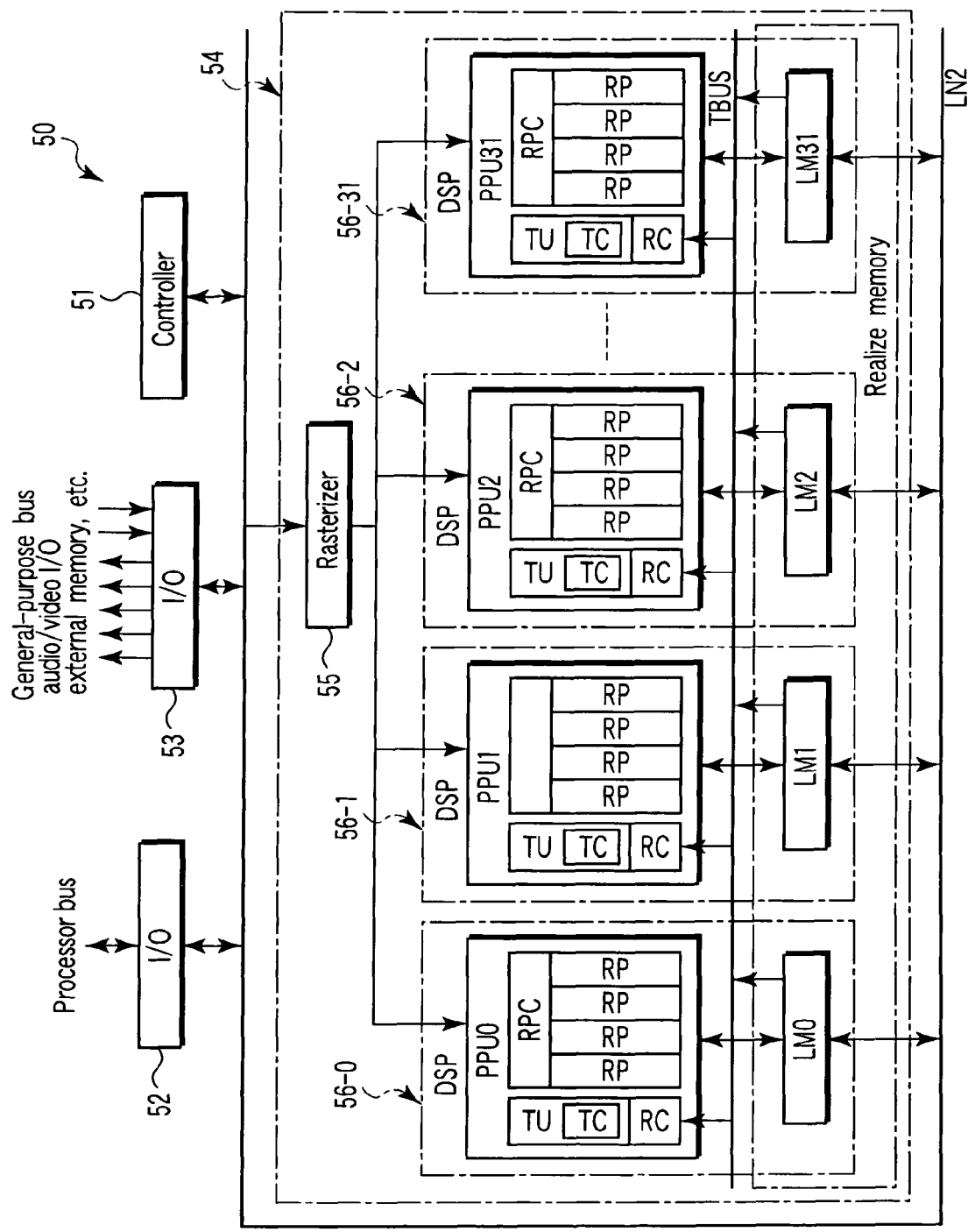
F I G. 27

Frame buffer
Texture

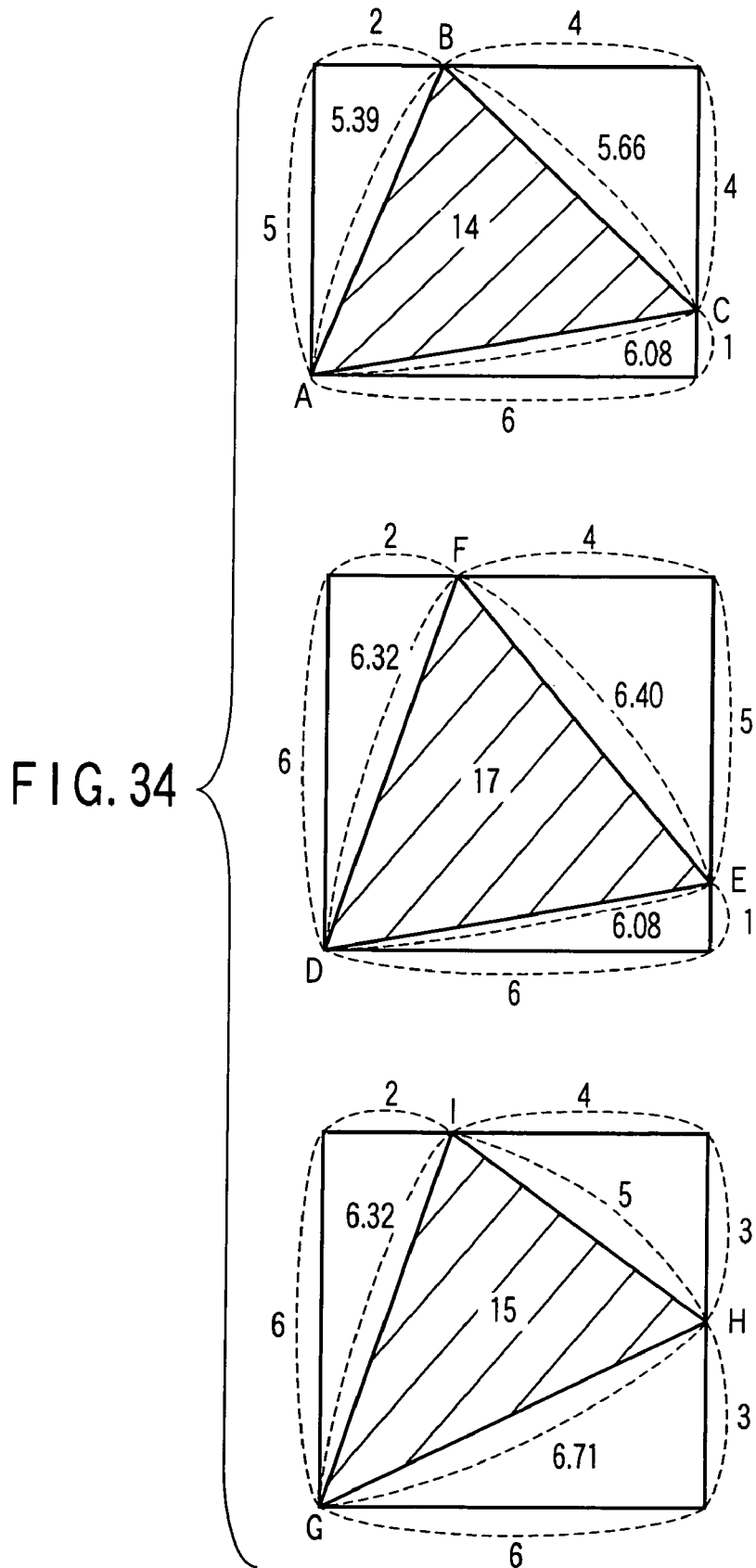
F I G. 34

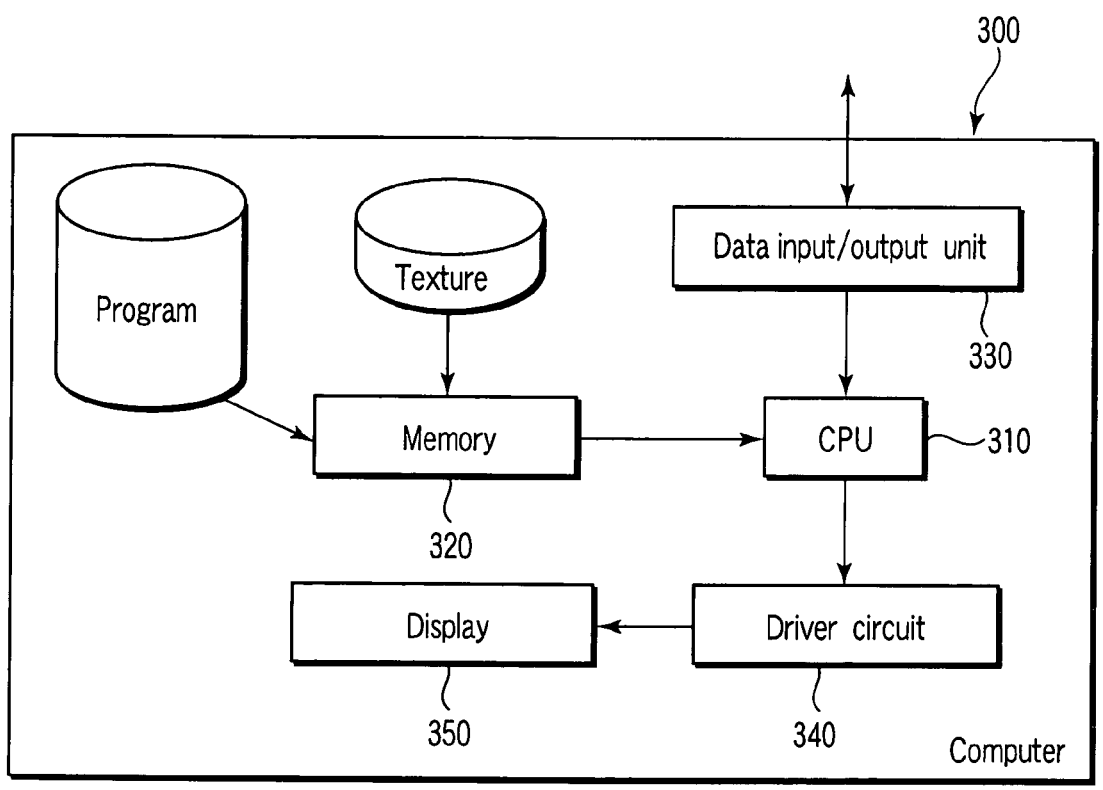
F I G. 47

US 7,817,153 B2

GRAPHIC RENDERING APPARATUS WHICH PARALLEL-PROCESSES PIXELS AT A TIME

CROSS-REFERENCE TO RELATED APPLICATIONS

This is a Continuation Application of PCT Application No. PCT/JP2004/003092, filed Mar. 10, 2004, which was published under PCT Article 21(2) in Japanese.

BACKGROUND OF THE INVENTION

1. Field of the Invention

The present invention relates to a rendering apparatus, a rendering method and a rendering program, and, for example, to a rendering apparatus that parallel-processes a plurality of pixels at a time.

2. Description of the Related Art

In recent years, with the increase in operation speed of CPUs (Central Processing Unit), there has been an increasing demand for higher operation speed of image rendering apparatuses.

A rendering apparatus includes a rasterizer that decomposes an input graphic into pixels, a pixel processing unit that subjects the pixels to rendering operations, and a memory for reading/writing rendering results. In recent years, along with the development in CG (Computer Graphics) technology, complex pixel processing techniques have widely been used. Consequently, a load on the pixel processing unit becomes large. In order to cope with this, the pixel processing unit is configured to execute parallel processing. As the degree of parallel processing in the pixel processing unit increases, data transfer with a memory becomes a bottleneck due to the increase in processing speed. Thus, in order to increase the operation speed without making the data transfer bus complex, and to enhance the processing efficiency, Japanese Patent No. 2901945, for instance, proposes such a structure that pixel processing units are configured to execute parallel processing and a local memory is assigned to each of the pixel processing units.

In this method, however, the correspondence between the coordinates of pixels and the pixel processing units is predetermined. In other words, it is not possible for a rasterizer to monitor the processing condition of each pixel processing unit, and to input pixels to a pixel processing unit with the least load. As a result, there arises such a problem that a load tends to concentrate on a specific pixel processing unit, and it is difficult to equally distribute the load to the pixel processing units. In consideration of this, a structure in which one pixel processing unit is assigned to each of pixels is proposed, for instance, in Fuchs et al., "Fast Spheres, Shadows, Textures, Transparencies, and Image Enhancements in Pixel-Planes", Computer Graphics (Proc. SIGGRAPH 85), Vol. 19, No. 3, pp. 111-120, 1985; and Fuchs et al., "Pixel-Planes 5: A Heterogeneous Multiprocessor Graphic System Using Processor-Enhanced Memories", Computer Graphics (Proc. SIGGRAPH 89), Vol. 23, No. 3, pp. 79-88, 1989.

In the methods of the above documents, however, there is such a problem that the rendering apparatus will inevitably become a large-scale one, and these methods are not practical.

BRIEF SUMMARY OF THE INVENTION

A rendering apparatus according to the first aspect of the present invention includes:

a rasterizer which generates pixels corresponding to graphics to be rendered, the pixels being obtained by dividing a graphic rendering area in a matrix;

pixel processing units which execute rendering operations for the pixels generated by the rasterizer, the pixels rendered by the same pixel processing unit being positioned substantially equidistantly and isotropically within the rendering area; and memories which are provided in association with the respective pixel processing units and store data of the pixels rendered by the associated pixel processing units.

A rendering method according to the second aspect of the present invention includes:

generating pixels on the basis of graphic information;

inputting the generated pixels to pixel processing units in accordance with positions occupied by the generated pixels in a rendering area, the pixels rendered by the same pixel processing unit being positioned substantially equidistantly and isotropically within the rendering area;

executing a rendering operation for the input pixels; and storing the rendered pixel data in memories provided in association with the respective pixel processing units.

A computer program product for rendering graphics comprising:

means for instructing a computer to generate pixels in accordance with input graphics information;

means for instructing a computer to execute a rendering operation for the pixels; and means for instructing a computer to store data of the rendered pixels in memories, the pixels stored in the same memory being positioned substantially equidistantly and isotropically within a rendering area.

BRIEF DESCRIPTION OF THE SEVERAL VIEWS OF THE DRAWING

FIG. 23 is a conceptual view of a memory space in a local memory, which stores stamp data with a plurality of data widths, in an image processing apparatus according to the sixth embodiment of the invention;

FIG. 24 is a conceptual view of the memory space in the local memory in the image processing apparatus according to the sixth embodiment of the invention;

FIG. 26 is a conceptual view of the memory space in the local memory in the image processing apparatus according to the sixth embodiment of the invention;

FIG. 27 is a block diagram of a graphic processor that is included in an image processing apparatus according to the seventh embodiment of the invention;

FIG. 34 is a conceptual view illustrating a method of stamp disposition in the image processing apparatus according to the ninth embodiment of the invention;

FIG. 47 is a block diagram of a computer that realizes the image rendering methods according to the first to 15th embodiments of the invention.

DETAILED DESCRIPTION OF THE INVENTION

Figure 1:
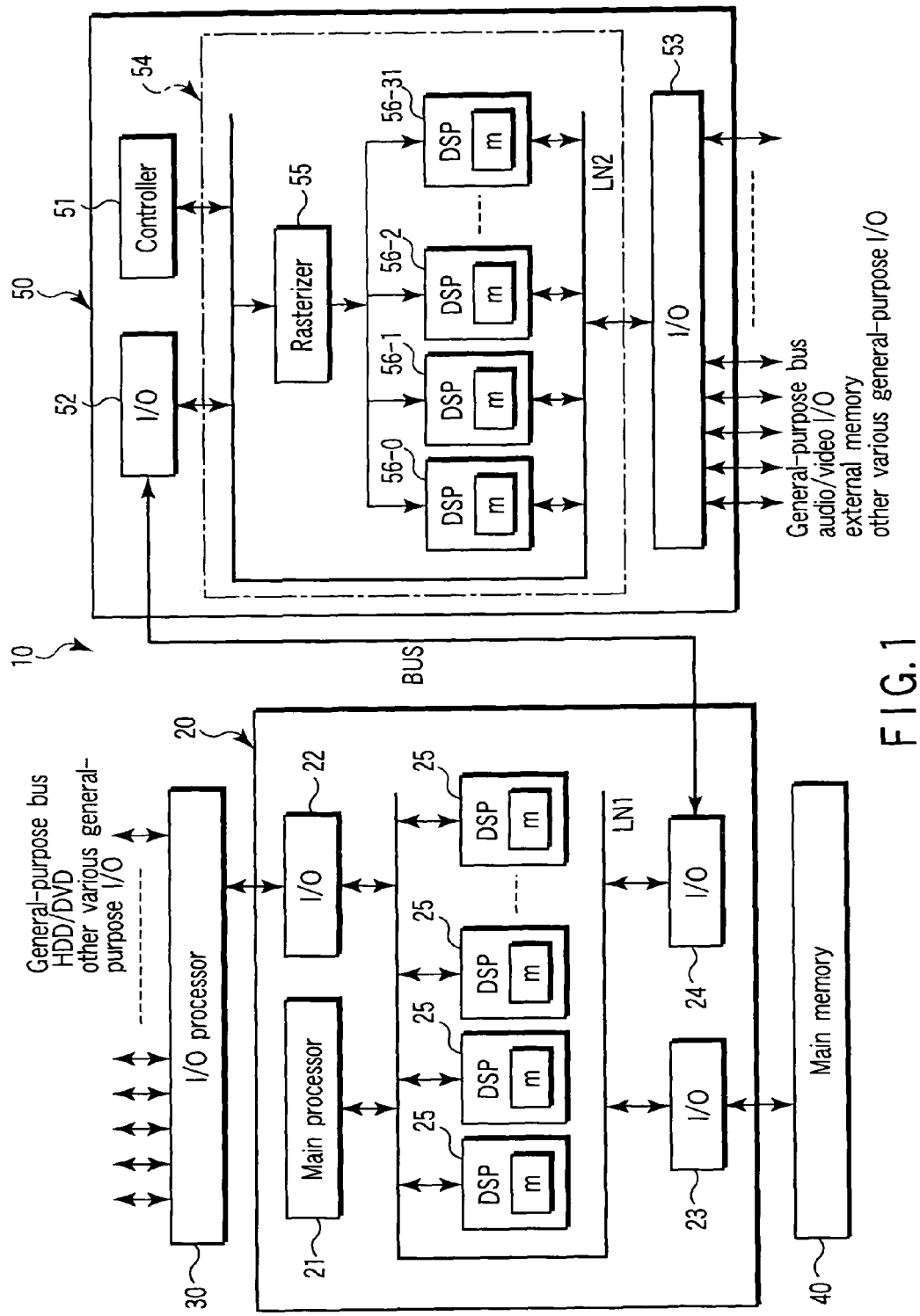
FIG. 1 is a block diagram of an image processing apparatus according to the first embodiment of the present invention.

A rendering apparatus according to the first embodiment of the present invention will now be described with reference to FIG. 1. FIG. 1 is a block diagram that shows an image rendering processor system LSI according to this embodiment.

As is shown in FIG. 1, the image rendering processor system LSI 10 according to this embodiment includes a host processor 20, an I/O processor 30, a main memory 40 and a graphic processor 50. The host processor 20 and graphic processor 50 are connected via a processor bus BUS so as to be mutually communicable.

The host processor 20 includes a main processor 21, I/O sections 22 to 24, and a plurality of digital signal processors (DSPs) 25. These circuit blocks are connected via a local network LN1 so as to be mutually communicable. The main processor 21 controls the operations of the respective circuit blocks in the host processor 20. The I/O section 22 executes data transmission/reception via the I/O processor 30 between the host processor 20 and the outside. The I/O section 23 executes data transmission/reception with the main memory 40. The I/O section 24 executes data transmission/reception with the graphic processor 50 via the processor bus BUS. The digital signal processors 25 execute signal processing on the basis of data that is read out of the main memory 40 or from the outside.

The I/O processor 30 connects the host processor 20 to, for instance, general-purpose buses, peripherals such as HDD or DVD (Digital Versatile Disc) drives, and networks. In this case, the HDD or DVD drives may be mounted on the LSI 10 or may be provided outside the LSI 10.

The main memory 40 stores programs that are necessary for the operation of the host processor 20. The programs are read out, for example, from an HDD (not shown) and are loaded in the main memory 40.

The graphic processor 50 includes a controller 51, I/O sections 52 and 53, and an arithmetic process section 54. The controller 51 controls communication with the host processor 20 and controls the arithmetic processing section 54. The I/O section 52 controls input/output from/to the host processor 20 via the processor bus BUS. The I/O section 53 controls, for example, input/output from/to various general-purpose buses such as PCI buses, audio/video inputs/outputs, and input/output from/to external memories. The arithmetic process section 54 executes image processing arithmetic operations.

Figure 2:
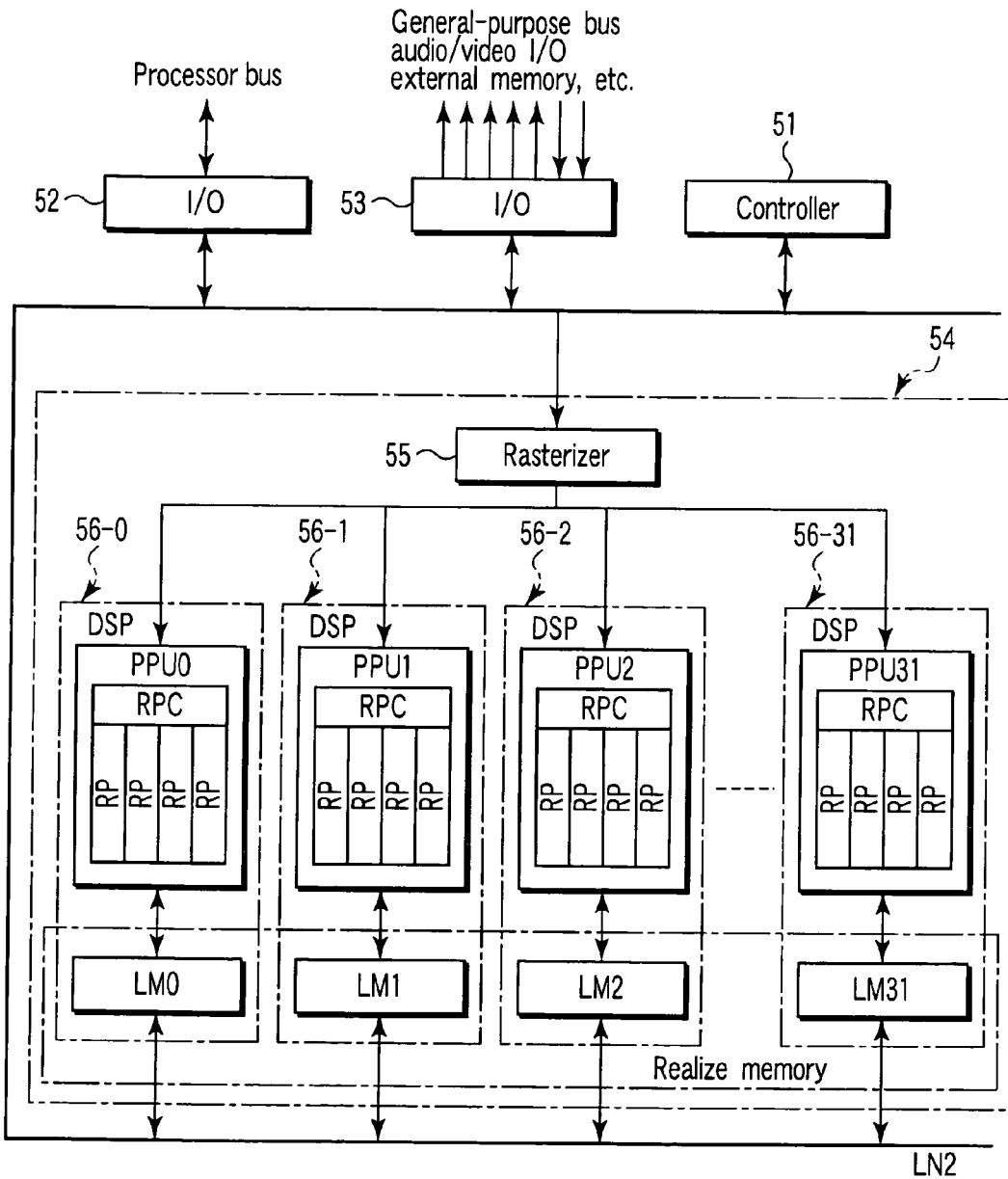
FIG. 2 is a block diagram of a graphic processor that is included in the image processing apparatus according to the first embodiment of the invention.

The arithmetic process section 54 includes a rasterizer 55, a plurality of signal processing sections 56-0 to 56-31. In this embodiment, the number of signal processing sections 56 is 32. However, the number of signal processing sections is not limited to 32, and may be 8, 16, 64, etc. Referring now to FIG. 2, the structure of the arithmetic process section 54 is described in detail. FIG. 2 is a block diagram of the graphic processor 50.

As is shown in FIG. 2, the arithmetic process section 54 includes the rasterizer 55, and 32 signal processing sections 56-0 to 56-31. The rasterizer 55 generates pixels in accordance with input graphic information. A pixel is the minimum-unit region that is handled when given graphics are rendered. A graphic is rendered as a set of pixels. Pixels to be generated are determined according to the shape of the graphic (i.e. the position occupied by the graphic). Specifically, when a certain position is to be rendered, a pixel corresponding to the position is generated. When another position is to be rendered, another pixel corresponding to this position is generated. The signal processing sections 56-0 to 56-31 include, respectively, pixel processing units PPU0 to PPU31 and local memories LM0 to LM31 associated with these pixel processing units.

Each of the pixel processing units PPU0 to PPU31 includes four realize pipes RP. The four realize pipes RP constitute one RP (realize pipe) cluster RPC. Each RP cluster RPC executes SIMD (Single Instruction Multiple Data) operations, and processes four pixels at a time. Pixels corresponding to respective positions of the graphic are assigned to the pixel processing units PPU0 to PPU31. In accordance with positions that are occupied by the graphic, the associated pixel processing units PPU0 to PPU31 process the pixels. The relationship between the position of the pixel and the pixel processing unit will be described later in detail.

The local memories LM0 to LM31 store pixel data that are generated by the associated pixel processing units PPU0 to PPU31. The local memories LM0 to LM31, as a whole, constitute a realize memory. The realize memory is a DRAM, for instance. Memory areas in the realize memory, each having a predetermined data width, correspond to the local memories LM0 to LM31.

Figure 3:
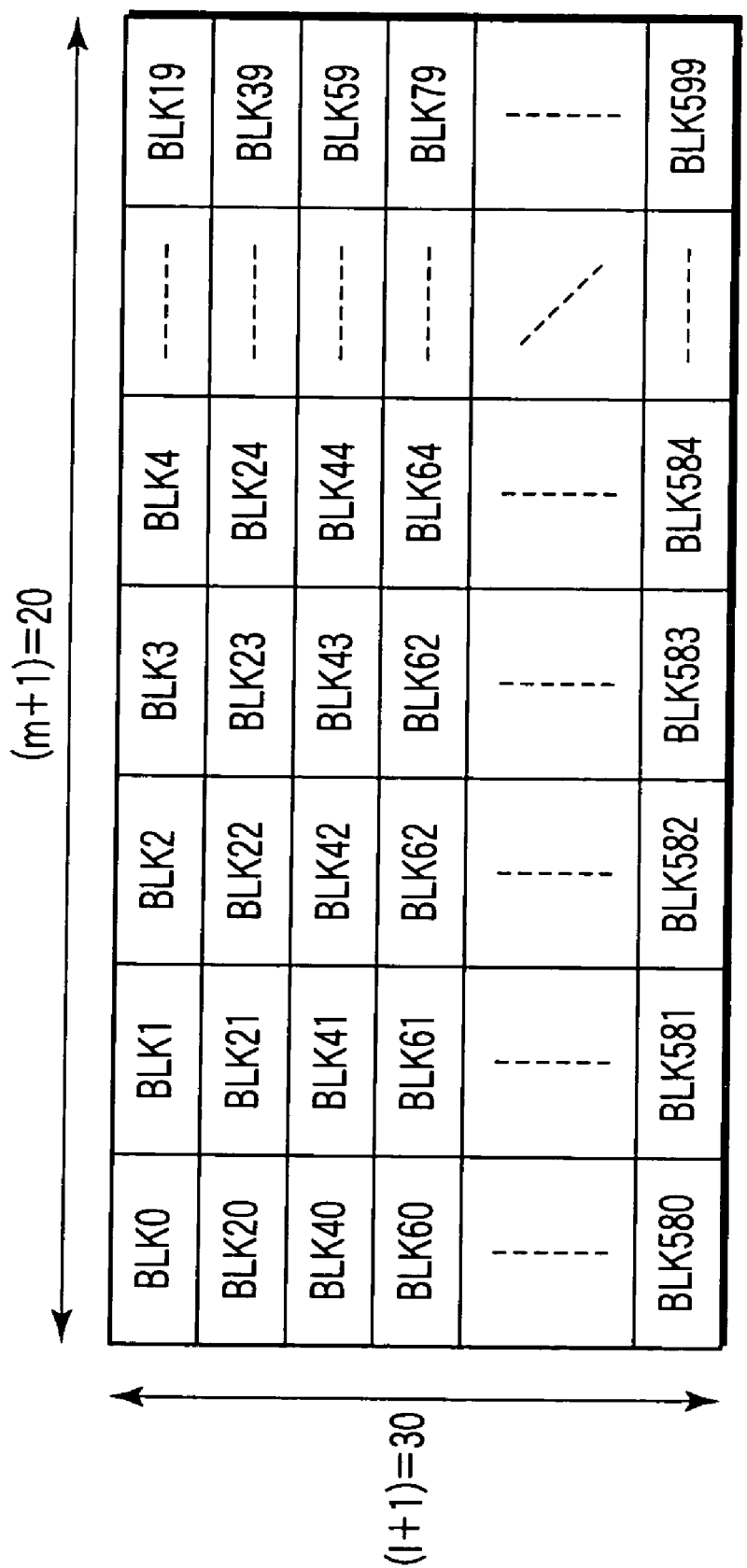
FIG. 3 is a conceptual view of an area in a frame buffer in the image processing apparatus according to the first embodiment of the invention.

Next, referring to FIG. 3, the relationship between the pixels and the rendering positions in the graphics processor according to this embodiment is described. FIG. 3 is a conceptual view of an entire 2-dimensional space in which graphics are to be rendered. The area for rendering, shown in FIG. 3, corresponds to a memory space (hereinafter referred to as "frame buffer") that stores pixel data in the local memories.

Figure 4:
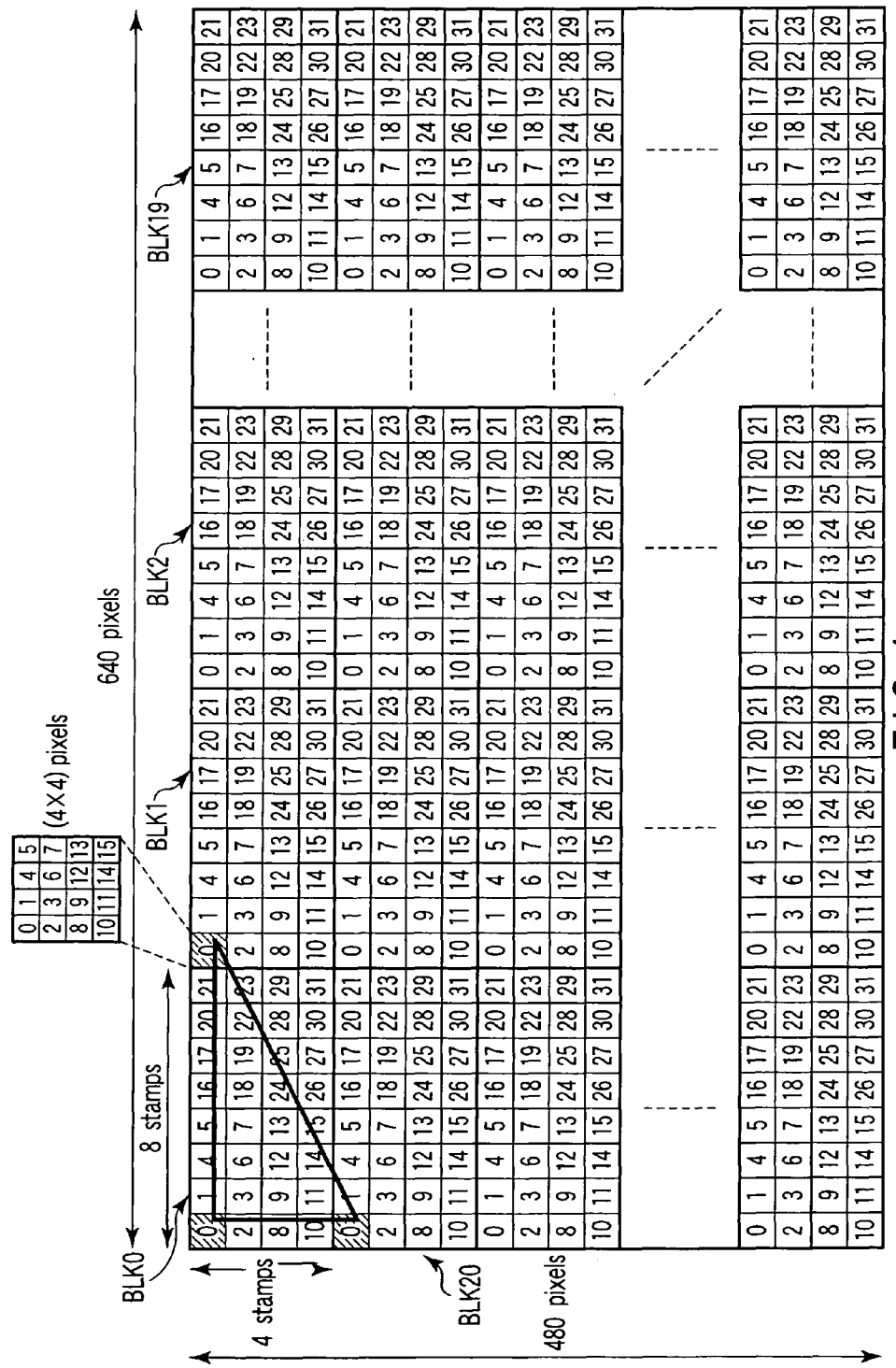
FIG. 4 is a conceptual view of the frame buffer in the image processing apparatus according to the first embodiment of the invention.

As is shown in FIG. 3, the frame buffer includes ((m+1)×(l+1)) blocks BLK0 to BLKn that are arranged in a matrix. In FIG. 3, l=29, m=19, and n=599. These numbers are shown by way of example, and are not limited. Each of the BLK0 to BLK599 comprises 32 stamps S that are arranged in a matrix. FIG. 4 shows that each of the blocks shown in FIG. 3 comprises a plurality of stamps.

As is shown in FIG. 4, each stamp is a set of pixels, which are rendered by the same pixel processing unit. In this embodiment, one stamp includes (4×4)=16 pixels. The number of pixels in one stamp is not limited to this, and may be 1, 4, etc. In FIG. 4, a number S (=0 to 31) that is assigned to each stamp is hereinafter referred to as "stamp ID." The stamp ID agrees with the number of the pixel processing unit that renders the pixels within the associated stamp. Thus, the pixels within the stamp, to which S=0 is assigned as the stamp ID, are rendered by the pixel processing unit PPU0, and the pixels within the stamp, to which S=31 is assigned, are rendered by the pixel processing unit PPU31.

Each block, BLK0 to BLK599, includes (8×4)=32 stamps. The 32 stamps that are included in one block are all rendered by different pixel processing units. Thus, the number of stamps per block is equal to the number of pixel processing units. Within each block, stamp IDs S=0 to S=31 are successively assigned to the stamps from the upper left to the lower right. Specifically, two rows of two stamps that are horizontally arranged are provided from the upper left, and two sets of these (2×2) stamps are horizontally arranged. Two rows of these (4×2) stamps are provided, and two sets of these (4×4) stamps are horizontally arranged. These stamps correspond to the pixel processing units PPU0 to PPU31 in this order. In other words, stamp IDs are assigned in this order. The assignment of IDs to the stamps can be arbitrary, and is not limited to this method. It should suffice if one block includes the same number of stamps as the pixel processing units, and all the stamps are processed by different pixel processing units.

Hence, the space in which graphics are to be rendered is formed by (640×480) pixels as a whole. In addition, three proximate stamps which are processed by the same pixel processing unit are so positioned as to form a right-angled triangle (FIG. 4 shows that stamp S=0, which is processed by the pixel processing unit PPU0, is positioned at the vertex of the right-angled triangle).

Figure 5:
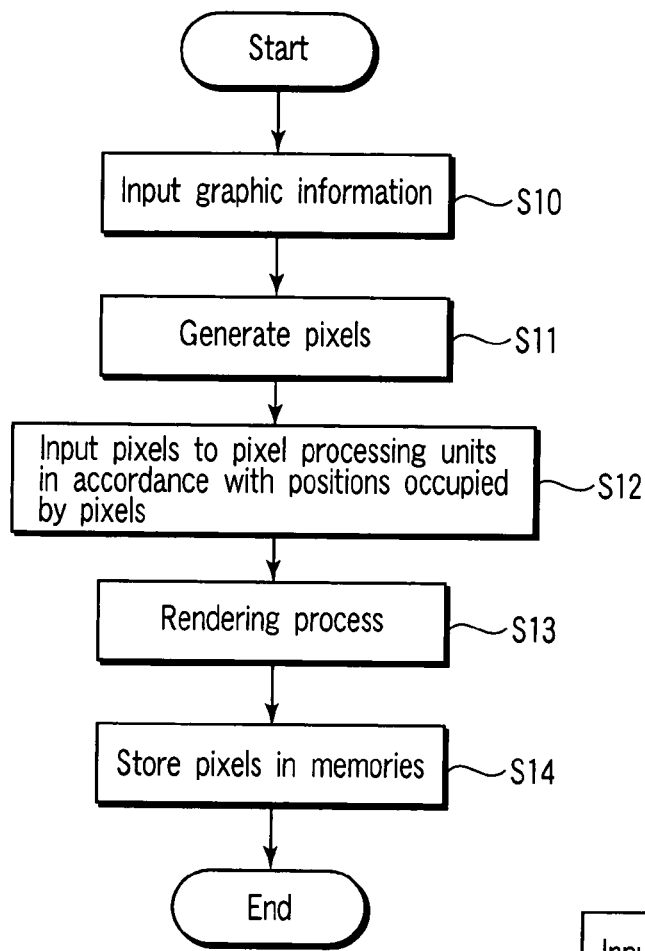
FIG. 5 is a flowchart illustrating an image rendering method that is executed by the image processing apparatus according to the first embodiment of the invention.

Next, the operations of the graphic processor 50 shown in FIG. 2 are described with reference to FIG. 5. FIG. 5 is a flowchart illustrating the operations of the graphic processor 50 when it renders a graphic.

Figure 6:
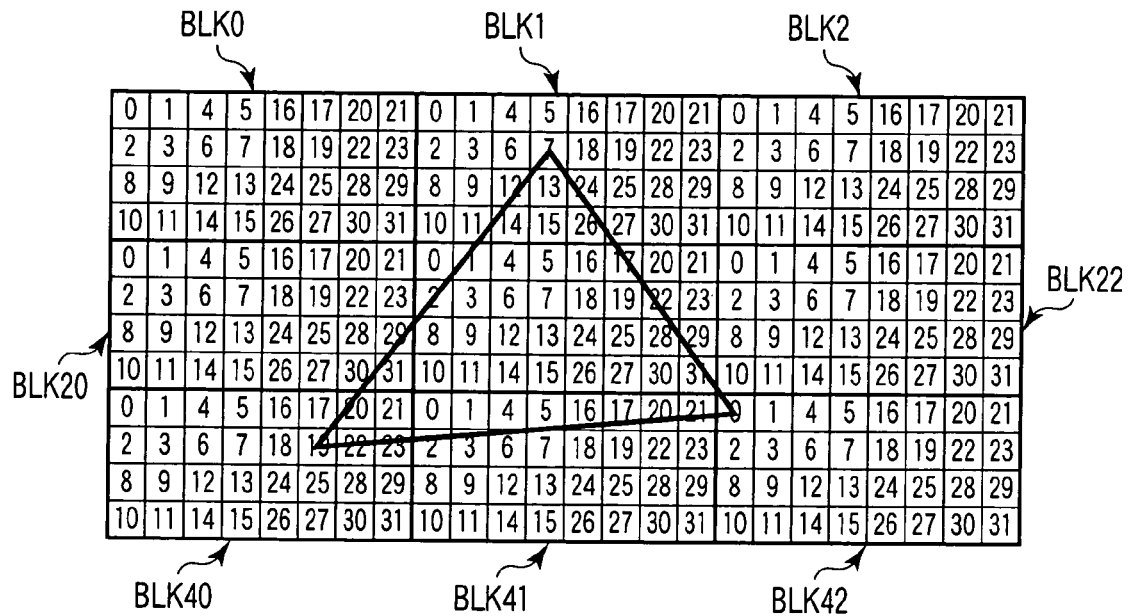
FIG. 6 is a conceptual view of the frame buffer in the image processing apparatus according to the first embodiment of the invention.

When a graphic is to be rendered, graphic information is first input to the rasterizer 55 (step S10). The graphic information is, for instance, apex coordinates and color information of a graphic. A description is given for the case of rendering a triangle, as an example. Assume now that a triangle, which is input to the rasterizer 55, occupies a certain position in the rendering space, as shown in FIG. 6. In the rendering space, three apex coordinates of the triangle correspond to stamp S=7 of block BLK1, stamp S=19 of block BLK40, and stamp S=0 of block BLK42.

Figure 7:
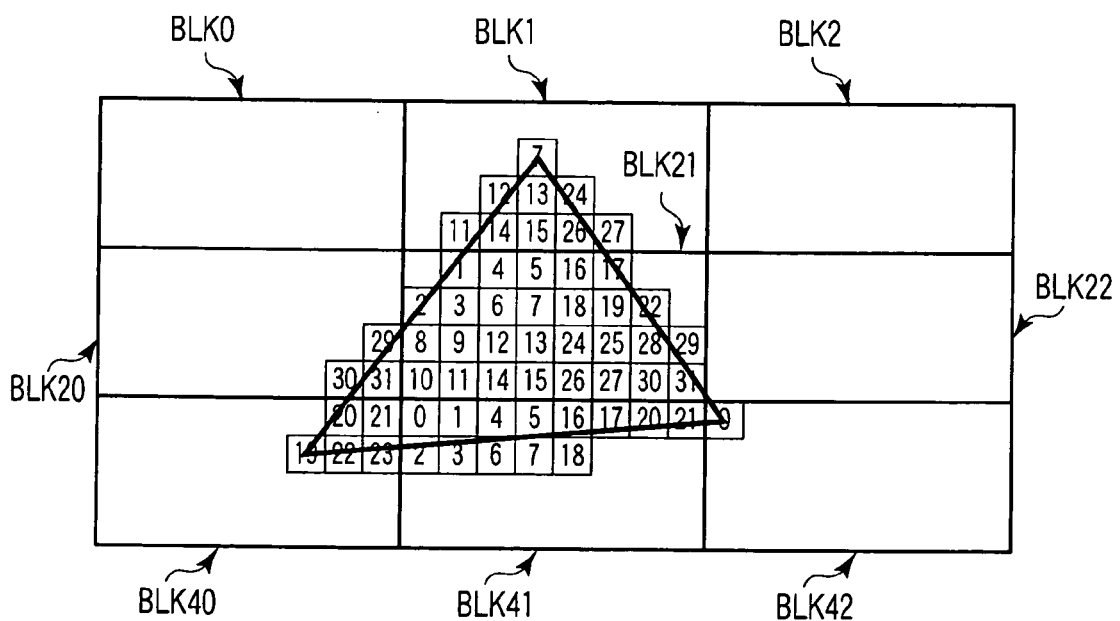
FIG. 7 is a conceptual view of the frame buffer in the image processing apparatus according to the first embodiment of the invention.

The rasterizer 55 generates stamps (or pixels) corresponding to the position of the triangle to be rendered (step S11). FIG. 7 illustrates this process. The generated stamp data are sent to the associated pixel processing units PPU0 to PPU31 (step S12).

Based on the input stamp data, the pixel processing units execute rendering operations with respect to their own assigned pixels (step S13). In the example shown in FIG. 7, as regards the block BLK1, the pixel processing units PPU7, PPU11 to PPU15, PPU24, PPU26 and PPU27 execute rendering operations with respect to their own assigned pixels. As regards the block BLK20, the pixel processing units PPU29 to PPU31 execute rendering operations with respect to their own assigned pixels. As regards the block BLK21, the pixel processing units PPU1 to PPU19, PPU22 and PPU24 to PPU31 execute rendering operations with respect to their own assigned pixels. As regards the block BLK40, the pixel processing units PPU19 to PPU23 execute rendering operations with respect to their own assigned pixels. As regards the block BLK41, the pixel processing units PPU0 to PPU7, PPU16 to PPU18, PPU20 and PPU21 execute rendering operations with respect to their own assigned pixels.

As a result, a triangle, as shown in FIG. 7, is rendered as a plurality of pixels. The pixel data that are rendered by the pixel processing units are stored in the local memories LM0 to LM31 on a stamp-by-stamp basis (step S14). As mentioned above, the pixel processing units PPU0 to PPU31 correspond to the local memories LM0 to LM31, and the pixel data that are processed by the pixel processing units PPU0 to PPU31 are stored in the associated local memories LM0 to LM31.

As has been described above, according to the rendering apparatus of the present embodiment, the frame buffer is composed of a set of blocks each comprising a plurality of stamps. The stamps in each block are processed by different pixel processing units PPU0 to PPU31. In this case, three proximate stamps that are processed by the same pixel processing unit are positioned at the apices of a right-angled triangle.

By disposing the stamps in the frame buffer in the above-described fashion, the load on the pixel processing units PPU0 to PPU31 can be more uniformly distributed, compared to the prior art. As a result, in the structure wherein the correspondence between the pixel coordinates and the pixel processing units is predetermined and the local memories are assigned to the pixel processing units, the speed of the rendering operations can be increased without increasing the circuit scale.

Figure 8:
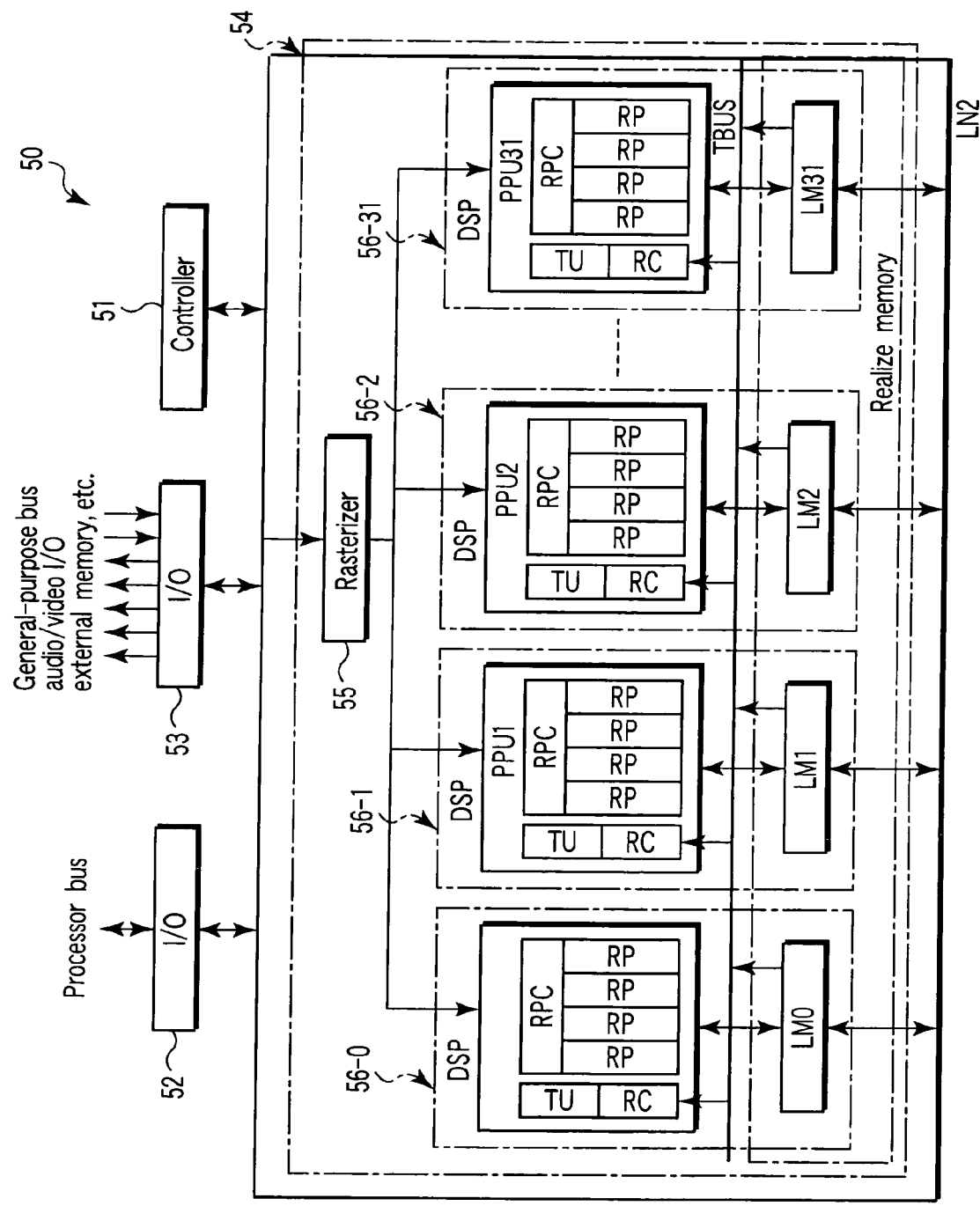
FIG. 8 is a block diagram of a graphic processor that is included in an image processing apparatus according to a second embodiment of the invention.

Next, a rendering apparatus according to the second embodiment of the present invention is described with reference to FIG. 8. In this embodiment, the disposition of stamps, as described in connection with the first embodiment, is applied to a texture. FIG. 8 is a block diagram of a graphic processor 50 that is included in an image rendering processor system LSI 110 according to the second embodiment.

As is shown in FIG. 8, the structure of the graphic processor 50 of this embodiment differs from the structure in the first embodiment in that each of the signal processing sections 56-0 to 56-31 further includes a texture unit TU, a read-out circuit RC, and a texture read-out bus TBUS. Each of the local memories LM0 to LM31 stores a portion of reference image (texture) data.

The read-out circuit RC reads out texture data from one of the local memories, LM0 to LM31, via the texture read-out bus TBUS. The texture unit TU executes texture processing. Specifically, the texture unit TU adds the texture data, which is read out by the read-out circuit RC, to the pixel that is being processed by the pixel processing unit (hereinafter, this process is referred to as "texture mapping").

Figure 9:
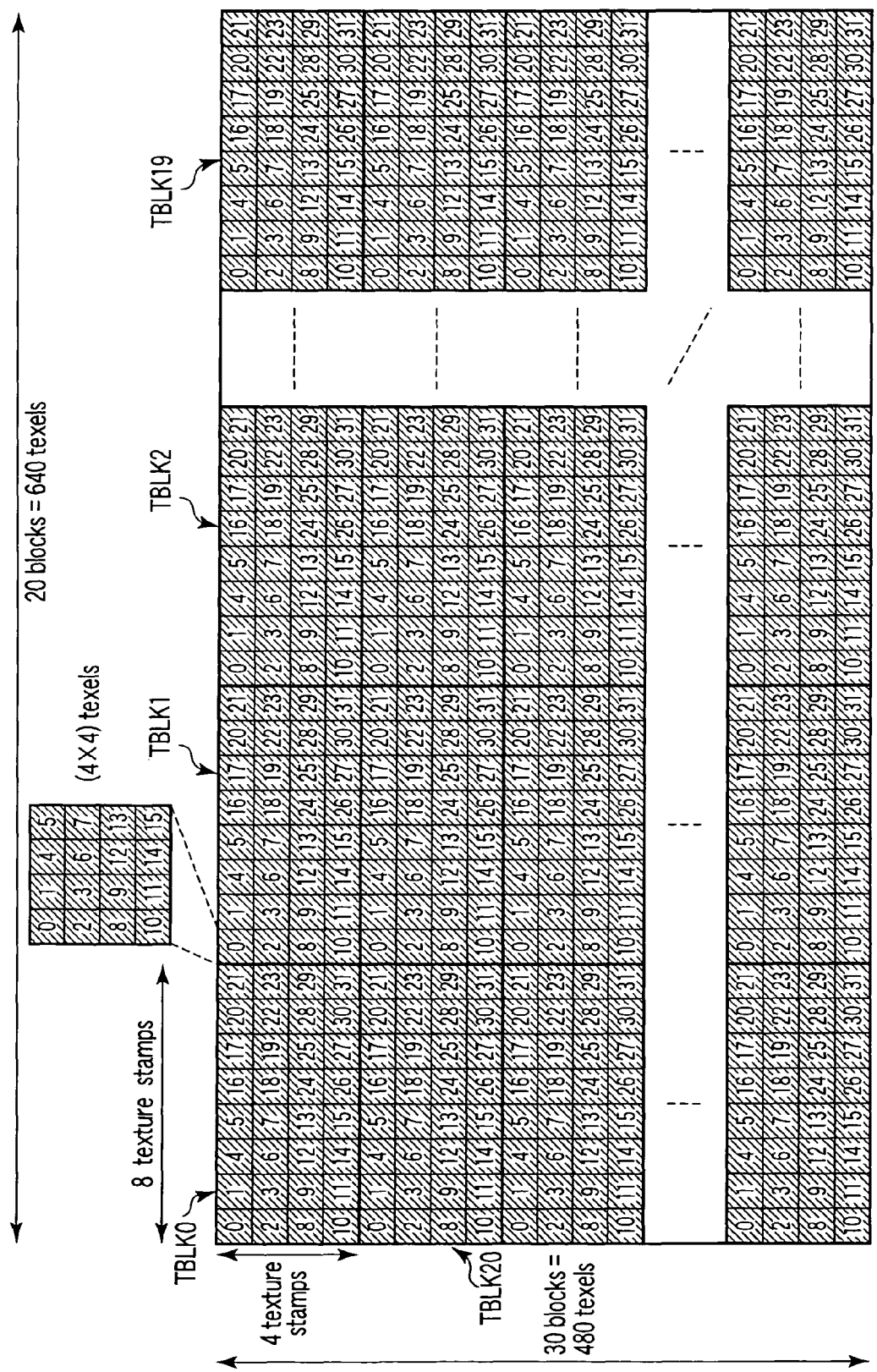
FIG. 9 is a conceptual view of texture data in the image processing apparatus according to the second embodiment of the invention.

FIG. 9 is a conceptual view showing an example of texture data. As is shown in FIG. 9, the texture data includes ((m+1)×(l+1)) texture blocks TBLK0 to TBLKn that are arranged in a matrix. In FIG. 9, l=29, m=19, and n=599. These numbers are shown by way of example, and are not limited.

Each of the texture blocks TBLK0 to TBLKn comprises (8×4)=32 texture stamps. Each texture stamp is a set of texels, which are stored in the same local memory. A texel is the minimum unit when a given texture is handled. A texture is formed of a set of texels. In this embodiment, one texture stamp includes (4×4)=16 texels. The number of texels in one texture stamp is not limited to this, and may be 1, 4, etc. It is preferable, however, that the number of pixels within a stamp be equal to the number of texels within a texture stamp. In FIG. 9, a number T (=0 to 31) that is added to each stamp is hereinafter referred to as "texture stamp ID." The texture stamp ID agrees with the number of the local memory that stores the texels in the associated texture stamp. Thus, the texels within the texture stamp to which T=0 is assigned as the texture stamp ID are stored in the local memory LM0, and the texels within the texture stamp to which T=31 is assigned are stored in the local memory LM31.

In FIG. 9, hatching indicates the presence of some picture design, thereby distinguishing the texture data from the frame buffer.

The 32 texture stamp data, which are included in one texture block, are all stored in different local memories. Thus, the number of texture stamps per texture block is equal to the number of local memories (=the number of pixel processing units). Within the texture block, the texture stamps with T=0 to T=31 are successively assigned from the upper left to the lower right. Specifically, two rows of two texture stamps that are horizontally arranged are provided from the upper left, and two sets of these (2×2) texture stamps are horizontally arranged. Two rows of these (4×2) texture stamps are provided, and two sets of these (4×4) texture stamps are horizontally arranged. These texture stamps correspond to the local memories LM0 to LM31 in this order. In other words, texture stamp IDs are assigned in this order. Hence, texture data are formed by (640×480) texture stamps as a whole. In addition, three proximate stamps, which have the same ID, are so positioned as to form a right-angled triangle.

As has been described above, IDs are assigned to the texture data in the same manner as in the case of the frame buffer, which has been described in connection with the first embodiment. The assignment of IDs to the texture stamps can be arbitrary, and is not limited to this method. It should suffice if one texture block includes the same number of texture stamps as the local memories, and all the texture stamps are stored in different local memories. It is preferable, however, to assign IDs in the same manner as in the case of the stamps in the frame buffer.

Figure 10:
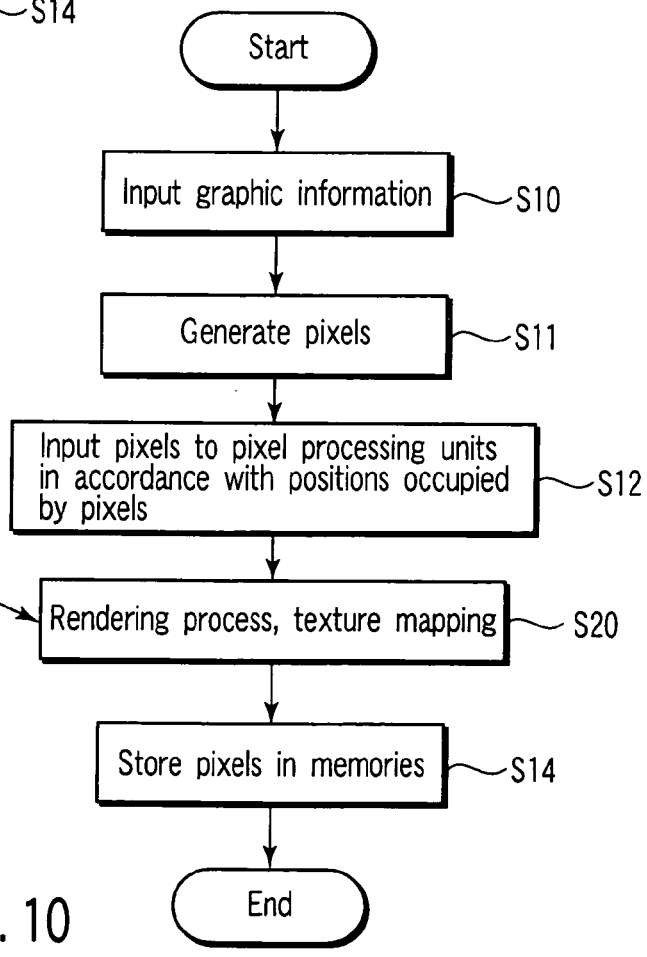
FIG. 10 is a flow chart illustrating an image rendering method that is executed by the image processing apparatus according to the second embodiment of the invention.

Next, the operation of the graphic processor 50 shown in FIG. 8 is described with reference to FIG. 10. The method of rendering graphics is basically the same as in the first embodiment. Specifically, graphic information is first input to the rasterizer 55 (step S10). Like the first embodiment, a description is given for the case of rendering a triangle, as shown in FIG. 6.

First, the rasterizer 55 generates stamps (or pixels) corresponding to the position that is occupied by the triangle to be rendered (step S11). FIG. 7 illustrates this process. The generated stamp data are sent to the associated pixel processing units PPU0 to PPU31 (step S12).

Based on the input stamp data, the pixel processing units execute rendering operations with respect to the pixels they are assigned to. At the same time, texture mapping for adding texture data to the graphic to be rendered is executed (step S20). The texture mapping will be described below in detail.

Figure 11:
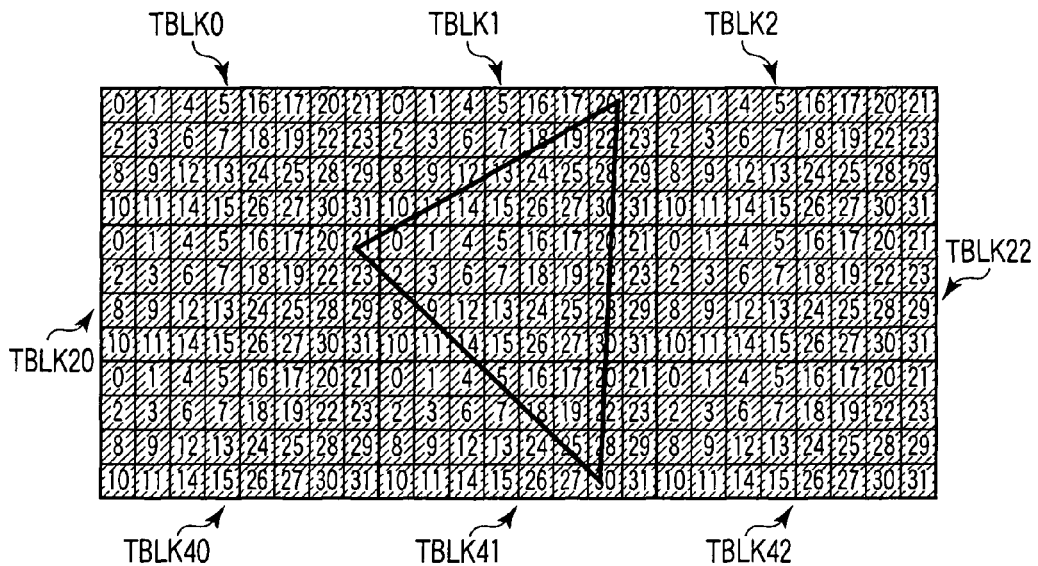
FIG. 11 is a conceptual view of texture data in the image processing apparatus according to the second embodiment of the invention.

In the signal processing sections 56-0 to 56-31, the pixel processing units PPU0 to PPU31 execute rendering operations for pixels, and the read-out circuits RC read out texture data, which are to be added to the associated pixels, from the local memories LM0 to LM31. For example, assume that the pixel processing units will render a triangle shown in FIG. 7. Also assume that a triangle extending over texture blocks TBLK1, TBLK20, TBLK21 and TBLK41, as shown in FIG. 11, is to be added as texture data to the triangle shown in FIG. 7. It is supposed that an apex positioned at stamp S=7 in the block BLK1 in the frame buffer corresponds to a texture stamp T=21 in the texture block TBLK20 in the texture; an apex positioned at stamp S=19 in the block BLK40 in the frame buffer corresponds to a texture stamp T=30 in the texture block TBLK41 in the texture; and an apex positioned at stamp S=0 in the block BLK42 in the frame buffer corresponds to a texture stamp T=20 in the texture block TBLK1 in the texture.

Then, the read-out circuit RC of the signal processing section 56-7 reads out texel data, which corresponds to the texture stamp T=21 of the texture block TBLK20, from the local memory LM21. The texture unit TU of the signal processing section 56-7 adds the texture stamp T=21 of the texture block TBLK20 to the stamp S=7 of the block BLK1. In addition, the read-out circuit RC of the signal processing section 56-19 reads out texel data, which corresponds to the texture stamp T=30 of the texture block TBLK41, from the local memory LM30. The texture unit TU of the signal processing section 56-19 adds the texture stamp T=30 of the texture block TBLK41 to the stamp S=19 of the block BLK40. Further, the read-out circuit RC of the signal processing section 56-0 reads out texel data, which corresponds to the texture stamp T=20 of the texture block TBLK1, from the local memory LM20. The texture unit TU of the signal processing section 56-0 adds the texture stamp T=20 of the texture block TBLK1 to the stamp S=0 of the block BLK42.

The above example relates to the case in which the area of the triangle to be rendered in the frame buffer is equal to that in the texture. In general, a texture is magnified or minified when it is mapped to graphics. In this case, too, texture stamps corresponding to the coordinates of the triangle in the texture are similarly chosen.

Figure 12:
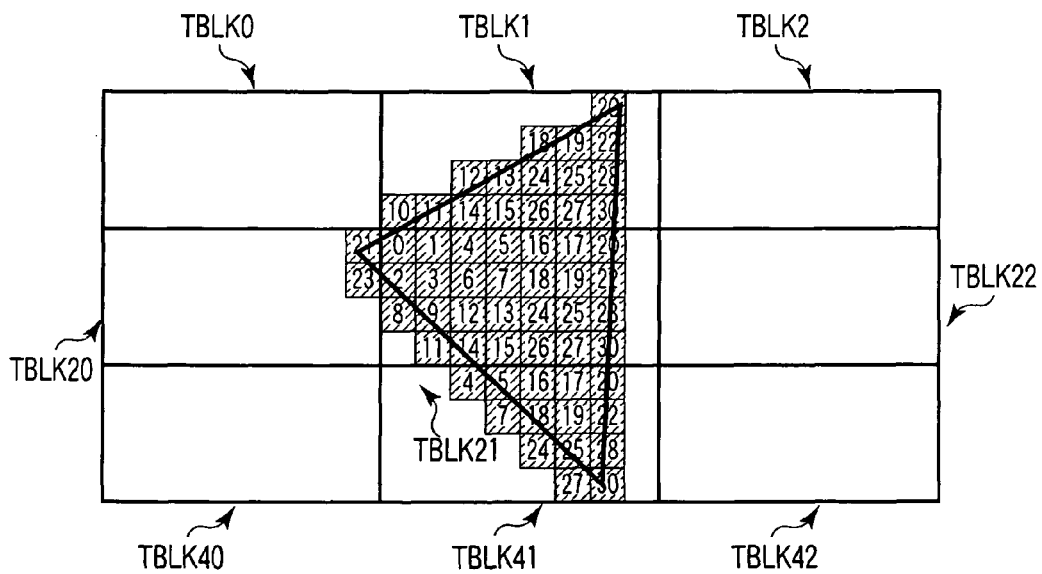
FIG. 12 is a conceptual view of texture data in the image processing apparatus according to the second embodiment of the invention.

In like manner, each of the signal processing sections 56-0 to 56-31 reads out texels which are to be added to the stamps it renders, from the associated local memories LM0 to LM31, and adds the texels to the stamps. As a result, texture data with a triangular shape as shown in FIG. 12 is mapped to a set of stamps with a triangular shape as shown in FIG. 7.

Subsequently, the pixel data, to which the texture data is added, is stored in the associated local memory (step S14).

As has been described above, according to the rendering apparatus of this embodiment, the texture is formed of a set of texture blocks. The texture stamps in the respective texture blocks are stored in the different local memories LM0 to LM31. In this case, three proximate texture stamps stored in the same local memory are positioned at the apices of the right-angled triangle.

By associating the texels and the local memories in the above-described fashion, accesses to the local memories by the pixel processing units can be more uniformly distributed, compared to the prior art. As a result, the speed of the rendering operations can be increased without increasing the circuit scale.

Figure 13:
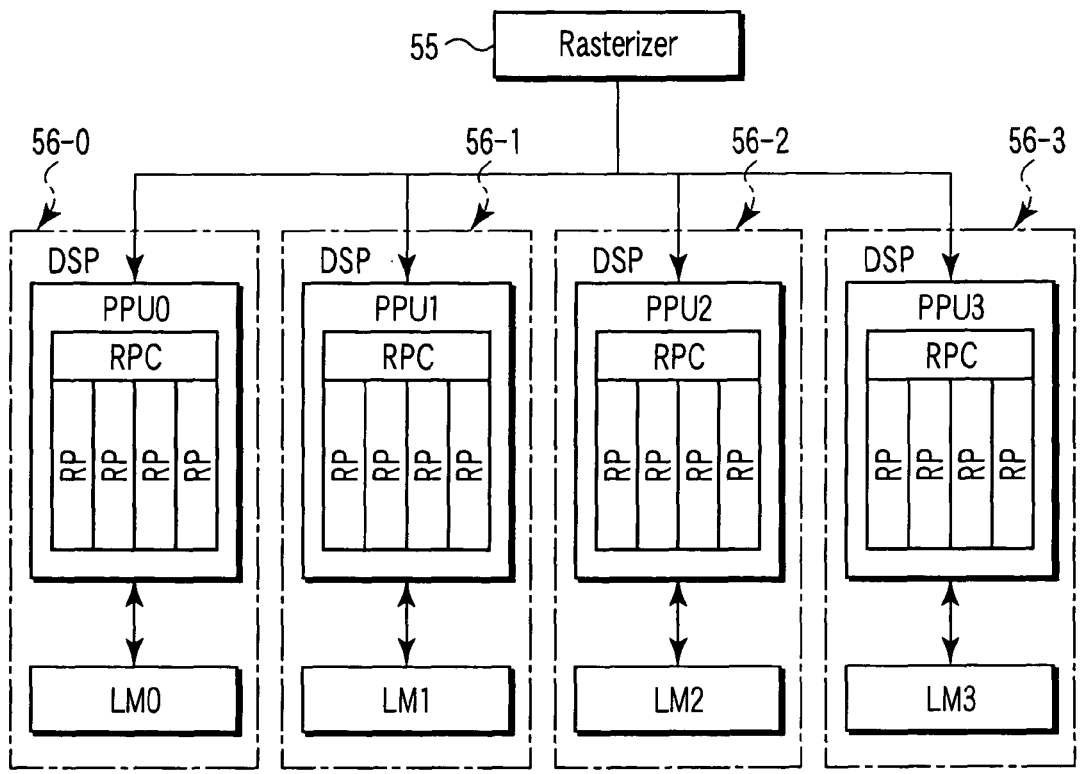
FIG. 13 is a block diagram of a region of a graphic processor according to the third embodiment of the invention.

Next, a rendering apparatus according to the third embodiment of the present invention is described with reference to FIG. 13. The third embodiment relates to a method of assigning addresses (hereinafter referred to as "addressing") to the frame buffer in the local memory in the first and second embodiments. FIG. 13 is a block diagram of an arithmetic process section 54 in a graphic processor 50 that is included in an image rendering processor system LSI 10 according to this embodiment. The structure of the image rendering processor system LSI 10 is the same as the structure that has been described in connection with the first and second embodiments. For the purpose of simple description, the number of signal processing sections is set at four by way of example.

Figure 14:
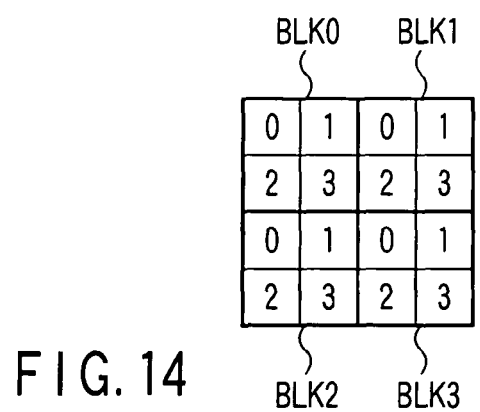
FIG. 14 is a conceptual view of the frame buffer in the image processing apparatus according to the third embodiment of the invention.

As is shown in FIG. 13, the arithmetic process section 54 includes a rasterizer 55 and four signal processing sections 56-0 to 56-3. The signal processing sections 56-0 to 56-3 include pixel processing units PPU0 to PPU3 and local memories LM0 to LM3, respectively. Thus, the frame buffer is structured as shown in FIG. 14. That is, the frame buffer comprises (2×2) stamp groups each comprising (2×2) stamps, which are processed by the pixel processing units PPU0 to PPU3.

In the above example, a very small frame buffer is assumed for the purpose of simple description. In practice, a frame buffer of about (640×480) is normally used.

Figure 15:
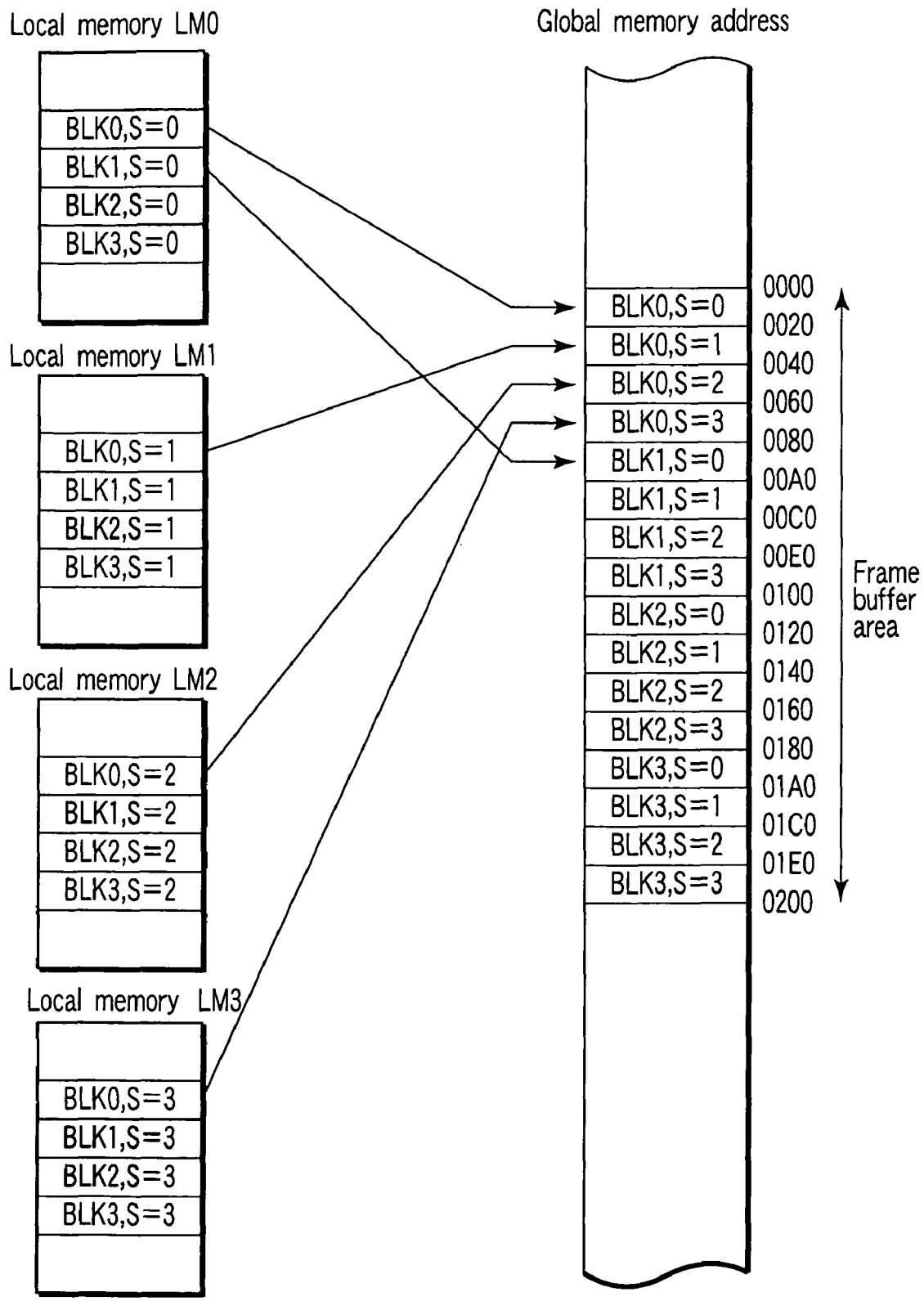
FIG. 15 is a conceptual view of a memory space in a local memory in the image processing apparatus according to the third embodiment of the invention.

FIG. 15 shows a relationship between stamp data, which are stored in the local memories LM0 to LM3, and addresses, which are assigned to the local memories LM0 to LM3. As has been described above, the local memories LM0 to LM3 store stamp data with stamp IDs, S=0, S=1, S=2 and S=3, with respect to the blocks BLK0 to BLK3. Thus, each of the local memories LM0 to LM3 stores four stamp data. Addresses are assigned to the memory space, in which stamp data are stored, in the following manner.

As shown in FIG. 15, addresses are successively assigned in the order of block IDs, and in the order of stamp IDs within each block. In FIG. 15, addresses are expressed in hexadecimal notation, and the size of the memory space for storing one stamp data is assumed to be 32 bytes. To begin with, "0000", for instance, is assigned to the first address of the memory area that stores the stamp corresponding to the block BLK0 in the local memory LM0. The first address is set at "0000" for the purpose of simple description, and is not limited to this. If this memory area occupies addresses "0000" to "001F", the next address "0020" is assigned to the first address of the memory area that stores the stamp corresponding to the block BLK0 in the local memory LM1. Since this memory area occupies addresses "0020" to "003F", the next address "0040" is assigned to the first address of the memory area that stores the stamp corresponding to the block BLK0 in the local memory LM2. Since this memory area occupies addresses "0040" to "005F", the next address "0060" is assigned to the first address of the memory area that stores the stamp corresponding to the block BLK0 in the local memory LM3. In this way, all addresses relating to the block BLK0 are assigned, and then addresses are assigned with respect to the block BLK1. Addresses are successively assigned to the stamps S=0-3 in the block BLK1. Then, addresses are successively assigned to the stamps S=0-3 in the block BLK2. Thereafter, addresses are successively assigned to the stamps S=0-3 in the block BLK3.

Specifically, the relationship between the stamp coordinates (X, Y) and the block ID is given by equation (1) below, assuming that the position corresponding to the stamp coordinates (X, Y)=(0, 0) is at the upper left corner of the block.

$$B = X/w + (Y/h) \times (fw/w) \quad (1)$$

where B is the block ID, w is the number of stamps per block in the X direction, h is the number of stamps per block in the Y direction, and fw is the number of stamps in the entire frame buffer in the X direction.

If addresses are assigned to the local memories by the addressing method according to the present embodiment, the relationship between the stamp coordinates (X, Y) and the memory address A is given by equation (2):

$$A = (B \times N + S) \times 2^d \quad (2)$$

where the data width of the stamp is $2^d$ bytes, N is the number of pixel processing units, and A is a byte-unit address.

Figure 16:
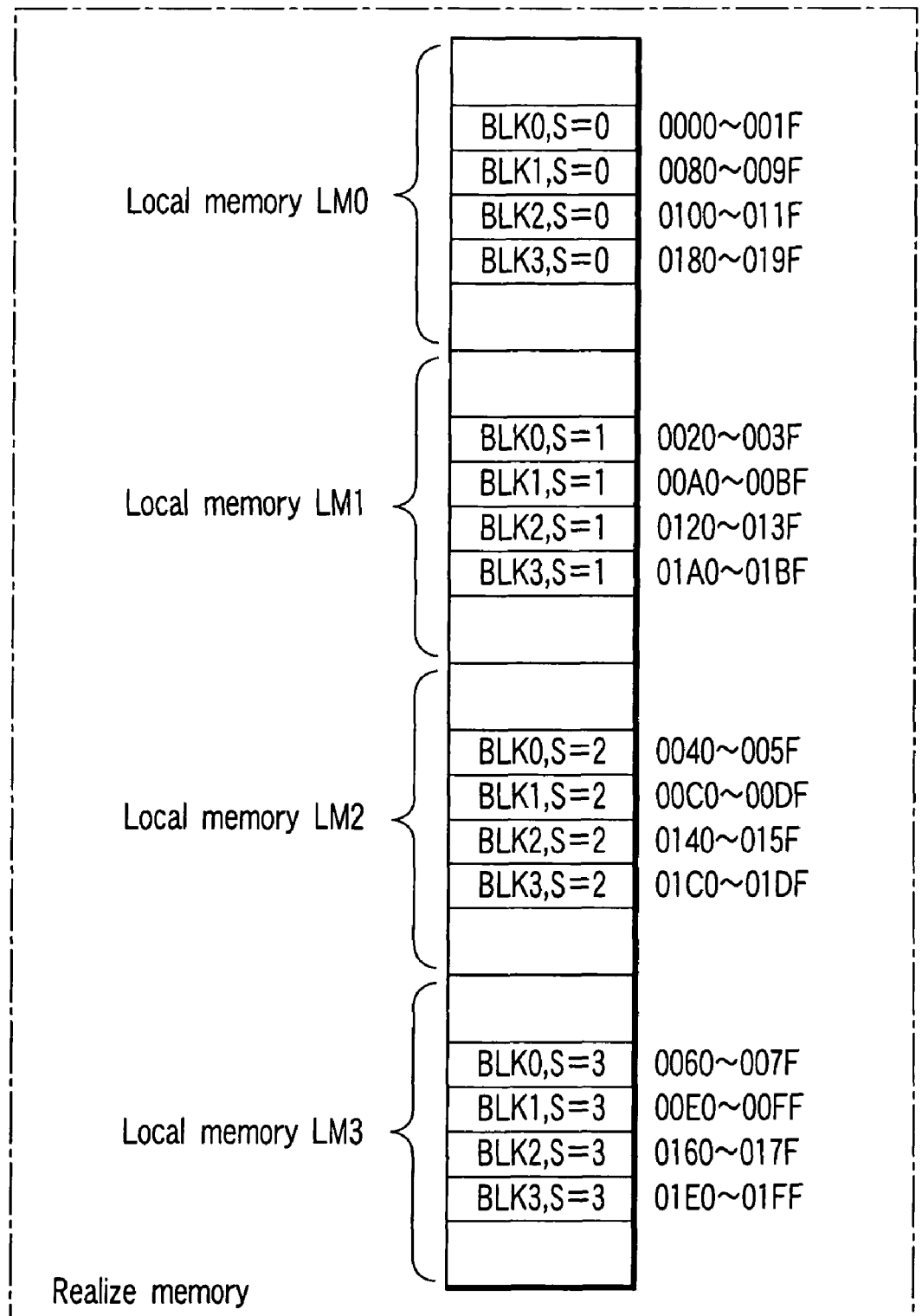
FIG. 16 is a conceptual view of the memory space in the local memory in the image processing apparatus according to the third embodiment of the invention.

As a result, addresses are assigned to the memory spaces of the local memories LM0 to LM3, as shown in FIG. 16. In the local memory LM0, data corresponding to the block BLK0 is stored in the memory space of addresses "0000" to "001F", data corresponding to the block BLK1 is stored in the memory space of addresses "0080" to "009F", data corresponding to the block BLK2 is stored in the memory space of addresses "0100" to "011F", and data corresponding to the block BLK3 is stored in the memory space of addresses "0180" to "019F".

In the local memory LM1, data corresponding to the block BLK0 is stored in the memory space of addresses "0020" to "003F", data corresponding to the block BLK1 is stored in the memory space of addresses "00A0" to "00BF", data corresponding to the block BLK2 is stored in the memory space of addresses "0120" to "013F", and data corresponding to the block BLK3 is stored in the memory space of addresses "01A0" to "01BF".

In the local memory LM2, data corresponding to the block BLK0 is stored in the memory space of addresses "0040" to "005F", data corresponding to the block BLK1 is stored in the memory space of addresses "00C0" to "00DF", data corresponding to the block BLK2 is stored in the memory space of addresses "0140" to "015F", and data corresponding to the block BLK3 is stored in the memory space of addresses "01C0" to "01DF".

In the local memory LM3, data corresponding to the block BLK0 is stored in the memory space of addresses "0060" to "007F", data corresponding to the block BLK1 is stored in the memory space of addresses "00E0" to "00FF", data corresponding to the block BLK2 is stored in the memory space of addresses "0160" to "017F", and data corresponding to the block BLK3 is stored in the memory space of addresses "01E0" to "01FF".

As described above, the addresses of the stamps that are rendered by the same pixel processing unit have discrete values.

As has been described above, according to the rendering apparatus of the present embodiment, addresses with discrete values are assigned to the data stored in the respective local memories, and the values of the addresses become sequential when the addresses are arranged in the order of block IDs.

With this addressing, the assignment of addresses to the memories becomes easy, even when the number of blocks in the frame buffer is increased. For example, consider the case where a block BLK4 is added to the structure shown in FIG. 14. In this case, addresses in the local memories LM0 to LM3, which store the data of stamps S=0 to S=3 in the block BLK4, may be assigned successively following S=3 of block BLK3.

In the present embodiment, the addressing to the frame buffer has been described by way of example. However, in the structure of the second embodiment, similar addressing can be employed with respect to the memory spaces of the local memories in which texture data are to be stored. In particular, by employing the same addressing for the texture data, it becomes possible to directly use rendering results in a frame buffer as texture data.

Figure 17:
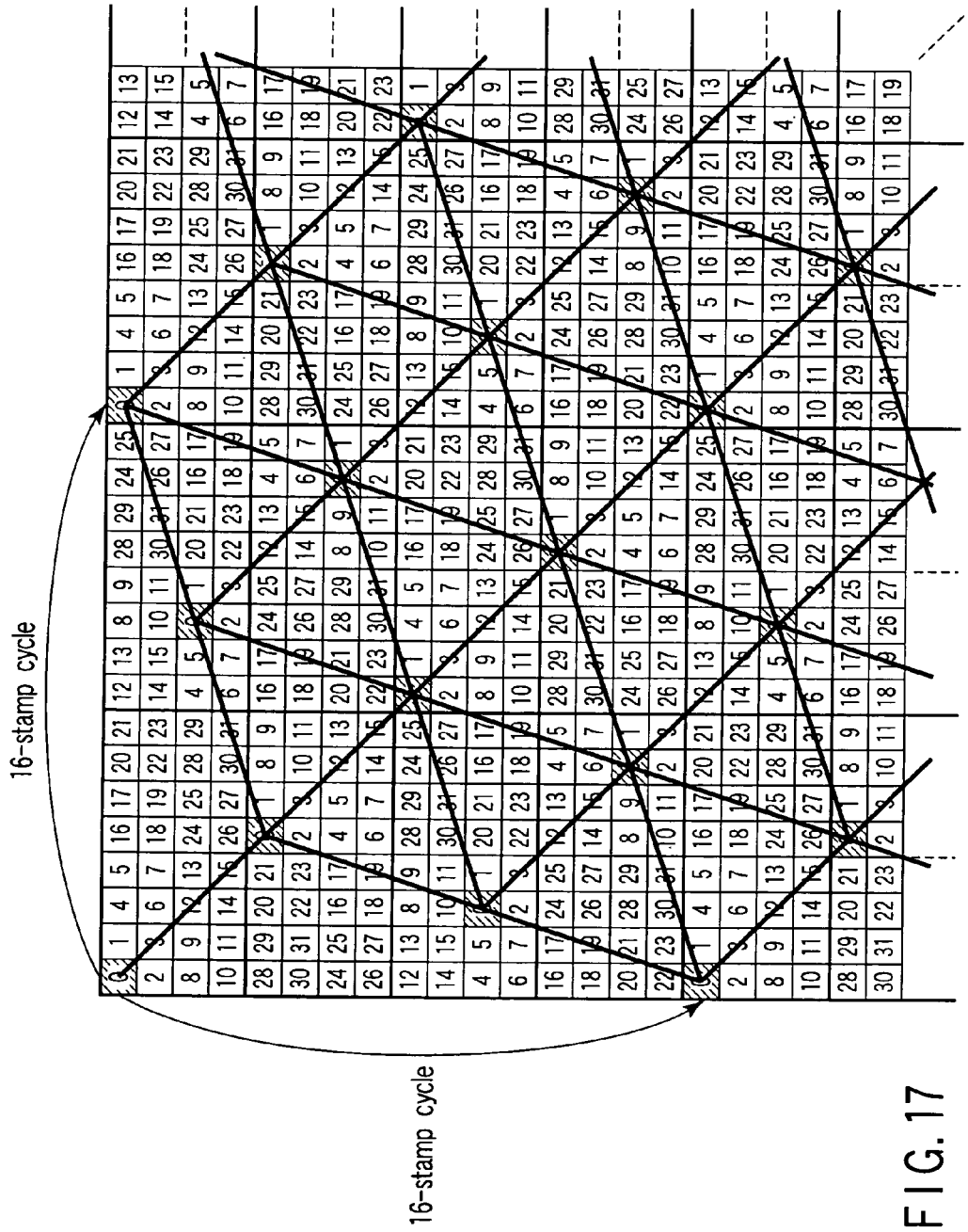
FIG. 17 is a conceptual view of a frame buffer in an image processing apparatus according to the fourth embodiment of the invention.

Next, a rendering apparatus according to the fourth embodiment of the present invention is described with reference to FIG. 2 and FIG. 17. This embodiment relates to a method of arranging stamps in the frame buffer in the structure according to the first and third embodiments. FIG. 17 is a conceptual view of a frame buffer according to the present embodiment.

The arithmetic process section 54 according to this embodiment includes 32 pixel processing units PPU0 to PPU31. That is, the arithmetic process section 54 includes 32 local memories LM0 to LM31. Thus, in the frame buffer, the number of stamps included in one block is 32. The stamps in one block are arranged in a matrix of (8×4).

Figure 18:
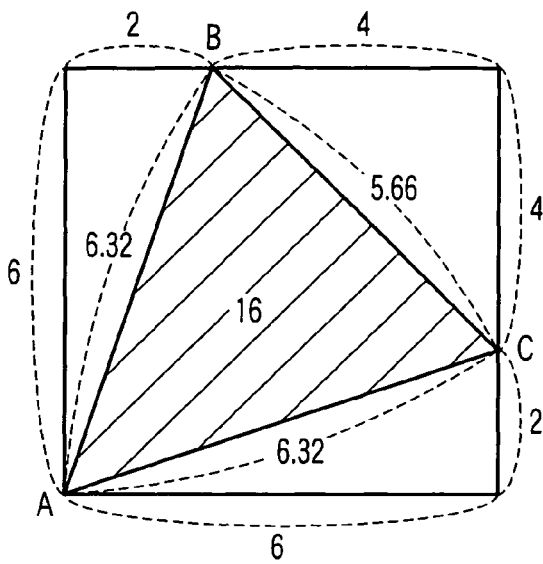
FIG. 18 is a conceptual view illustrating a method of stamp disposition in the image processing apparatus according to the fourth embodiment of the invention.

The stamps are arranged such that six proximate stamps around a given stamp which are rendered by the same pixel processing unit as the given stamp form a substantially regular hexagon. In other words, three proximate stamps which are rendered by the same pixel processing unit form a substantially regular triangle. FIG. 18 is a conceptual view that illustrates the disposition of stamps which are rendered by the same pixel processing unit.

As is shown in FIG. 18, when a group of (6×6) stamps is considered, three stamps that are rendered by the same pixel processing unit are positioned at point A, point B and point C. If the coordinates of the upper left corner of the stamp group is set at (0, 0), the coordinates of point A are (0, 6), the coordinates of point B are (2, 0) and the coordinates of point C are (6, 4). The arrangements of stamps in the vertical direction (Y direction) and in the horizontal direction (X direction) are repeated in the same fashion with a cycle of 16 stamps, as shown in FIG. 17. Thus, the number S[4:0] of a pixel processing unit is expressed by the following equation (3), using the lower 4 bits X [3:0] of the X coordinate and the lower 4 bits Y[3:0] of the Y coordinate of a stamp (here, the notation N[i] represents the ith least significant bit of N, and N[k:j] represents the jth through kth least significant bits of N):

$$S[0]=X[0]$$

$$S[1]=Y[0]$$

$$S[2]=(X[2] \text{ xor } !Y[1] \text{ and } Y[2]) \text{ or } (X[1] \text{ and } !Y[2])$$
$$\text{xor } X[3] \text{ xor } Y[3]$$

$$S[3]=(X[1] \text{ xor } !X[2] \text{ and } Y[2]) \text{ or } (X[1] \text{ and } !Y[2])$$
$$\text{xor } X[3] \text{ xor } Y[3]$$

$$S[4]=X[2] \text{ xor } Y[2] \quad (3)$$

where xor is the exclusive OR operation, ! is the logical NOT operation, or is the logical OR operation, and is the logical AND operation. The position corresponding to the stamp coordinates (X, Y)=(0, 0) is the upper left corner of the block. The relationship between stamp coordinates (X, Y) and block ID B is expressed by the equation (1) as described in connection with the third embodiment, and the relationship between stamp ID S, block ID B, and address A is expressed by the equation (2).

Figure 19:
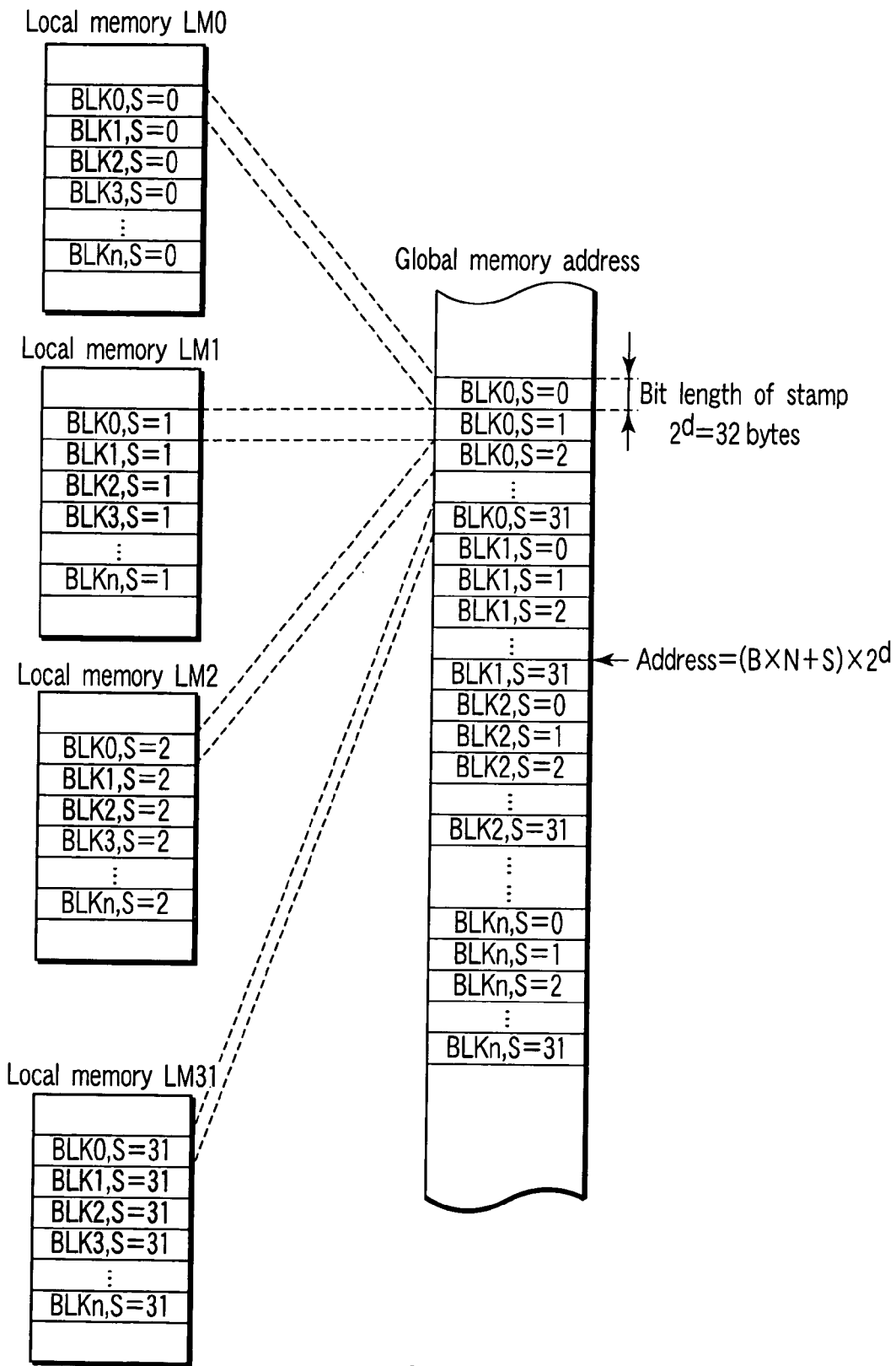
FIG. 19 is a conceptual view of the memory space in the local memory in the image processing apparatus according to the fourth embodiment of the invention.

FIG. 19 shows the relationship between the stamp data stored in the local memories LM0 to LM31 and the addresses assigned to the respective stamp data. As is shown in FIG. 19, the addresses of stamps that are rendered by the same pixel processing unit have discrete values.

In summary, the rasterizer 55 generates stamps on the basis of an input graphic. The rasterizer 55 delivers the generated stamps to the pixel processing units, which are selected by the equation (3), in accordance with the coordinates of the stamps. Then, the pixel processing units store the processed result at the addresses that are given by the equation (2).

The operation of the graphic processor 50 according to the present embodiment is the same as that in the first embodiment, which has been described with reference to FIG. 5. The difference from the first embodiment is that the stamps are disposed in the rendering area as shown in FIG. 17, and not as shown in FIG. 4. That is, the difference resides in the method by which the rasterizer 55 inputs stamps to the pixel processing units PPU0 to PPU31 according to the stamp coordinates. In the present embodiment, a plurality of stamps which are input to the same pixel processing unit are arranged equidistantly and isotropically in the rendering area. In other words, six proximate stamps around a given stamp which are input to the same pixel processing unit as the given stamp form a substantially regular hexagon.

According to the rendering apparatus with the above-described structure, the advantageous effects that have been described in connection with the first and third embodiments can be obtained. At the same time, the load can be distributed more uniformly, compared to the first embodiment. This point will be explained below in greater detail.

Consider the frame buffer is formed such that blocks, each of which is a set of stamps that are rendered by different pixel processing units, are arranged in a matrix, as shown in FIG. 4 in the first embodiment. In this case, the optimal arrangement of stamps is achieved when the proximate stamps that are rendered by the same pixel processing unit form a regular triangle. With this arrangement, the distance between the neighboring stamps which are rendered by the same pixel processing unit are maximized in all directions. That is, proximate stamps around a given stamp form a regular hexagon, and are arranged isotropically relative to the given stamp. As the given stamp becomes a vertex of each of the surrounding six regular triangles, the number of vertices is counted six-fold if it is counted by tripling the number of regular triangles. Thus, the number of stamps corresponding to the same pixel processing unit, which equals to the number of blocks in the frame buffer, is half the number of regular triangles. This means that one block is covered with two regular triangles. That is, the area of a regular triangle is half the area of a block. This relationship is expressed by the following equation (4):

$$\sqrt{3} \times (L^2/4) = w \cdot h/2 \qquad (4)$$

where L is the length of the side of a regular triangle, which corresponds to the ideal distance between neighboring stamps which are rendered by the same pixel processing unit. By solving equation (4) for L, the ideal distance L is expressed by the following equation (5):

$$L = \sqrt{(2 \cdot w \cdot h/\sqrt{3})} \qquad (5)$$

Thus, in the present embodiment, as shown in the equation (3) and FIG. 17 and FIG. 18, the pixel processing units are assigned such that three proximate stamps which are rendered by the same pixel processing unit are positioned at the apices of the substantially regular triangle. In the case where the number of stamps that are included in one block is (8×4), the lengths of the sides of the triangle that is formed by the proximate stamps which are rendered by the same pixel processing unit are 5.66, 6.32, and 6.32 (see FIG. 18). Exactly speaking, this triangle is not a regular triangle. However, in the case where one block comprises (8×4) stamps, if the lengths of the three sides of the triangle that is formed by stamps which are rendered by the same pixel processing unit are to be equalized as much as possible, the lengths of the three sides are set as mentioned above. In other words, it is considered that a substantially regular triangle is formed in the frame buffer in which one block includes (8×4) stamps. As a result, compared to the first embodiment, the lengths of the three sides become more uniform, and the six stamps around one stamp constitute a substantially regular hexagon. In other words, the stamps that are processed by the same pixel processing unit are arranged substantially equidistantly and isotropically. Hence, the stamps that are rendered by the same pixel processing unit are distributed so as to reduce non-uniformity in distribution on the frame buffer. As described above, the distances between the stamps that are processed by the same pixel processing unit become uniform. Thus, even when various shapes of graphics are rendered, the load on the pixel processing units can uniformly be distributed. As a result, the degree of parallelism in the pixel processing is enhanced, and the speed of graphic rendering can be increased.

Figure 20:
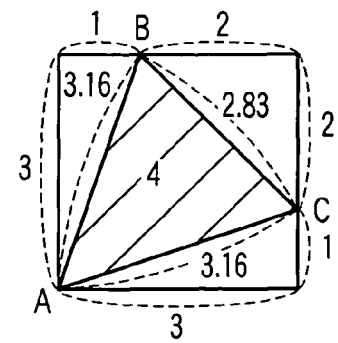
FIG. 20 is a conceptual view illustrating a method of stamp disposition in an image processing apparatus according to the first modification of the fourth embodiment of the invention.
Figure 21:
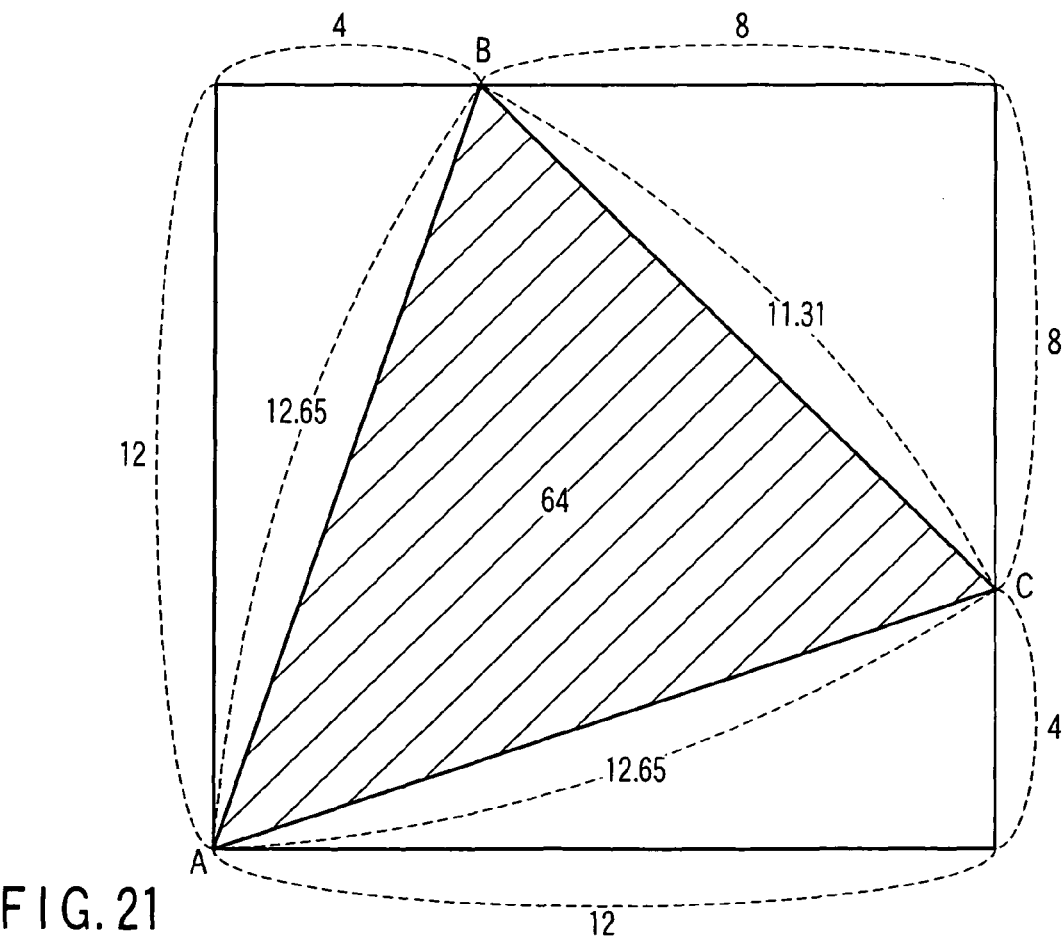
FIG. 21 is a conceptual view illustrating a method of stamp disposition in an image processing apparatus according to the second modification of the fourth embodiment of the invention.

As is shown in FIG. 18, the apex coordinates of the triangle that is formed by the stamps which are processed by the same pixel processing unit have even-number values. If the values of the apex coordinates are reduced to ½ in both the X direction and Y direction, the same stamp disposition as in the first embodiment can be realized even if the block size is (4×2) stamps and the number of pixel processing units is 8. FIG. 20 illustrates this stamp disposition. Conversely, a similar disposition can be obtained by scaling the apex coordinates by an integer-number. FIG. 21 shows a case in which the apex coordinates are made twice as large as in the case of the first embodiment. In this case, the block size is (16×8) stamps and the number of pixel processing units is 128. In this way, if the number of pixel processing units is $8j^2$ (j=natural number), the block size is set to be (4j×2j) stamps (or (2j×4j) stamps) and the same disposition as in the first embodiment can be applied.

Figure 22:
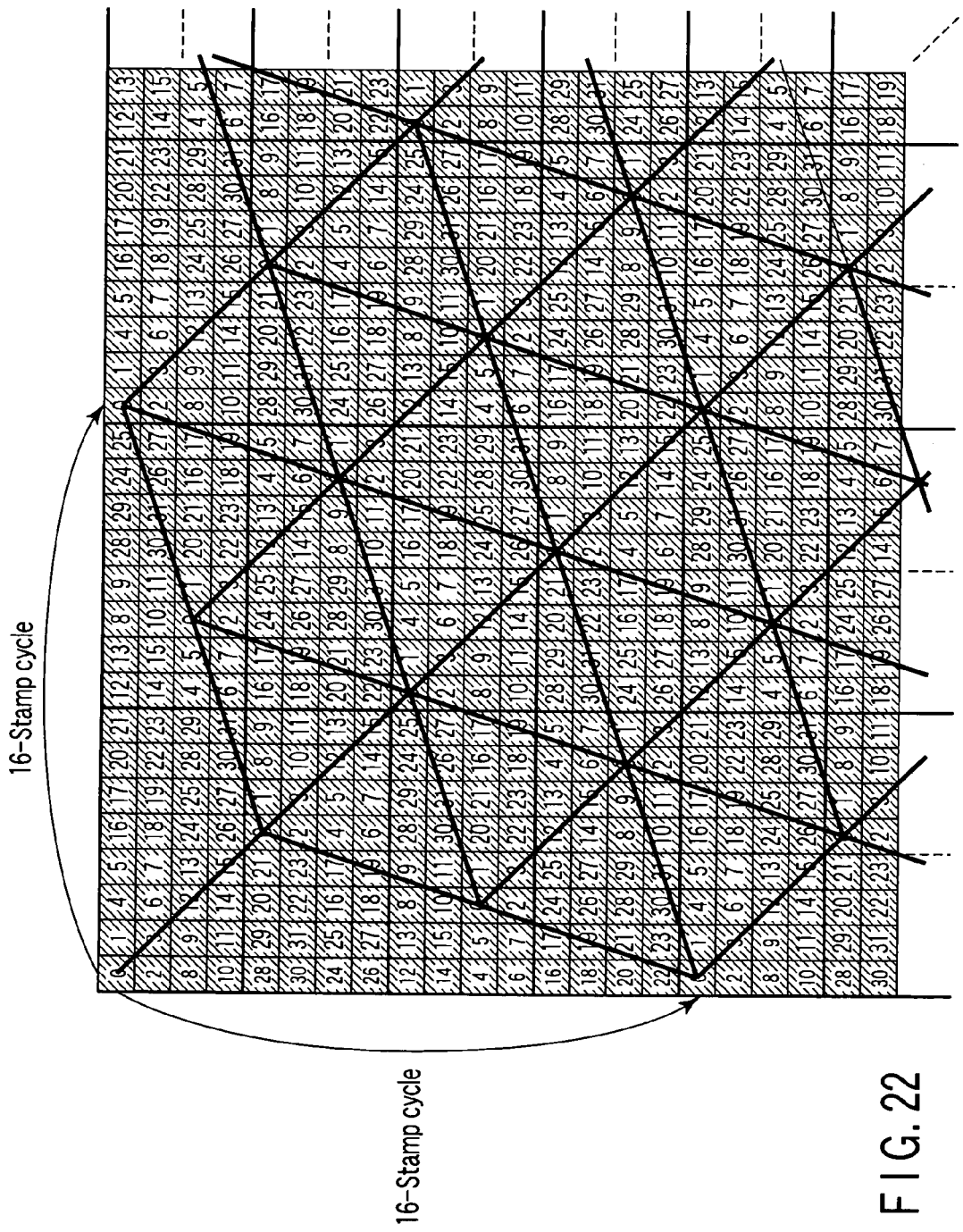
FIG. 22 is a conceptual view of texture data in an image processing apparatus according to the fifth embodiment of the invention.

Next, a rendering apparatus according to a fifth embodiment of the present invention is described with reference to FIG. 22. In this embodiment, the stamp disposition method of the fourth embodiment is applied to the texel disposition method of the second embodiment, and the method of the third embodiment is applied to the addressing of texture stamps. The structure of a graphic processor 50 that is included in an image rendering processor system LSI 10 of this embodiment is the same as the structure described in connection with the second embodiment with reference to FIG. 8, so a description thereof is omitted. Besides, the disposition of stamps in the frame buffer and the addressing of stamps in the frame buffer are the same as described in connection with the fourth embodiment. FIG. 22 is a conceptual view of a texture according to the present embodiment.

As is shown in FIG. 22, a texture block in the texture includes 32 texture stamps, and the texture stamps are disposed in a matrix of (8×4).

Like the stamps as described in connection with the fourth embodiment, the texture stamps are disposed such that six proximate texture stamps around a given texture stamp which are stored in the same local memory as the given texture stamp constitute a substantially regular hexagon. In other words, three mutually proximate texture stamps that are stored in the same local memory constitute a substantially regular triangle. That is, the texture stamps which are stored in the same local memory are substantially positioned equidistantly and isotropically. The disposition of the texture stamps stored in the same local memory is the same as shown in FIG. 18 in connection with the fourth embodiment. Accordingly, the relationship between the X coordinates and Y coordinates of texture stamps and the local memory numbers LM0 to LM31 is expressed by the equation (3).

The operation of the graphic processor 50 according to this embodiment is the same as the operation that has been described in connection with the second embodiment with reference to FIG. 10. The difference from the second embodiment is that the texture stamps in the image data are disposed, as shown in FIG. 22, and not as shown in FIG. 9. That is, the difference resides in the method by which texture stamps are stored in the local memories LM0 to LM31. In the present embodiment, a plurality of texture stamps which are stored in the same local memory are equidistant and isotropic in the image domain. In other words, six proximate texture stamps around a given texture stamp which are stored in the same local memory as the given stamp form a substantially regular hexagon.

According to the rendering apparatus of this embodiment, the advantageous effects as described in connection with the second and third embodiments can be obtained. At the same time, compared to the second embodiment, the local memories can be accessed more uniformly. This has already been described in connection with the stamps in the fourth embodiment. That is, the lengths of the three sides of the triangle which is formed by the texture stamps stored in the same local memory are equalized as much as possible. Accordingly, it can be considered that in the texture in which one texture block includes (8×4) texture stamps, three proximate texture stamps form a substantially regular triangle. As a result, compared to the second embodiment, the lengths of the three sides become more uniform, and six texture stamps around one texture stamp are isotropically arranged so as to form a substantially regular hexagon. Thus, the texture stamps that are stored in the same local memory are distributed uniformly on the texture. In this manner, the distances between the texture stamps that are stored in the same local memory become uniform. Hence, even for various scanning directions of texture data due to the rotation of a graphic, the local memories are accessed uniformly. This point will be described below.

When a graphic is rendered, stamps are processed, for example, in the order of block IDs. Specifically, in FIG. 3, rendering is successively executed in the horizontal direction. On the other hand, when texture mapping is executed, texels to be added to pixels are not always read out in the order of block IDs. When a texture is rotated relative to a graphic on the frame buffer, texels are read out regardless of block IDs. For example, if a texture to be added is rotated by 90° relative to a graphic on the frame buffer, the texture is vertically scanned while the frame buffer is horizontally scanned.

According to the structure of this embodiment, however, the texels that are stored in the same local memory are isotropically disposed. It is thus possible to avoid concentration of the access to texels stored in a specific local memory, which would occur due to rotation of the graphic. As a result, high-speed texture mapping is realized.

Next, a rendering apparatus according to the sixth embodiment of the present invention is described. This embodiment relates to a method for storing stamp data and texture stamp data in the local memories in the fourth and fifth embodiments. FIG. 23 is a conceptual view of a memory space in the local memory.

In this embodiment, as shown in FIG. 23, one stamp data may take a plurality of data widths. The data widths which the stamp data may take are $2^k=1, 2, 4, 8, \ldots$, and $2^d$ bytes (k and d are natural numbers; k may vary from 0 to d). In the case where the start address of the memory area that stores the stamp data is "0000", if the data width of the stamp data is 32 bytes (k=5), the byte-unit addresses in the memory space occupied by one stamp data are "0000" to "001F". If the data width is 16 bytes (k=4), the byte-unit addresses are "0000" to "000F". If the data width is 8 bytes (k=3), the byte-unit addresses are "0000" to "0007".

In this embodiment, addresses are assigned to the local memory in accordance with the maximum data width that can be taken by one stamp data. Specifically, as shown in FIG. 24, if the maximum data width of one stamp data is $2^d$ bytes, each local memory includes a plurality of $2^d$-byte memory spaces to which successive addresses are assigned. For example, if the maximum data width of the stamp data is 32 bytes, each local memory retains memory spaces in units of 32 bytes, and successive addresses are assigned to each memory space. In the description below, the $2^d$-byte memory area with successive addresses is referred to as "unit memory area UR" for the purpose of convenience.

Figure 25:
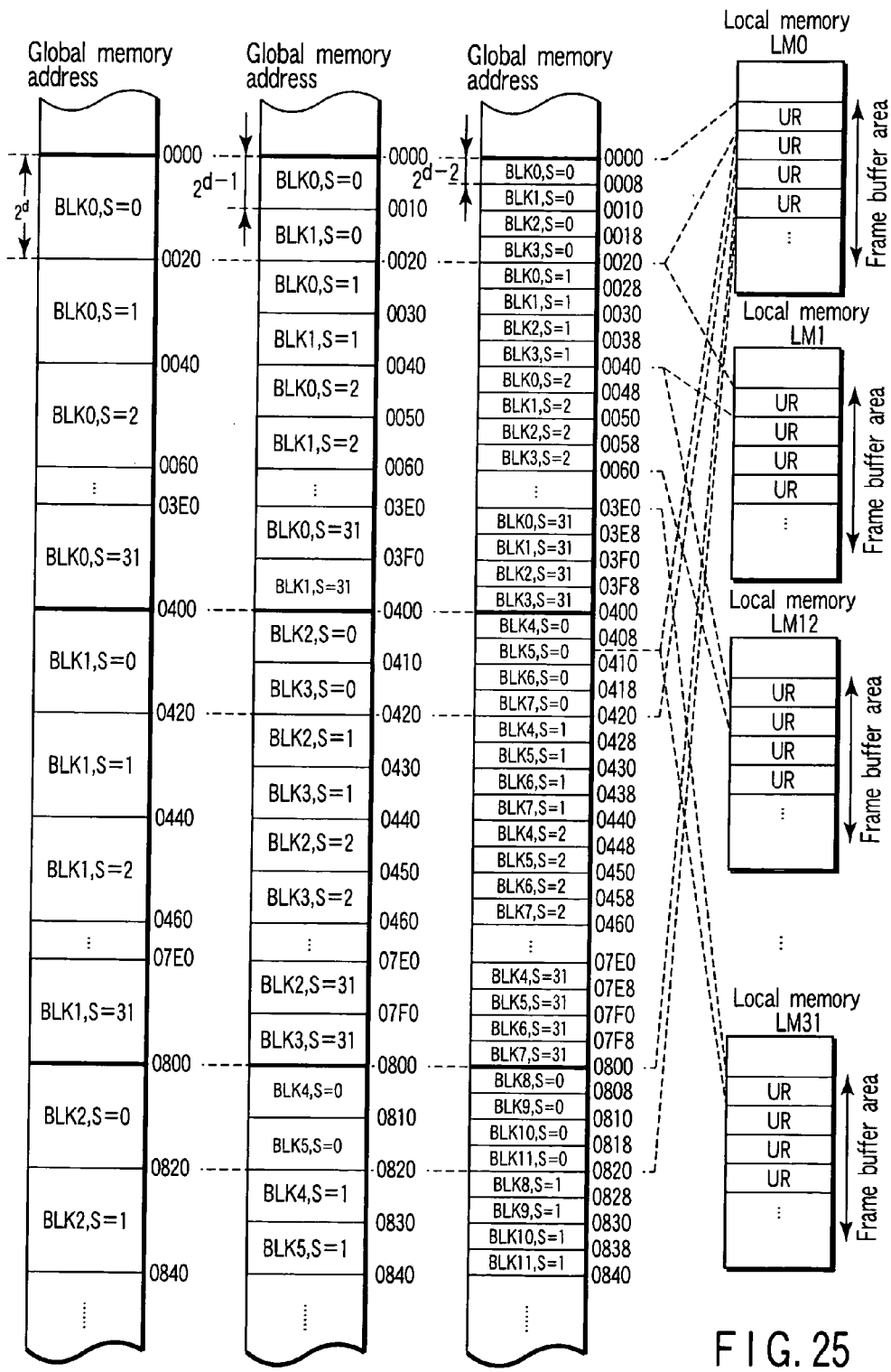
FIG. 25 is a conceptual view of the memory space in the local memory in the image processing apparatus according to the sixth embodiment of the invention.

Next, referring to FIG. 25, a description is given of the actual method for storing stamp data in the case where addresses are assigned to the local memory as shown in FIG. 24.

As mentioned above, in the local memory, successive addresses are assigned to each $2^d$-byte memory area (unit area UR). Assume now that the maximum data width of one stamp is 32 bytes. Then, addresses that are assigned to the unit area UR in each local memory are (beginning address of this unit area UR) to (beginning address+"001F").

In the case where the stamp data width is a maximum possible value of $2^d=32$ bytes (k=5), one stamp data is stored in one unit area UR, as shown in FIG. 25. This is the same as has been described in connection with the third embodiment. Specifically, stamp data are stored in the order of block IDs in the unit areas UR of the respective local memories. Although the addresses are successive in each unit area UR, the addresses are discrete among the unit areas UR in each local memory.

Next, assume that the data width of stamp data is $2^{d-1}=16$ bytes (k=4). In this case, as shown in FIG. 25, two stamp data are stored in the order of block IDs in the unit area UR. Needless to say, successive addresses are assigned within each unit area UR. In the example shown in FIG. 25, stamp data that are processed by the pixel processing unit PPU0 in the blocks BLK0 and BLK1 are stored in the first unit area UR in the local memory LM0. Stamp data in the blocks BLK2 and BLK3 are stored in the next unit area UR in the local memory LM0.

Next, assume that the data width of stamp data is $2^{d-2}=8$ bytes (k=3). In this case, as shown in FIG. 25, four stamp data are stored in the order of block IDs in the unit area UR. Needless to say, successive addresses are assigned within each unit area UR. In the example shown in FIG. 25, stamp data that are processed by the pixel processing unit PPU0 in the blocks BLK0 to BLK3 are stored in the first unit area UR in the local memory LM0. Stamp data in the blocks BLK4 to BLK7 are stored in the next unit area UR in the local memory LM0.

In the case where the data width of stamp data is $2^{d-3}=4$ bytes (k=2), eight stamp data are stored in the order of block IDs in the unit area UR. In the case where the data width of stamp data is $2^{d-4}=2$ bytes (k=1), 16 stamp data are stored in the order of block IDs in the unit area UR. In the case where the data width of stamp data is $2^{d-5}=1$ byte (k=0), 32 stamp data are stored in the order of block IDs in the unit area UR.

In short, the addresses are assigned to the local memory with reference to a predetermined maximum data width of stamps. Even when the data width of a stamp varies, the assignment of addresses to the local memory will be unchanged. Instead, in the case where the data width is smaller than the predetermined width, a plurality of stamp data, which are taken out of neighboring blocks, are combined ("packed") to have the maximum width, and then stored in the local memory. For example, when the data width is $2^{d-1}$, i.e. ½ of the maximum width, two stamps in neighboring two blocks which are processed by the same pixel processing unit are packed and stored in the local memory as $2^d$-byte data.

As a result, addresses are assigned to the memory spaces of the local memories LM0 to LM31, as shown in FIG. 26. In the case where the stamp data width takes the maximum value (32 bytes, for example, conforming to the above example), the addresses are assigned in the same manner as in the third embodiment.

In the case where the stamp data width is 16 bytes, stamp data in the blocks BLK0 and BLK1 are stored in the unit area UR with successive addresses in the local memory LM0, and the addresses are "0000" to "000F", and "0010" to "001F". Stamp data in the blocks BLK2 and BLK3 are stored in the unit area UR with addresses which are not successive to the addresses in the unit area UR that stores the stamp data in the blocks BLK0 and BLK1, and these addresses are "0400" to "040F", and "0410" to "041F". Subsequently, stamp data are stored in units of two blocks in the associated unit areas UR with successive addresses. Needless to say, the addresses between the unit areas are not successive.

In the case where the stamp data width is 8 bytes, stamp data in the blocks BLK0 to BLK3 are stored in the unit area UR with successive addresses in the local memory LM0, and these addresses are "0000" to "0007", "0008" to "000F", "0010" to "0017" and "0018" to "001F". Stamp data in the blocks BLK4 to BLK7 are stored in the unit area UR with addresses which are not successive to the addresses in the unit area UR that stores the stamp data in the blocks BLK0 to BLK3, and these addresses are "0400" to "0407", "0408" to "040F", "0410" to "0417" and "0418" to "041F". Subsequently, stamp data are stored in units of four blocks in the associated unit areas UR with successive addresses. Needless to say, the addresses between the unit areas are not successive.

In the case where stamp data are stored in the local memories by the above method, the memory address A of each stamp is expressed by the following equation (6):

$$A=((B/2^{d-c})\times N+S)\times 2^d+(B \bmod 2^{d-c})\times 2^c \quad (6)$$

where $2^d$ is a maximum stamp data width, $2^c$ is the data width of a stamp of interest, and mod is the remainder arithmetic operation.

In summary, the rasterizer 55 generates stamps on the basis of an input graphic. The rasterizer 55 delivers the generated stamps to the pixel processing units which are selected by the equation (3) in accordance with the coordinates of the stamps. Then, the pixel processing units store the processed result at the addresses that are given by the equation (6). The address that is given by the equation (6) varies depending on the stamp data width.

As has been described above, according to the rendering apparatus of this embodiment, the local memories are addressed in an interleaving fashion with the maximum width of the stamp data. In the case where the stamp data width is less than the maximum width, a plurality of stamps are packed to have the maximum data width and then stored in the local memory, and successive addresses are assigned to the plural stamp data. As a result, the addresses depend not only on the coordinates of stamps but also on the data width. This means that the method for storing stamps in the local memories is altered in accordance with the data width, without changing the assignment of addresses to the local memories.

As a result, the load on the pixel processing units is uniformly distributed, as described in connection with the first and third embodiments, and at the same time, a plurality of pixel data widths can be supported while address areas that are assigned to the local memories in association with the pixel processing units are fixed. Hence, the degree of freedom in the rendering operations is enhanced.

The above-described embodiment is directed to the case where stamp data are stored in the local memories. Needless to say, this embodiment is applicable to the case of texture stamps.

Next, a rendering apparatus according to the seventh embodiment of the invention is described. In this embodiment, texture caches are provided in the texture units in the sixth embodiment, and a plurality of texel data are read out to the texture caches. FIG. 27 is a block diagram of a graphic processor 50 that is included in an image rendering processor system LSI 10 according to the present embodiment.

As is shown in FIG. 27, in the graphic processor 50 according to this embodiment, the texture unit TU further includes a texture cache TC, in addition to the structure described in the second embodiment. The texture cache TC temporarily stores texture stamp data that is read out of the local memory, LM0 to LM31.

Figure 28:
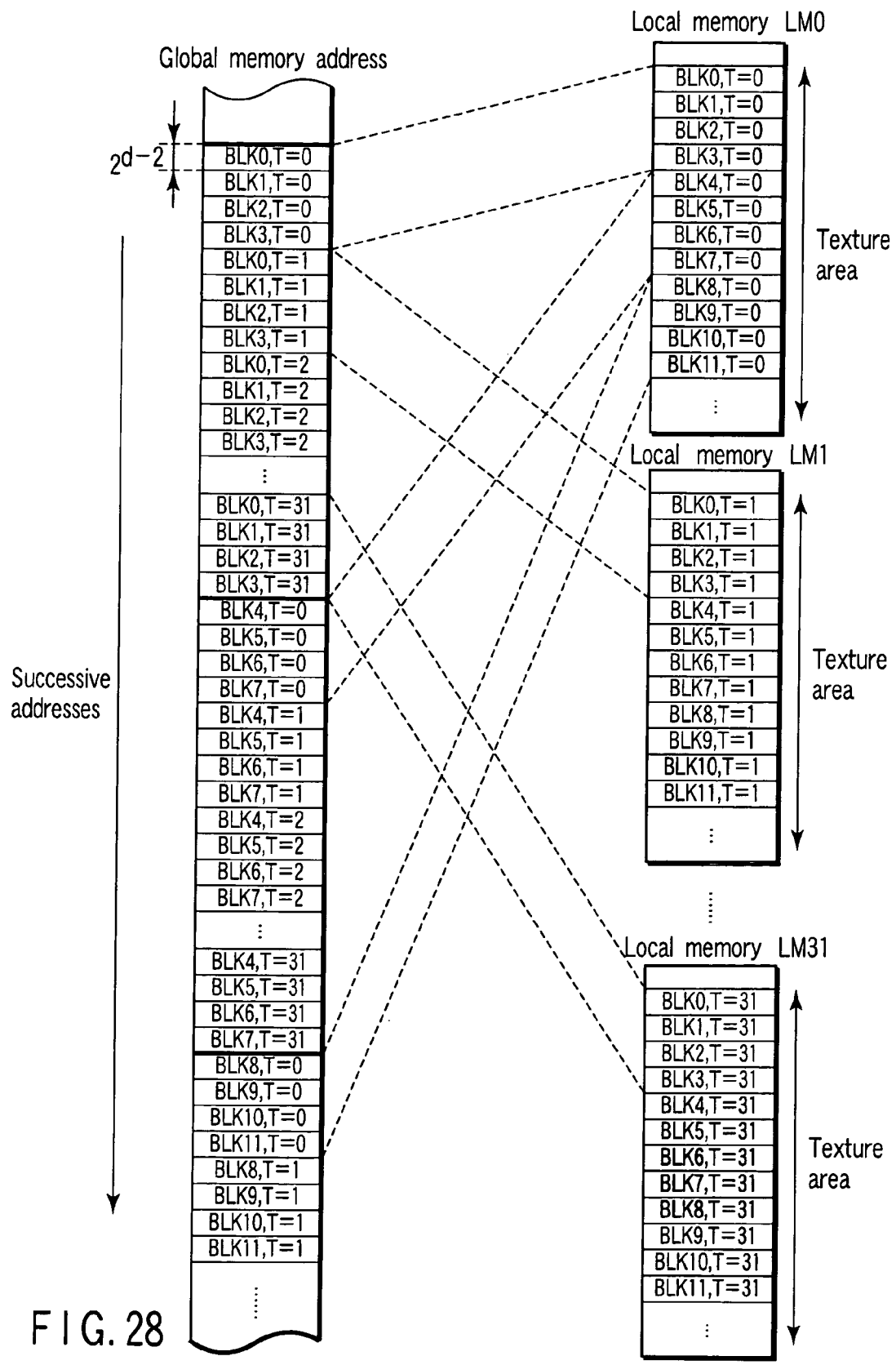
FIG. 28 is a conceptual view of a memory space in a local memory in the image processing apparatus according to the seventh embodiment of the invention, FIG. 28 illustrating a scheme of storing texture data.

The disposition of stamps on the frame buffer in this embodiment is the same as described in connection with the fourth embodiment, for example, as shown in FIG. 17. In addition, the disposition of texture stamps is the same as described in connection with the fifth embodiment, for example, as shown in FIG. 22. Further, the addressing in the local memories with respect to areas which store texture stamp data is the same as described in connection with the sixth embodiment. FIG. 28 is a conceptual view of the memory space in the local memories.

As shown in FIG. 28, the local memories LM0 to LM31 are addressed in an interleaving fashion with $2^d$ bytes, which are the maximum data width of a texture stamp. In the example shown in FIG. 28, the data width of one texture stamp data is $2^{d-2}$ bytes. Thus, successive addresses are assigned to four texture stamps that are stored in the same local memory.

Figure 29:
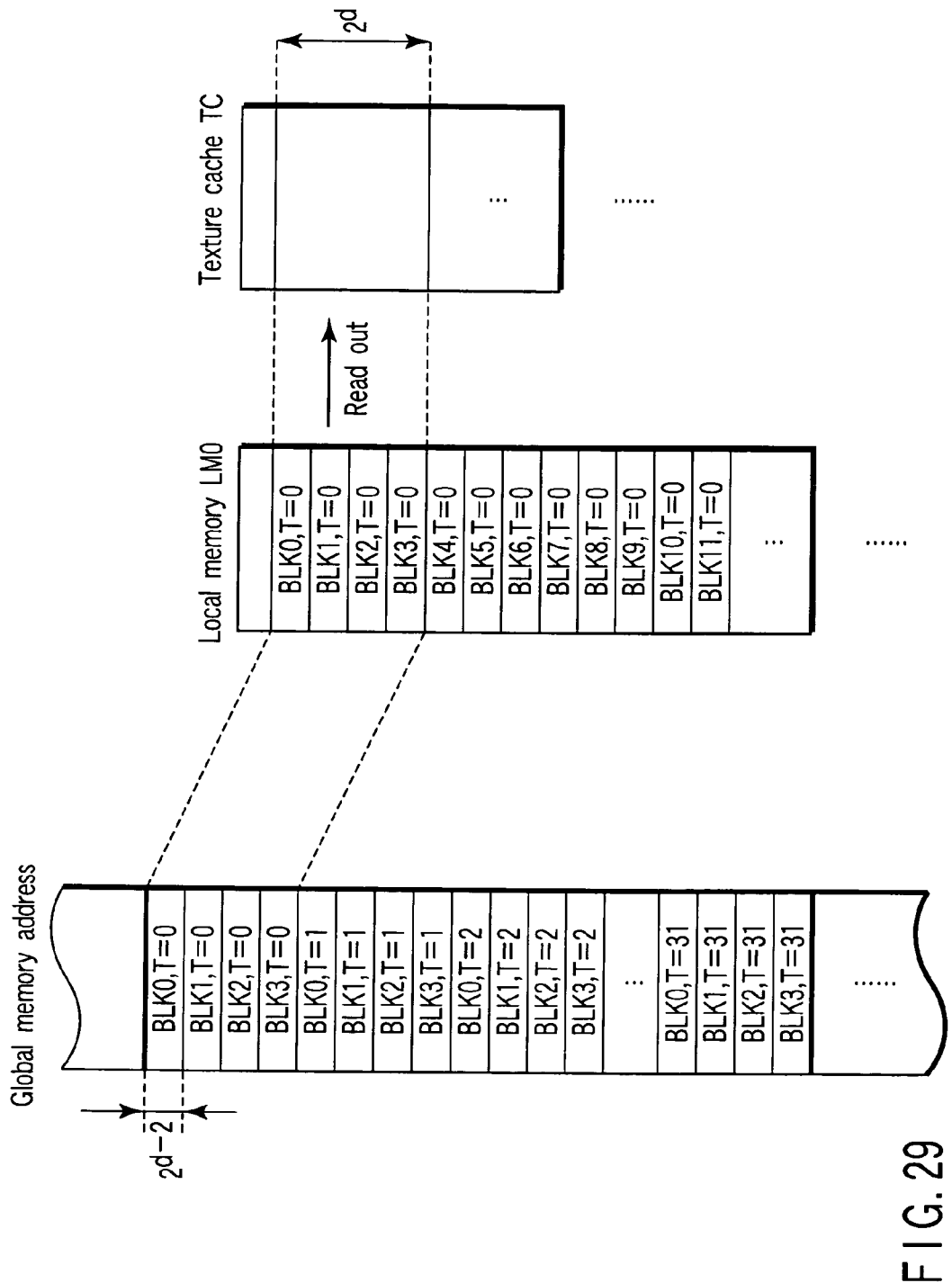
FIG. 29 is a conceptual view of memory spaces in a local memory and a texture cache in the image processing apparatus according to the seventh embodiment of the invention, FIG. 29 illustrating a scheme of reading out texel data from the local memory to the texture cache.

In the above structure, when texture mapping is executed, the read-out circuit RC in the signal processing section, 56-0 to 56-31, stores texture stamp data, which is read out of the local memory, LM0 to LM31, in the texture cache TC. FIG. 29 illustrates, for example, a scheme of reading out texture stamp data from the local memory LM0.

As is shown in FIG. 29, the read-out circuit RC reads out texture stamp data in units of a predetermined size with successive addresses, called "cache line size". For example, assume that the cache line size is $2^d$ bytes. Then, if the texture stamp data width is $2^{d-2}$, as shown in FIG. 28, four texture stamps are read in the texture cache TC as shown in FIG. 29. If the texture stamp data width is $2^{d-3}$ bytes, successive addresses are assigned to eight texture stamps. Thus, in this case, eight texture stamps are read out to the texture cache at a time.

According to the above structure, texture mapping can efficiently be executed and the load on the pixel processing units can be reduced, in addition to the advantageous effects of the sixth embodiment. This point will be explained below.

In many cases, texture mapping is executed e.g. by MIP mapping, so that the ratio between the pixel size and the texel size becomes close to 1:1, from the standpoint of reduction of aliasing. In this case, by applying the same addressing to the frame buffer and texture, the hit ratio of the texture cache can be increased. If the frame buffer and texture are addressed in the same fashion, the disposition of texture stamps on the texture which are stored in the same local memory substantially agrees with the disposition of stamps on the frame buffer which are processed by the same pixel processing unit.

Assume now that the frame buffer is structured as shown in FIG. 17, and the texture is structured as shown in FIG. 22. The disposition of stamps in the frame buffer is substantially the same as the disposition of texture stamps in the texture. In other words, in the frame buffer, six proximate stamps which are positioned around a given stamp and are processed by the same pixel processing unit as the given stamp constitute a substantially regular hexagon. In addition, in the texture, six proximate texture stamps which are positioned around a given texture stamp and are stored in the same local memory as the given texture stamp constitute a substantially regular hexagon.

Assume that the pixel processing unit PPU0 processes its own assigned stamp (S=0) and requests, at that time, a texture stamp (T=21) that is stored in the local memory LM21. In this embodiment, a plurality of texture stamps are read out at a time. Thus, a plurality of texture stamps (T=21), which are stored in the local memory LM21, are stored in the texture cache TC of the signal processing unit 56-0 that is included in the pixel processing unit PPU0. That is, texture stamps included in a plurality of texture blocks other than the texture block corresponding to the stamp being processed are also read out at the same time. Then, consider the stamp which is to be processed subsequently by the pixel processing unit PPU0, which is likely to be in the vicinity of the first processed stamp. Since the disposition of stamps in the frame buffer and that of texture stamps in the texture are substantially the same, it is highly likely that the texture stamp that the pixel processing unit PPU0 subsequently requests while it processes the next stamp is also stored in the local memory LM21, when the ratio between the pixel size and the texel size is about 1:1. In other words, it is highly likely that this texture stamp data is already read out to the texture cache TC of the signal processing unit 56-0 in the preceding process. It is thus highly likely that the texture stamp data that is to be requested subsequently by the pixel processing unit PPU0 is already stored in the texture cache TC (i.e. hit). In this case, the pixel processing unit PPU0 does not need to read out the texture stamp from the local memory LM21. Therefore, high-speed texture mapping can be executed.

How many proximate texture stamps are stored in the texture cache by a single texture access (i.e. read-out of texture stamp data from the local memory to the texture cache) depends on the texture stamp data width, the cache line size that is handled by the texture cache TC at a time, and the disposition of blocks on the texture. Thus, all six proximate texture stamps of a specified texture stamp, that is, all texture stamps around a specified texture stamp which form a hexagon are not always read out. In addition, the disposition of texture stamps and that of stamps are not always completely identical. That is, if the number (0 to 31) of the pixel processing unit that processes the associated stamp does not agree with the number (0 to 31) of the local memory that stores the texture stamp that is to be added to this stamp, there may be cases where the disposition of stamps differs from the disposition of texture stamps. Further, since textures are rotated and mapped in accordance with the rotation angle of graphics in general, even if the disposition of stamps agrees with the disposition of texture stamps, the dispositions are displaced due to rotation and thus the texture stamp at the same position as the stamp may not be added to the stamp. According to the present embodiment, however, both the disposition of stamps and the disposition of texture stamps are isotropic as much as possible, and thus the influence due to such positional displacement can be minimized.

Figure 30:
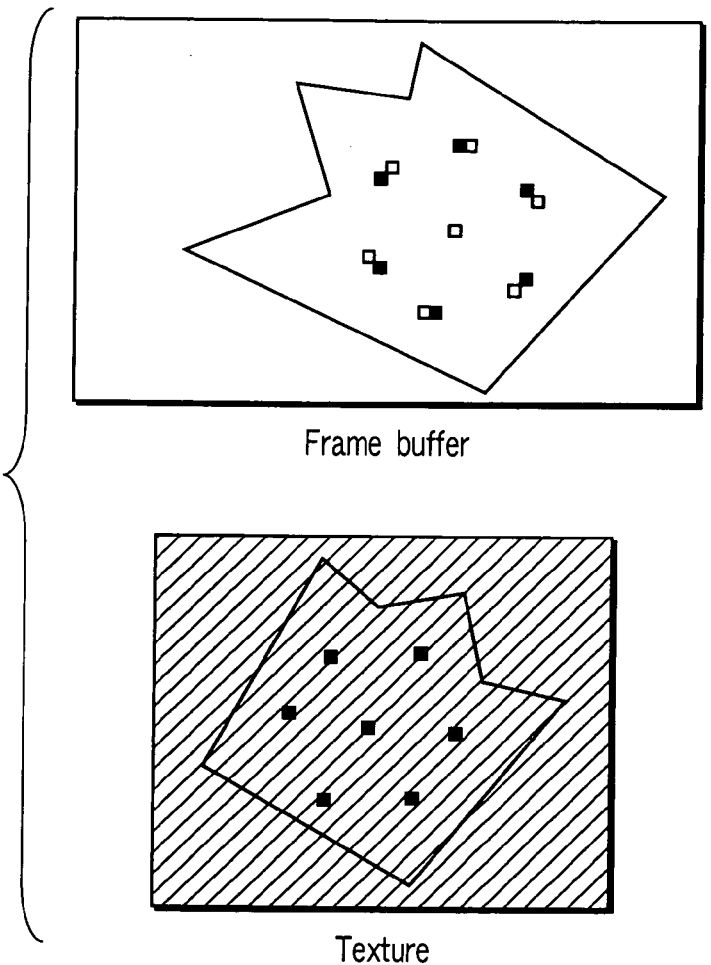
FIG. 30 is a conceptual view of a frame buffer and texture data in the image processing apparatus according to the seventh embodiment of the invention.

Rather, as shown in FIG. 30, when a texture is rotated and mapped, it can happen that the disposition of stamps becomes closer to the disposition of texture stamps. In FIG. 30, white squares in the frame buffer indicate the stamps that are processed by the same pixel processing unit, and black squares in the texture indicate the texture stamps that are read out to the texture cache when any one of the stamps is to be processed. Black squares in the frame buffer indicate the positions of the stamps to which the texture stamps that are read out to the texture cache are to be added. Thus, even if the number of the pixel processing unit differs from the number of the local memory that stores the texture stamp in addition to the influence of the rotational angle, a positional displacement which is greater than is caused by either of these effects will not occur. Rather, the displacement in disposition may become smaller.

In the present embodiment, there is no relation between the stamp data width and the texture stamp data width. It is possible, therefore, to add a texture with a texel data width different from a pixel data width. Thus, the description relating to the texture caches does not depend on the pixel data width of the frame buffer.

Figure 31:
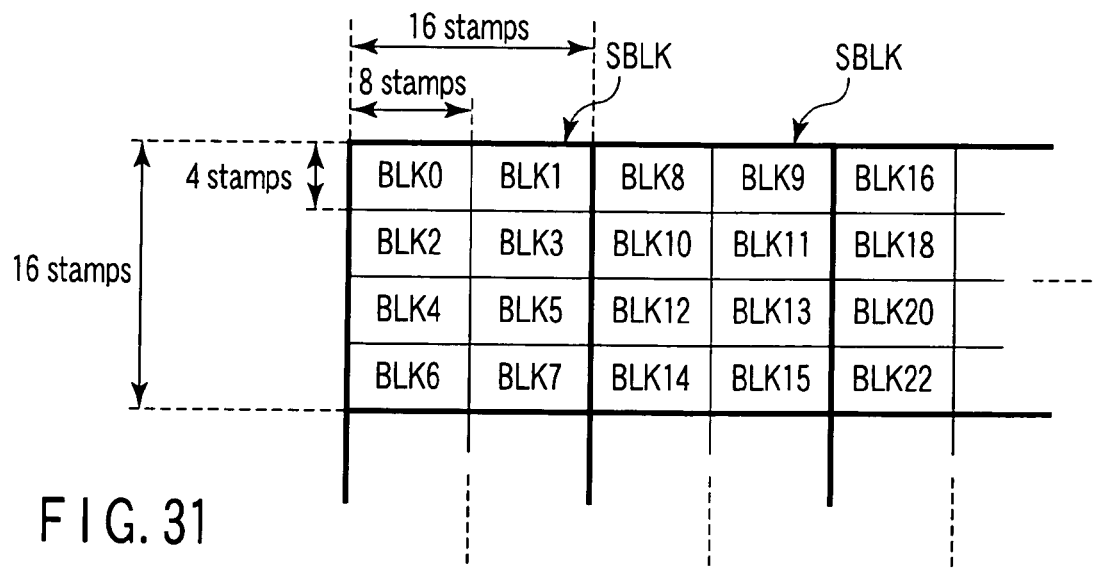
FIG. 31 is a conceptual view of a frame buffer in an image processing apparatus according to the eighth embodiment of the invention.

Next, a rendering apparatus according to the eighth embodiment of the present invention is described. In this embodiment, a predetermined number of blocks in the seventh embodiment are grouped into a rectangular unit (hereinafter referred to as "super-block"). FIG. 31 is a conceptual view of a frame buffer according to this embodiment.

As is shown in FIG. 31, a super-block SBLK includes (2×4) blocks. IDs are assigned in ascending order to the eight blocks within the super-block SBLK from the upper left to the lower right. Such super-blocks SBLK are arranged in the frame buffer in raster order.

As has been described above in connection with the fourth embodiment, the same arrangement of stamps is repeated at a cycle of 16 stamps in the vertical and horizontal directions. Accordingly, each super-block has the same disposition of stamps. The relationship between the block ID and the stamp coordinates (X, Y) is given by the following equation (7):

$$B=(X/pw+(Y/ph)\times(fw/pw))\times nw \times nh+(bX/w+(bY/h)\times nw)$$

where $bX=X \bmod pw$ $bY=Y \bmod ph$ $nw=pw/w$ $nh=ph/h$ (7)

In equation (7), pw is the number of stamps in a super-block in the X direction, and ph is the number of stamps in a super-block in the Y direction.

With the structure according to this embodiment, a cache hit ratio can be made higher than in the seventh embodiment. In this embodiment, the hexagonal structure of stamps which are processed by the same pixel processing unit is, in general, formed by blocks with more proximate IDs than the case where block IDs are assigned simply in raster order as in the seventh embodiment. Then, as is clear from the equation (6), the addresses of these stamps become closer. Hence, when this addressing is applied to texture stamps, it is more likely that texture stamps which are read out to the texture cache TC at the same time as a specified texture stamp is read out include many of the texture stamps that form a hexagon around the specified texture stamp. As a result, the cache hit ratio is increased.

It is preferable not to use rasterizing methods in which horizontal scan is continued without changing scan lines until reaching the boundary of a graphic, but to use rasterizing methods in which scan is executed on a super-block-by-super-block basis, that is, a method in which the inside of each super-block is successively scanned. In this case, stamps that are processed after the stamp for which the first texture stamp is requested include many of the stamps that form a hexagon around the stamp that has been processed immediately before. Thus, the cache hit ratio is further increased.

The present embodiment is directed to the case where the number of pixel processing units is 32, for instance. Since the arrangement of stamps is repeated at a cycle of 16 stamps, the size of a super-block, too, is (16×16) stamps. However, the number of pixel processing units is not limited to 32, and it should suffice if the size of a super-block agrees with the repetition cycle of stamps. More broadly speaking, the size of a super-block need not necessarily agree with the repetition cycle of stamps. It is desirable, however, that each super block include at least one hexagon of stamps that are processed by the same pixel processing unit.

Next, a rendering apparatus according to the ninth embodiment of the invention is described. In this embodiment, the arrangement of stamps in the block in the fourth to seventh embodiments is altered.

An arithmetic process section 54 of a graphic processor 50 according to the present embodiment has the same structure as the structure described with reference to FIG. 2, FIG. 8 and FIG. 27, and the number of pixel processing units is 32. The structure of the frame buffer will be described below with reference to FIG. 32.

Figure 32:
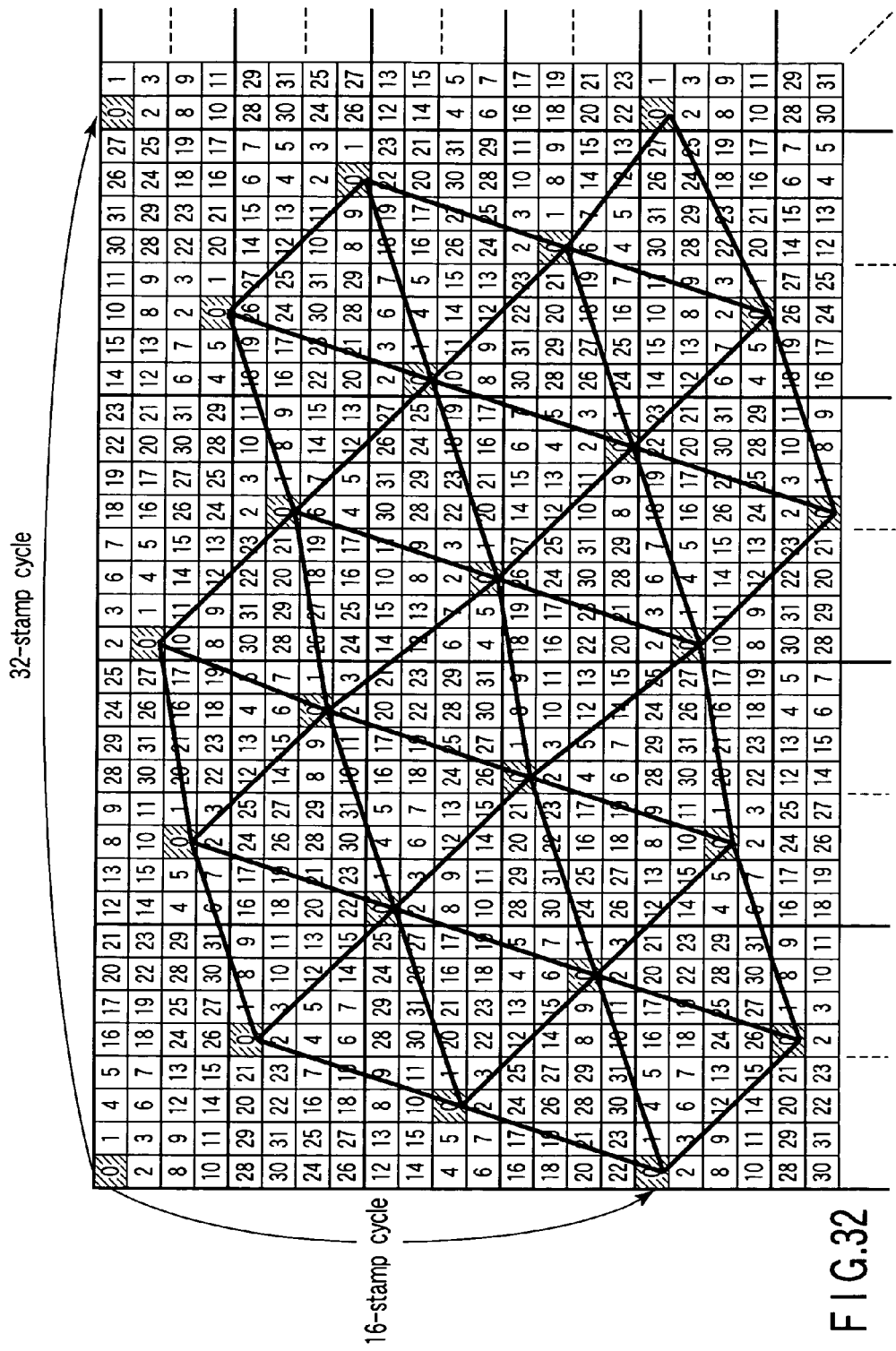
FIG. 32 is a conceptual view of a frame buffer in an image processing apparatus according to the ninth embodiment of the invention.

Two stamp groups each comprising (16×16) stamps, as shown in FIG. 17, are horizontally arranged. In one of the two stamp groups, the assignment of pixel processing units which process pairs of vertically neighboring stamps, that is, pairs of stamps with the same X coordinate and with Y=2i and Y=2i+1 (i=natural number) is transposed. Then, as shown in FIG. 32, like the fourth embodiment, six proximate stamps around a given stamp which are processed by the same pixel processing unit as the given stamp form a substantially regular hexagon. The inside of the frame buffer is covered with such substantially regular hexagons.

Figure 33:
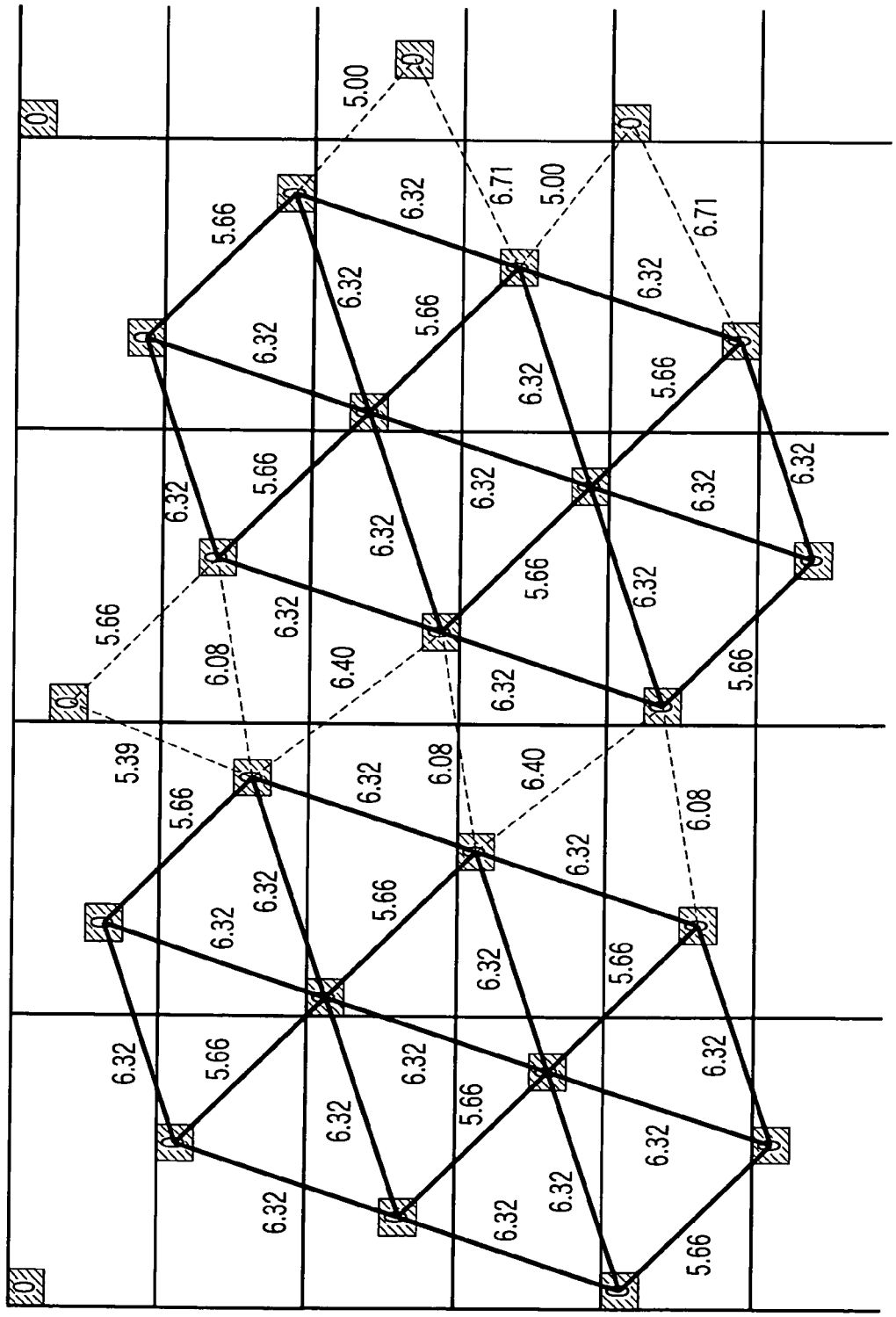
FIG. 33 is a conceptual view of the frame buffer in the image processing apparatus according to the ninth embodiment of the invention.

The difference from the fourth embodiment is that all the triangles included in a hexagon which is formed by six proximate stamps are not necessarily congruent with each other. The substantially regular hexagons shown in FIG. 17 are formed so as to extend over two neighboring columns of blocks, as shown by the bold lines in FIG. 33. However, there are sides of different lengths as shown by the dotted lines in FIG. 33, although the inside of the frame buffer is covered with substantially regular hexagons. The triangles included in the substantially regular hexagons shown in FIG. 17 are as shown in FIG. 18. However, the sides between the horizontal neighboring hexagons which are formed of only triangles with three sides (6.32, 6.32, 5.66) have different lengths. These lengths are, for instance, 6.40, 6.08, 5.39, 5.00, and 6.71 as shown by the dotted lines in FIG. 33. To be more specific, three triangles shown in FIG. 34 are further included.

That is, three triangles which have apex coordinates (0, 5), (2, 0) and (6, 4), apex coordinates (0, 6), (2, 0) and (6, 5), and apex coordinates (0, 6), (2, 0) and (6, 3), respectively, are included.

The same arrangement of stamps is repeated at a cycle of 32 stamps in the horizontal direction and at a cycle of 16 stamps in the vertical direction. As a result, the number S [4:0] of a pixel processing unit is given by the following equation (8), using the lower 5 bits X [4:0] of the X coordinate and the lower 4 bits Y [3:0] of the Y coordinate of a stamp:

$S[0]=X[0]$ $S[1]=Y[0] \text{ xor } X[4]$ $S[2]=(X[2] \text{ xor } !Y[1] \text{ and } Y[2]) \text{ or } (X[1] \text{ xor } !Y[2])$
$\quad \text{xor } X[3] \text{ xor } Y[3]$ $S[3]=(X[1] \text{ xor } !X[2] \text{ and } Y[2]) \text{ or } (Y[1] \text{ xor } !Y[2])$
$\quad \text{xor } X[3] \text{ xor } Y[3]$ $S[4]=X[2] \text{ xor } Y[2]$ \hfill (8)

According to the structure of this embodiment, the advantageous effects of the third to eighth embodiments can be obtained, and it is possible to improve the processing efficiency in the case of rendering a relatively large graphic. This point is explained below. With the structure according to this embodiment, the horizontal repetition cycle of stamps is greater (32-stamp cycle) than in the third to eight embodiments. Therefore, the load on the pixel processing units can uniformly be distributed at the time of rendering a graphic with a large horizontal size, when the rasterizing method is used in which horizontal scan is continued without changing scan lines until reaching the boundary of a graphic.

If the vertical and horizontal dispositions of stamps are transposed, the vertical repetition cycle can be increased. Accordingly, the load can be uniformly distributed at the time of rendering a graphic with a large vertical size when the vertical scan rasterizing method is used.

Figure 35:
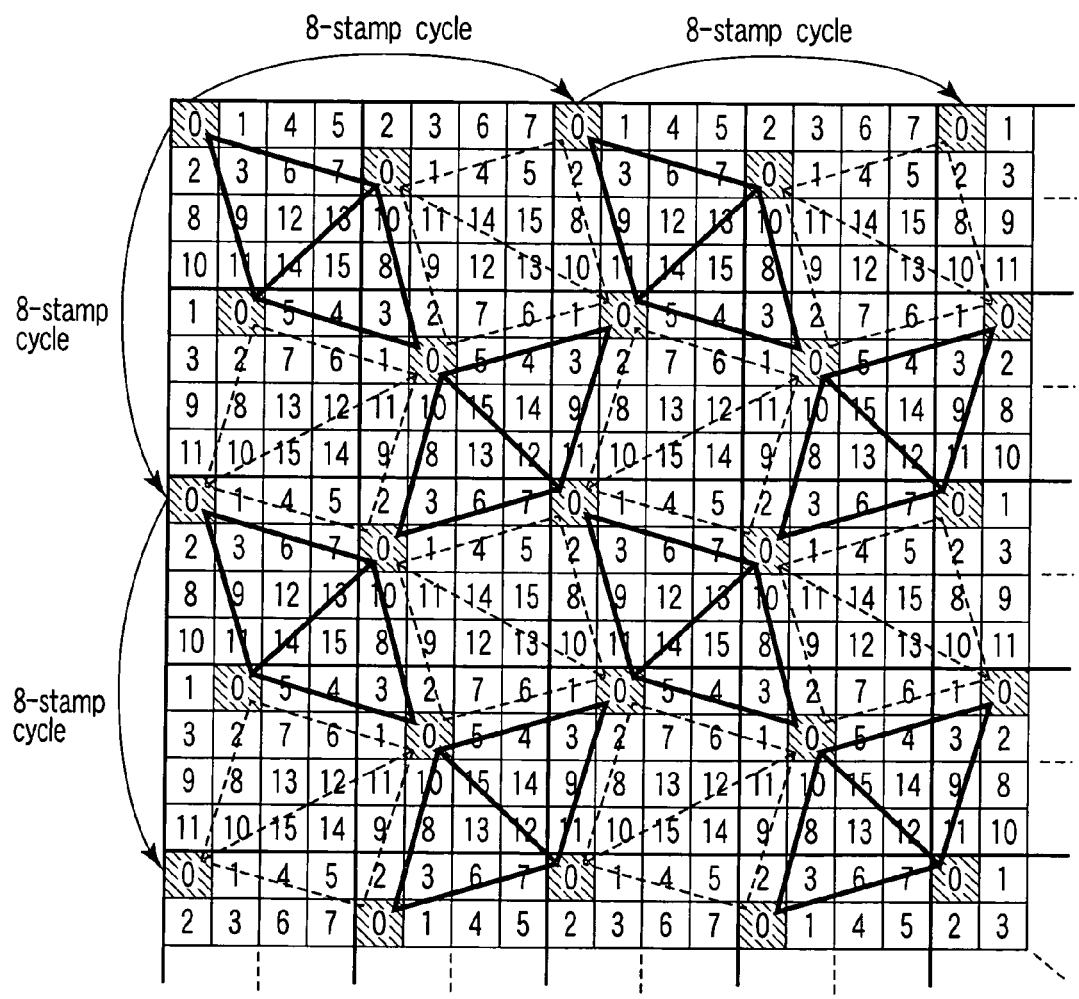
FIG. 35 is a conceptual view of a frame buffer in an image processing apparatus according to the tenth embodiment of the invention.

Next, a rendering apparatus according to the tenth embodiment of the invention is described with reference to FIG. 35. This embodiment may be said to be a modification of the fourth embodiment. The arrangement of stamps in the block in the fourth to seventh embodiments is altered. FIG. 35 is a conceptual view of a frame buffer according to this embodiment.

In an arithmetic process section 54 of a graphic processor 50 according to this embodiment, the number of pixel processing units is set at 16 in the structure that has been described with reference to FIG. 2, FIG. 8 and FIG. 27. Stamps in one block are arranged in a matrix of (4×4).

Figure 36:
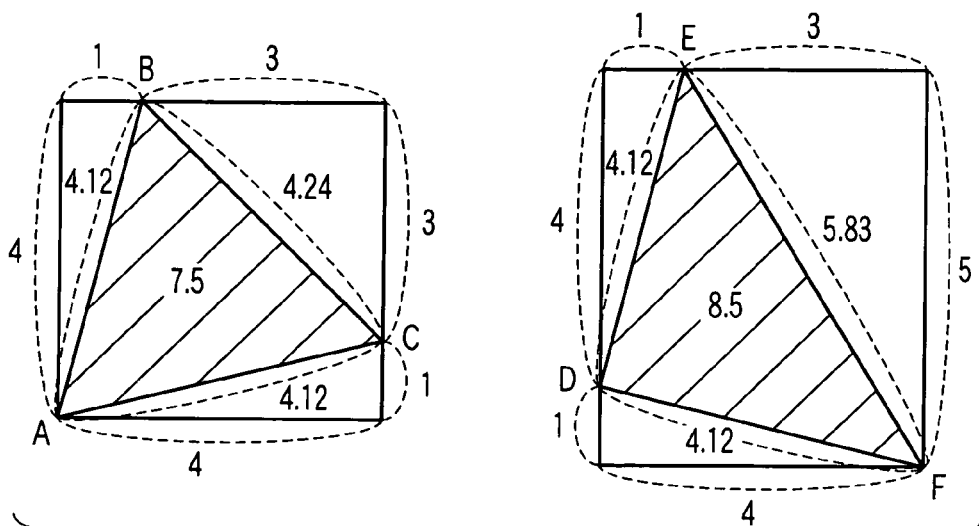
FIG. 36 is a conceptual view illustrating a method of stamp disposition in the image processing apparatus according to the tenth embodiment of the invention.

Each stamp is so disposed as to form a substantially regular triangle together with proximate stamps thereof which are rendered by the same pixel processing unit. The difference from the fourth embodiment is that in the fourth embodiment one kind of triangles are included, whereas in the present embodiment two kinds of triangles are included. The two kinds of triangles constitute a hexagon. FIG. 36 is a conceptual view showing the dispositions of stamps that are rendered by the same pixel processing unit. In FIG. 36, points A to F indicate the positions where stamps that are processed by the same pixel processing unit are disposed.

As is shown in FIG. 36, when (4×4) stamp groups are assumed, the apices of the first triangle are disposed at point A, point B and point C in FIG. 36. If the coordinates of the upper left corner in the stamp group are set to be (0, 0), the coordinates of point A are (0, 4), the coordinates of point B are (1, 0), and the coordinates of point C are (4, 3). The apices of the second triangle are disposed at point D, point E and point F in FIG. 36. If the coordinates of point D are (0, 4), the coordinates of point E are (1, 0), and the coordinates of point F are (4, 5). The arrangement of stamps is repeated at a cycle of 8 stamps in the vertical direction (Y direction) and the horizontal direction (X direction). Thus, the number S [3:0] of a pixel processing unit is expressed by the following equation (9), using the lower 3 bits X [2:0] of the X coordinate and the lower 3 bits Y [2:0] of the Y coordinate of a stamp:

$$S[0]=X[0] \text{ xor } Y[2]$$

$$S[1]=Y[0] \text{ xor } X[2]$$

$$S[2]=X[1]$$

$$S[3]=Y[1] \quad (9)$$

According to the present embodiment, the same advantageous effects as in the fourth to seventh embodiments can be obtained. In the present embodiment, the lengths of the three sides of the triangle which is formed by points A, B and C as described with reference to FIG. 36 are 4.24, 4.12 and 4.12. The lengths of the three sides of the triangle which is formed by points D, E and F are 5.83, 4.12 and 4.12. Exactly speaking, these triangles are not regular triangles. However, in the case where one block comprises (4×4) stamps, if the lengths of the three sides of the triangle that is formed by stamps which are rendered by the same pixel processing unit are to be equalized as much as possible, the lengths of the three sides are set as mentioned above. In other words, it is considered that a substantially regular triangle is formed in the frame buffer in which one block includes (4×4) stamps. As a result, compared to the first embodiment, the lengths of the three sides become more uniform, and the six stamps around one stamp are isotropically arranged and constitute a substantially regular hexagon. In other words, the stamps that are rendered by the same pixel processing unit are distributed uniformly on the frame buffer. As a result, the degree of parallel processing in the pixel processing units is enhanced, and the speed of graphic rendering can be increased.

In the present embodiment, the number of pixel processing units is set at 16, for instance. If the number of pixel processing units is $16j^2$, the block size is set at (4j×4j) stamps and the same arrangement as in the tenth embodiment can be applied.

Figure 37:
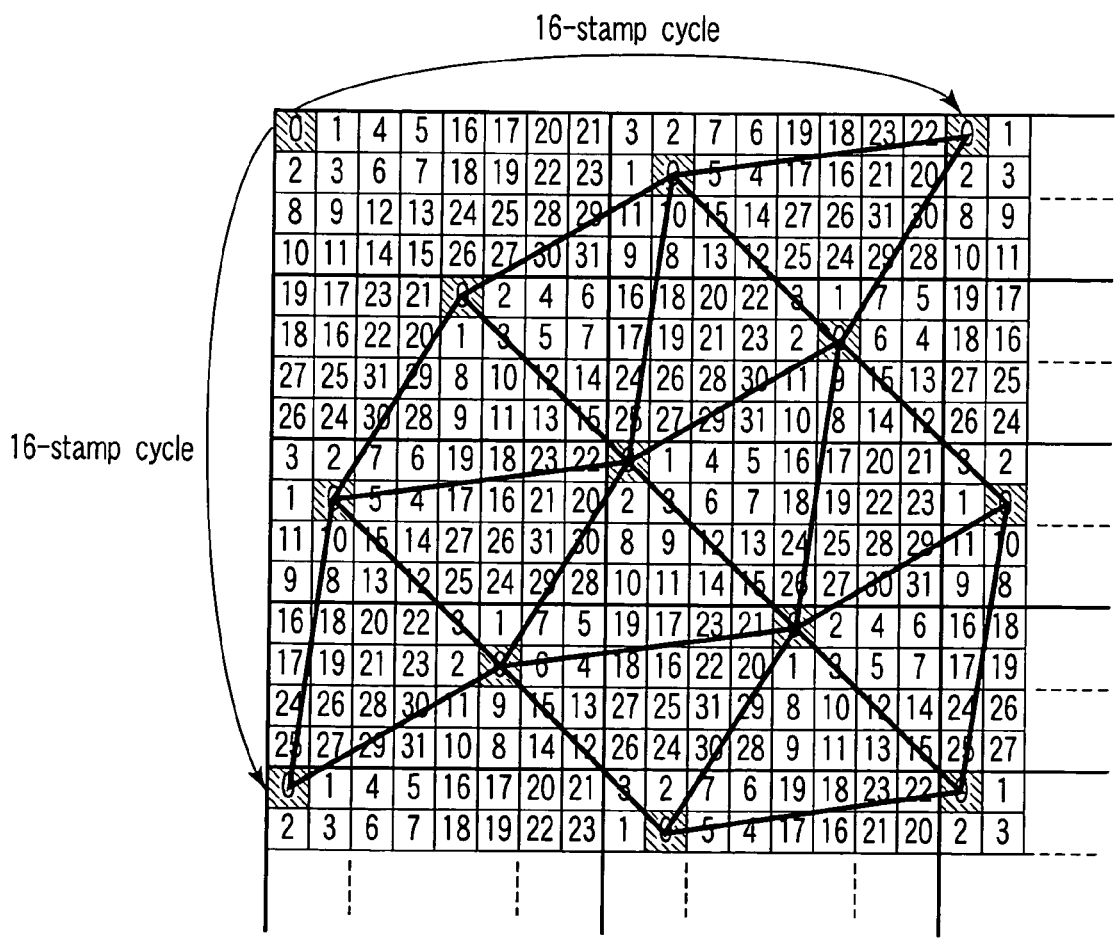
FIG. 37 is a conceptual view of a frame buffer in an image processing apparatus according to the eleventh embodiment of the invention.

Next, a rendering apparatus according to the eleventh embodiment of the invention is described with reference to FIG. 37. This embodiment may be said to be a modification of the fourth embodiment. The arrangement of stamps in the block in the fourth to seventh embodiments is altered. FIG. 37 is a conceptual view of a frame buffer according to this embodiment.

In an arithmetic process section 54 of a graphic processor 50 according to this embodiment, the number of pixel processing units is set at 32 in the structure that has been described with reference to FIG. 2, FIG. 8 and FIG. 27. The stamps in one block are arranged in a matrix of (8×4).

Figure 38:
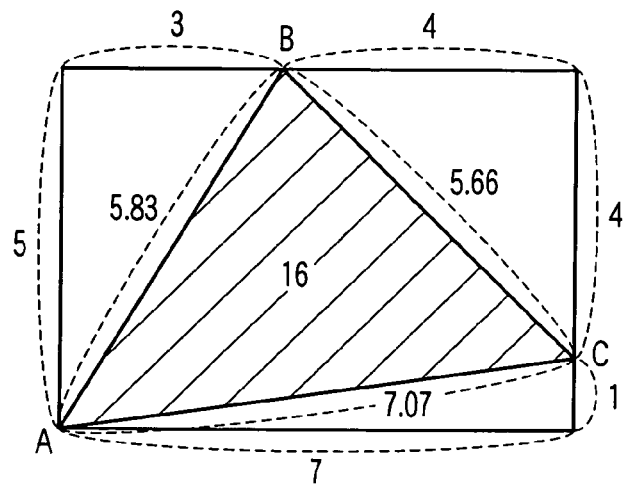
FIG. 38 is a conceptual view illustrating a method of stamp disposition in the image processing apparatus according to the eleventh embodiment of the invention.

Like the fourth embodiment, each stamp is so disposed as to form a substantially regular triangle together with proximate stamps thereof which are rendered by the same pixel processing unit. FIG. 38 is a conceptual view showing dispositions of stamps that are rendered by the same pixel processing unit.

As is shown in FIG. 38, when a (7×5) stamp group is assumed, three stamps that are rendered by the same pixel processing unit are disposed at point A, point B and point C in FIG. 38. If the coordinates of the upper left corner in the stamp group are set to be (0, 0), the coordinates of point A are (0, 5), the coordinates of point B are (3, 0), and the coordinates of point C are (7, 4). The arrangement of stamps is repeated at a cycle of 16 stamps in the vertical direction (Y direction) and the horizontal direction (X direction). Thus, the number S [4:0] of a pixel processing unit is expressed by the following equation (10), using the lower 4 bits X [3:0] of the X coordinate and the lower 4 bits Y [3:0] of the Y coordinate of a stamp:

$$S[0]=(X[2] \text{ xor } !Y[0] \text{ and } Y[2]) \text{ or } (X[0] \text{ and } !Y[2])$$
$$\quad \text{ xor } X[3] \text{ xor } Y[3]$$

$$S[1]=(X[0] \text{ xor } !X[2] \text{ and } Y[2]) \text{ or } (X[0] \text{ and } !Y[2])$$
$$\quad \text{ xor } X[3] \text{ xor } Y[3]$$

$$S[2]=X[1]$$

$$S[3]=Y[1]$$

$$S[4]=X[2] \text{ xor } Y[2] \quad (10)$$

According to the present embodiment, the same advantageous effects as in the fourth to seventh embodiments can be obtained. In the present embodiment, the lengths of the three sides of the triangle which is formed by points A, B and C as described with reference to FIG. 38 are 5.66, 5.83 and 7.07. Exactly speaking, this triangle is not a regular triangle. However, the lengths of the three sides of the triangle are more uniform than in the structure of the first embodiment. Thus, the stamps that are processed by the same pixel processing unit are distributed so as to reduce non-uniformity in distribution on the frame buffer. As a result, the degree of parallel processing in the pixel processing units is enhanced, and the speed of graphic rendering can be increased.

In the present embodiment, the number of pixel processing units is set at 32, for instance. Even if the apex coordinates are multiplied by an integer-number of times, the same arrangement can be adopted. In other words, if the number of pixel processing units is $32j^2$, the block size is set at (8j×4j) stamps (or (4j×8j) stamps) and the same arrangement as in the eleventh embodiment can be applied.

Figure 39:
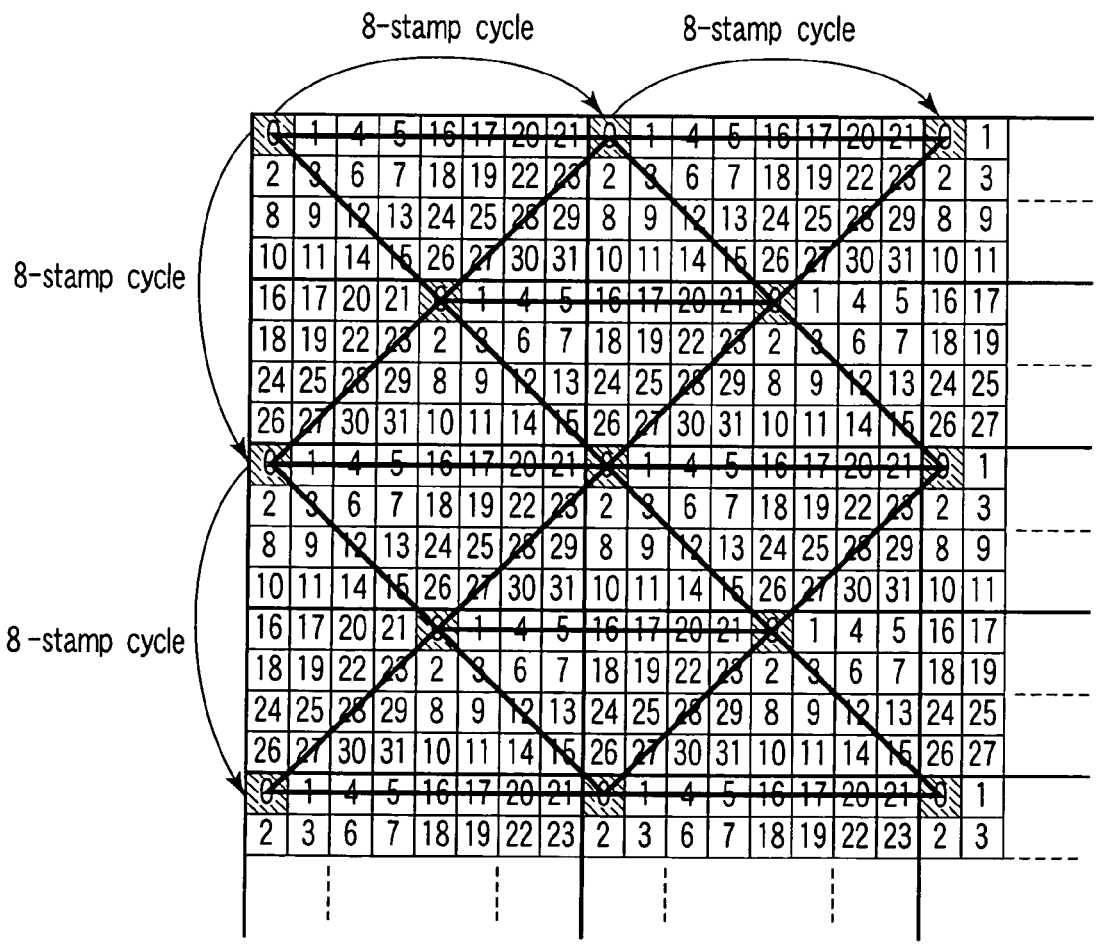
FIG. 39 is a conceptual view of a frame buffer in an image processing apparatus according to the twelfth embodiment of the invention.

Next, a rendering apparatus according to the twelfth embodiment of the invention is described with reference to FIG. 39. This embodiment may be said to be a modification of the fourth embodiment. The arrangement of stamps in the block in the fourth to seventh embodiments is altered. FIG. 39 is a conceptual view of a frame buffer according to this embodiment.

In an arithmetic process section 54 of a graphic processor 50 according to this embodiment, the number of pixel processing units is set at 32 in the structure that has been described with reference to FIG. 2, FIG. 8 and FIG. 27. The stamps in one block are arranged in a matrix of (8×4).

Figure 40:
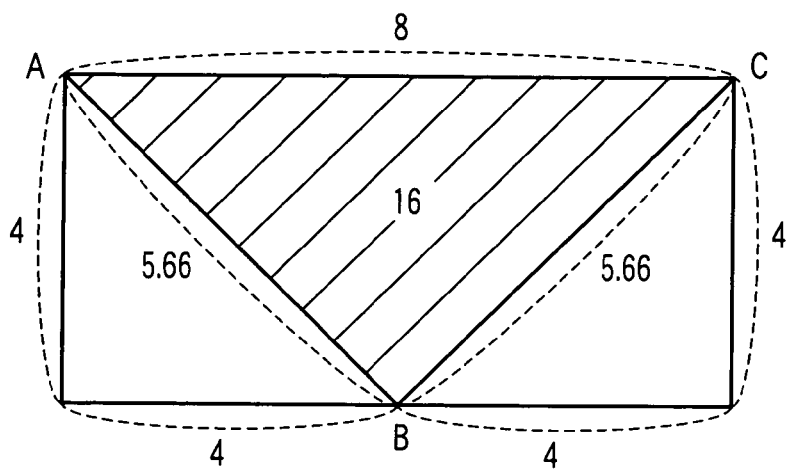
FIG. 40 is a conceptual view illustrating a method of stamp disposition in the image processing apparatus according to the twelfth embodiment of the invention.

Like the fourth embodiment, each stamp is so disposed as to form a triangle together with proximate stamps thereof which are rendered by the same pixel processing unit. In addition, four proximate stamps form a square. FIG. 40 is a conceptual view showing the disposition of stamps that are rendered by the same pixel processing unit.

As is shown in FIG. 40, when a (8×4) stamp group is assumed, three stamps that are rendered by the same pixel processing unit are disposed at point A, point B and point C in FIG. 40. If the coordinates of the upper left corner in the stamp group are set to be (0, 0), the coordinates of point A are (0, 0), the coordinates of point B are (4, 4), and the coordinates of point C are (8, 0). The arrangement of stamps is repeated at a cycle of 8 stamps in the vertical direction (Y direction) and the horizontal direction (X direction). Thus, the number S [4:0] of a pixel processing units is expressed by the following equation (11), using the lower 4 bits X [3:0] of the X coordinate and the lower 3 bits Y [2:0] of the Y coordinate of a stamp:

$$S[0]=X[0]$$
$$S[1]=Y[0]$$
$$S[2]=X[1]$$
$$S[3]=Y[1]$$
$$S[4]=X[2] \text{ xor } Y[2] \qquad (11)$$

According to the present embodiment, the same advantageous effects as in the fourth to seventh embodiments can be obtained. In the present embodiment, the lengths of the three sides of the triangle which is formed by points A, B and C as described with reference to FIG. 40 are 8, 5.66, and 5.66. Although this triangle is not a regular triangle, the lengths of the three sides of the triangle are more uniform than in the structure of the first embodiment. Thus, the stamps that are processed by the same pixel processing unit are distributed so as to reduce non-uniformity in distribution on the frame buffer. As a result, the degree of parallel processing in the pixel processing units is enhanced, and the speed of graphic rendering can be increased.

The repetition cycle of stamps is shorter than in the fourth embodiment, and the calculation formula of the number S [4:0] of the pixel processing units is simpler than in the fourth embodiment. Therefore, the cost for circuitry necessary for this calculation can be reduced.

As is shown in FIG. 40, the apex coordinates of the triangle which is formed by the stamps that are processed by the pixel processing unit are all multiples of 4. Thus, if the values of the apex coordinates are reduced to ½ or ¼ in the X direction and Y direction, similar stamp arrangement can be adopted even in the case where the block size is (4×2) stamps and the number of pixel processing units is 8, and in the case where the block size is (2×1) stamps and the number of pixel processing units is 2. If the number of pixel processing units is $2j^2$ (j=natural number), the block size is set at (2j×j) stamps (or (j×2j) stamps) and the same arrangement as in the twelfth embodiment can be applied.

Figure 41:
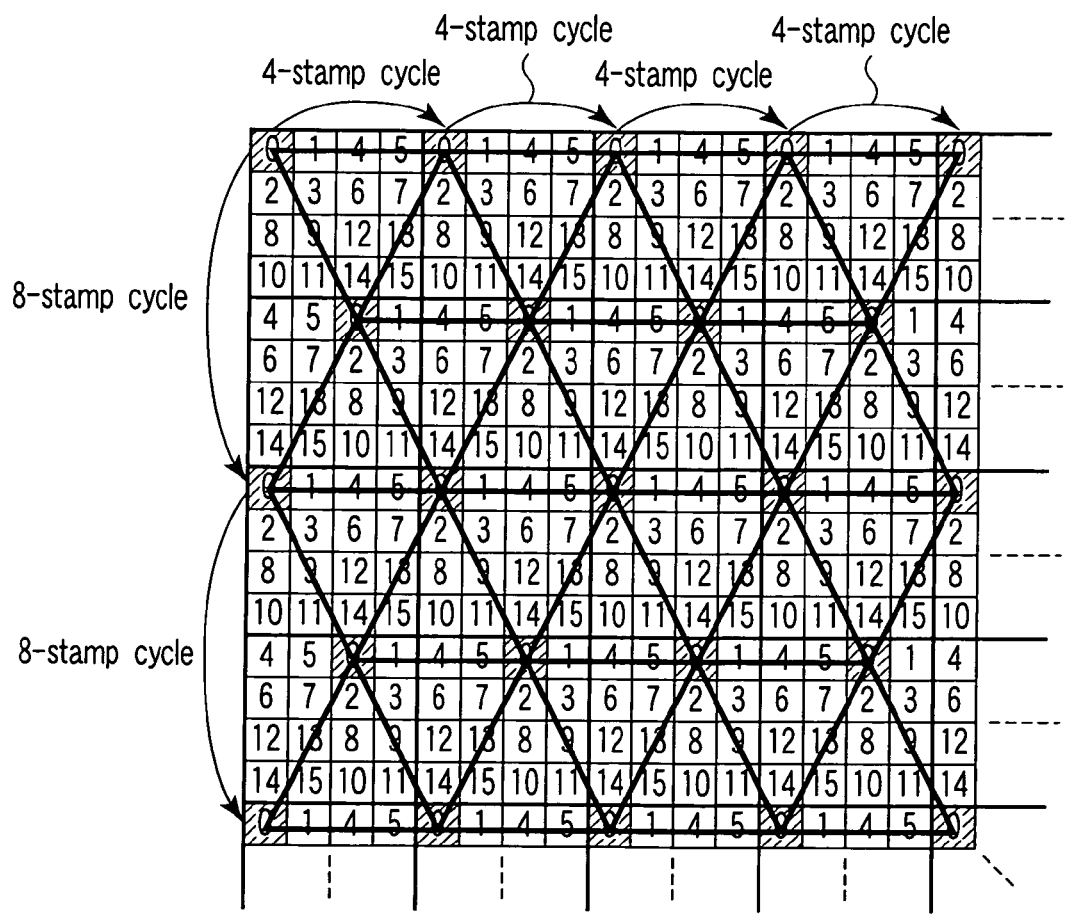
FIG. 41 is a conceptual view of a frame buffer in an image processing apparatus according to the 13th embodiment of the invention.

Next, a rendering apparatus according to the 13th embodiment of the invention is described with reference to FIG. 41. This embodiment may be said to be a modification of the fourth embodiment. The arrangement of stamps in the block in the fourth to seventh embodiments is altered. FIG. 41 is a conceptual view of a frame buffer according to this embodiment.

In an arithmetic process section 54 of a graphic processor 50 according to this embodiment, the number of pixel processing units is set at 16 in the structure that has been described with reference to FIG. 2, FIG. 8 and FIG. 27. The stamps in one block are arranged in a matrix of (4×4).

Figure 42:
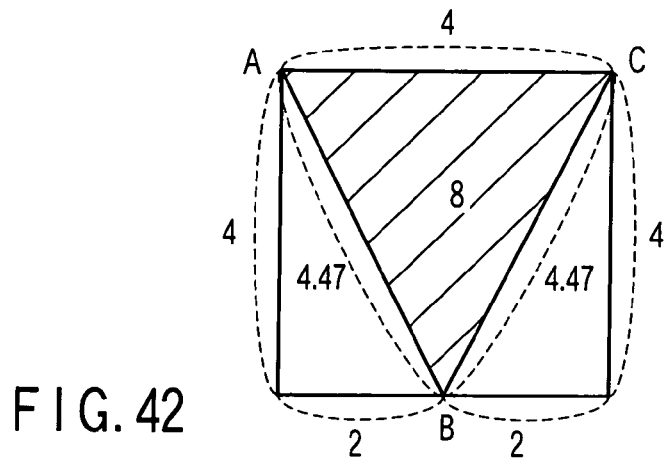
FIG. 42 is a conceptual view illustrating a method of stamp disposition in the image processing apparatus according to the 13th embodiment of the invention.

The stamps are disposed such that six stamps around a given stamp which are rendered by the same pixel processing unit as the given stamp form a substantially regular hexagon. Specifically, three proximate stamps which are rendered by the same pixel processing unit are disposed to form an approximately regular triangle. FIG. 42 is a conceptual view showing the disposition of stamps that are rendered by the same pixel processing unit.

As is shown in FIG. 42, when a (4×4) stamp group is assumed, three stamps that are rendered by the same pixel processing unit are disposed at point A, point B and point C in FIG. 42. If the coordinates of the upper left corner in the stamp group are set to be (0, 0), the coordinates of point A are (0, 0), the coordinates of point B are (2, 4), and the coordinates of point C are (4, 0). The arrangement of stamps is repeated at a cycle of 4 stamps in the horizontal direction (X direction) and a cycle of 8 stamps in the vertical direction (Y direction), as shown in FIG. 41. Thus, the number S [3:0] of a pixel processing units is expressed by the following equation (12), using the lower 2 bits X [1:0] of the X coordinate and the lower 3 bits Y [2:0] of the Y coordinate of a stamp:

$$S[0]=X[0]$$
$$S[1]=Y[0]$$
$$S[2]=X[1] \text{ xor } Y[2]$$
$$S[3]=Y[1] \qquad (12)$$

According to the present embodiment, the same advantageous effects as in the fourth to seventh embodiments can be obtained. In the present embodiment, the lengths of the three sides of the triangle which is formed by points A, B and C as described with reference to FIG. 42 are 4, 4.47 and 4.47. Exactly speaking, this triangle is not a regular triangle. However, the lengths of the three sides of the triangle are more uniform than in the structure of the first embodiment. Thus, the stamps are isotropically arranged such that six stamps around one stamp constitute a substantially regular hexagon. Hence, the stamps that are processed by the same pixel processing unit are distributed so as to reduce non-uniformity in distribution on the frame buffer. As a result, the degree of parallel processing in the pixel processing units is enhanced, and the speed of graphic rendering can be increased.

As is shown in FIG. 42, the apex coordinates of the triangle which is formed by the stamps that are processed by the same pixel processing unit are all even-number values. Thus, if the values of the apex coordinates are reduced to ½ in the X direction and Y direction, a similar stamp arrangement can be adopted even in the case where the block size is (2×2) stamps and the number of pixel processing units is 4. If the number of pixel processing units is $4j^2$, the block size is set at (2j×2j) stamps and the same arrangement as in the 13th embodiment can be applied.

Figure 43:
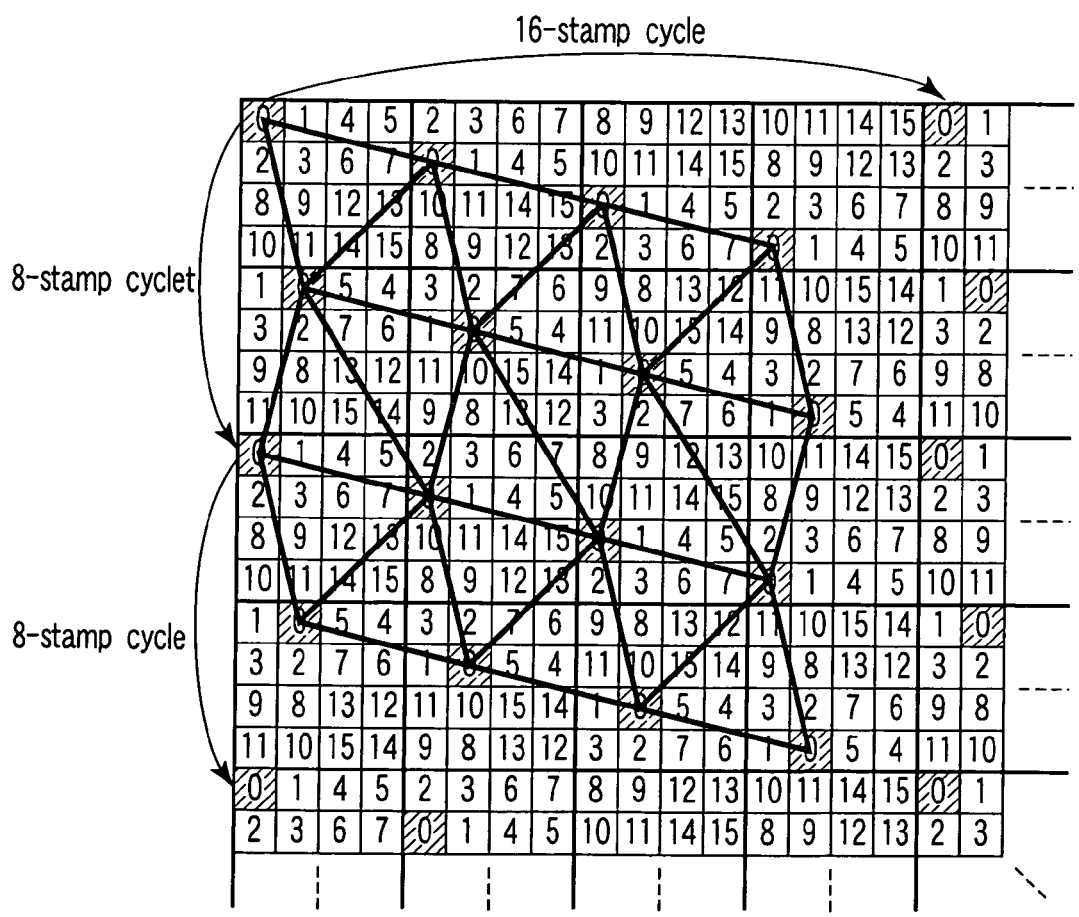
FIG. 43 is a conceptual view of a frame buffer in an image processing apparatus according to the 14th embodiment of the invention.

Next, a rendering apparatus according to the 14th embodiment of the invention is described with reference to FIG. 43. This embodiment may be said to be a modification of the ninth embodiment. The arrangement of stamps in the block in the fourth to ninth embodiments is altered. FIG. 43 is a conceptual view of a frame buffer according to this embodiment.

In an arithmetic process section 54 of a graphic processor 50 according to this embodiment, the number of pixel processing units is set at 16 in the structure that has been described with reference to FIG. 2, FIG. 8 and FIG. 27. The stamps in one block are arranged in a matrix of (4×4). The frame buffer is structured in the following fashion.

Two stamp groups each comprising (8×8) stamps, as shown in FIG. 35?, are horizontally arranged. In one of the two stamp groups, pixel processing units which process pairs of vertical every-other-rows of stamps, that is, pairs of stamps with the same X coordinate and with Y=4i and Y=4i+2 (i=natural number), and pairs of stamps with the same X coordinate and with Y=4i+1 and Y=4i+3, are transposed. Then, as shown by the bold lines in FIG. 43, triangles formed by points A, B and C as described with reference to FIG. 36, that is, substantially regular triangles, are arranged so as to extend over two neighboring rows of blocks, and so do triangles formed by points D, E and F. The same arrangement of stamps is repeated at a cycle of 16 stamps in the horizontal direction and at a cycle of 8 stamps in the vertical direction.

As a result, the number S [3:0] of a pixel processing units is given by the following equation (13), using the lower 4 bits X [3:0] of the X coordinate and the lower 3 bits Y [2:0] of the Y coordinate of a stamp:

$$S[0]=X[0] \text{ xor } Y[2]$$

$$S[1]=Y[0] \text{ xor } X[2]$$

$$S[2]=X[1]$$

$$S[3]=Y[1] \text{ xor } X[3] \tag{13}$$

According to the structure of this embodiment, the advantageous effects of the fourth? to seventh embodiments can be obtained, and it is possible to improve the processing efficiency in the case of rendering a relatively large graphic. This point is explained below. With the structure according to this embodiment, the horizontal repetition cycle of stamps is greater (16-stamp cycle) than in the fourth? to seventh embodiments. Therefore, the load on the pixel processing units can be uniformly distributed at the time of rendering a graphic with a large horizontal size, when the rasterizing method is used in which horizontal scan is continued without changing scan lines until reaching the boundary of a graphic. However, in this embodiment, there are sides of a length of 3.16 (3 in the X direction and 1 in the Y direction), which are shorter than the sides of other triangles, are included as shown by the dotted line in FIG. 43.

If the vertical and horizontal dispositions of stamps are transposed, the vertical repetition cycle can be increased. Accordingly, the load can be uniformly distributed at the time of rendering a graphic with a large vertical size, when the vertical scan rasterizing method is used.

Figure 44:
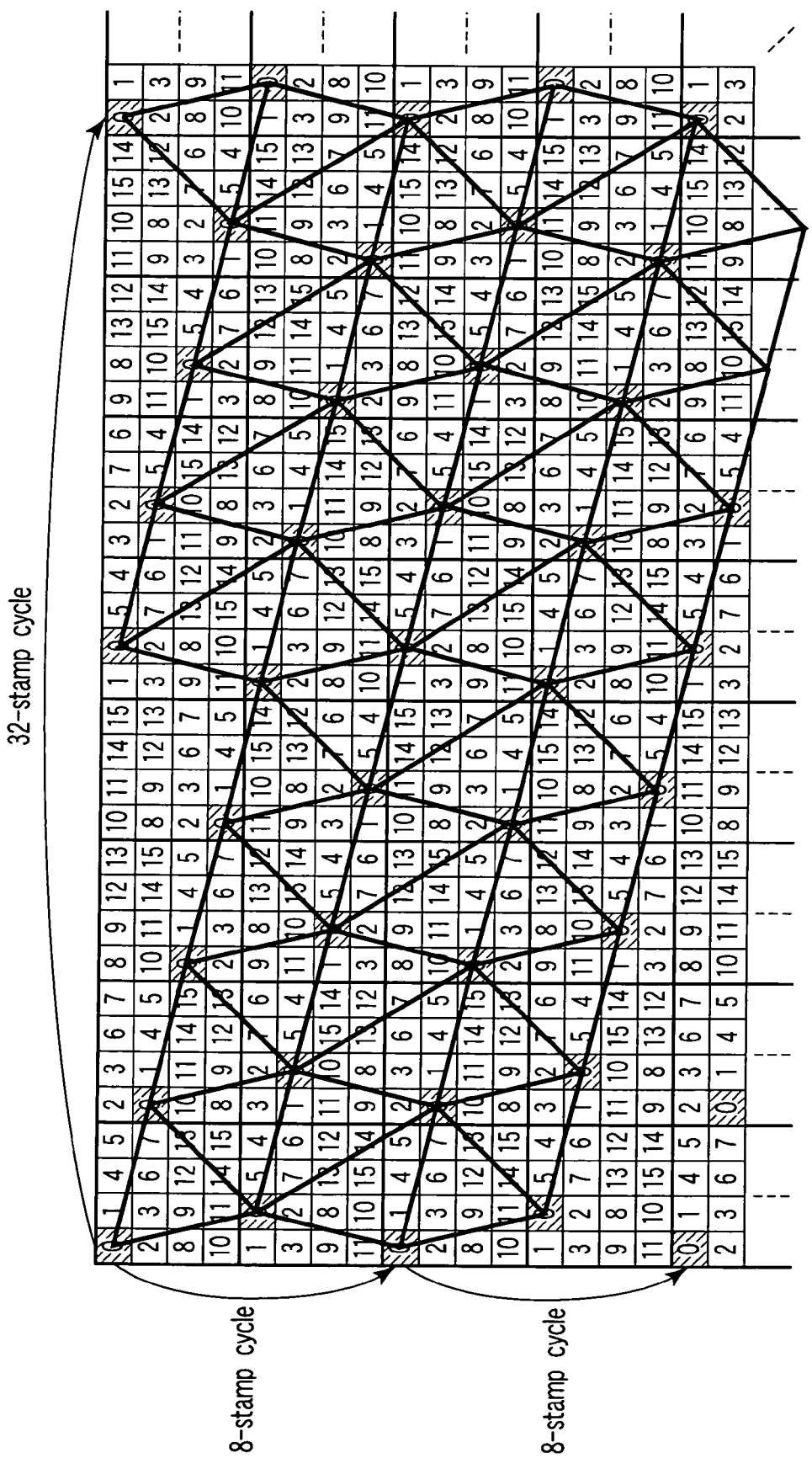
FIG. 44 is a conceptual view of a frame buffer in an image processing apparatus according to the 15th embodiment of the invention.

Next, a rendering apparatus according to the 15th embodiment of the invention is described with reference to FIG. 44. This embodiment may be said to be a modification of the ninth embodiment. The arrangement of stamps in the block in the fourth to ninth embodiments is altered. FIG. 44 is a conceptual view of a frame buffer according to this embodiment.

In an arithmetic process section 54 of a graphic processor 50 according to this embodiment, the number of pixel processing units is set at 16 in the structure that has been described with reference to FIG. 2, FIG. 8 and FIG. 27. The stamps in one block are arranged in a matrix of (4×4). The frame buffer is structured in the following fashion.

In the structure shown in FIG. 44, the horizontal cycle is set at 32 stamps. As shown in the FIG. 44, triangles formed by points A, B and C as described in FIG. 36, that is, substantially regular triangles, are arranged, and so are triangles formed by points D, E and F. The arrangement of stamps is repeated at a cycle of 32 stamps in the horizontal direction and at a cycle of 8 stamps in the vertical direction. Thus, the number S [3:0] of a pixel processing unit is expressed by the following equation (14), using the lower 5 bits X [4:0] of the X coordinate and the lower 3 bits Y [2:0] of the Y coordinate of a stamp:

$$S[0]=(!X[0] \text{ xor } X[2] \text{ xor } Y[0] \text{ xor } Y[1] \text{ and } X[3]) \text{ or } (X[0] \text{ and } !X[3]) \text{ xor } X[4] \text{ xor } Y[2]$$

$$S[1]=Y[0] \text{ xor } X[2]$$

$$S[2]=X[1]$$

$$S[3]=Y[1] \text{ xor } X[3] \tag{14}$$

According to the structure of this embodiment, the advantageous effects of the third? to seventh embodiments can be obtained. In addition, like the 9th and 14th embodiment, it is possible to improve the processing efficiency in the case of rendering relatively large graphics. Moreover, unlike the ninth and 14th embodiments, the triangles that cover the frame buffer do not include a triangle which has a shorter side than the triangles shown in FIG. 36. In other words, the inside of the frame buffer is covered with two kinds of triangles, as described in FIG. 36 in connection with the tenth embodiment, which can be said to be substantially regular triangles. In the present embodiment, the repetition cycle of stamps is increased, and thereby the decrease of inter-stamp distances as in the 14th embodiment is avoided.

Needless to say, if the vertical and horizontal dispositions of stamps are transposed, the load can uniformly be distributed at the time of rendering a graphic with a large vertical size.

As has been described above, according to the first to 15th embodiments of the present invention, the frame buffer comprises a plurality of blocks. Each block comprises the same number of stamps as the pixel processing units. The stamps in each block are processed by different pixel processing units. By adopting such stamp disposition, the load on the pixel processing units can uniformly be distributed. Further, this stamp disposition is also applicable to textures. When this stamp disposition is applied to textures, accesses to the local memories can uniformly be distributed. As a result, the graphic rendering speed is increased. As regards the addresses in the local memories, successive values are not assigned within each local memory, but successive values are assigned to different local memories in an interleaving fashion in the order of stamps that belong to the same block. Thereby, the assignment of addresses becomes easy in the case of increasing the number of blocks, and the complexity of the rendering apparatus can be reduced.

For example, in the fourth and fifth embodiments, the block and texture block include (8×4) stamps and texture stamps, respectively. The stamps (texture stamps) are arranged such that three stamps (texture stamps) that are processed by the same pixel processing unit (or that are stored in the same local memory) are positioned at the apices of a substantially regular triangle. Further, in the fourth and fifth embodiments, the triangles are disposed with no gap (i.e., packed) in the frame buffer. Thus, six proximate stamps around a given stamp are positioned at the apices of a substantially regular hexagon that is defined around the given stamp. Therefore, the stamps that are processed by the same pixel processing unit are uniformly distributed in the frame buffer. In other words, the stamps that are processed by the same pixel processing unit are disposed substantially equidistantly and isotropically. Since frame buffers and textures are stored in the local memories by the same addressing method, a frame buffer that is a result of rendering can directly be used as a texture in subsequent rendering operations.

The number of a pixel processing unit can be calculated from stamp coordinates, merely by extracting the lower bits of coordinate data and executing logical arithmetic operations. Therefore, the calculations are simple, and the size of circuitry therefor can be small.

In the sixth embodiment, addresses are assigned to the local memories in an interleaving fashion with a maximum data width of a stamp. In the case where the data width of a stamp is less than the maximum value, a plurality of stamp data are packed and stored in the associated local memory. Therefore, without altering the assignment of addresses to the local memories, stamps with a plurality of data widths can be handled and the degree of freedom of the rendering operations is enhanced.

In the seventh embodiment, cache memories are provided in the texture units. When texture mapping is executed, a plurality of texture stamps are read out to the texture cache at a time. In this case, by applying the same addressing to the frame buffer and the texture, the hit ratio of the texture cache can be increased.

In the eighth embodiment, the frame buffer includes the super-blocks. In the super-block, a plurality of the stamps is arranged in a matrix. In this case, the addresses of the stamps processed by the same pixel processing unit become closer. Hence, the cache hit ratio is increased.

For methods of disposing stamps, it is possible to adopt the methods described in the ninth to 15th embodiments. In the disposition methods of the ninth, 14th and 15th embodiments, the horizontal repetition cycle of stamps which are associated with the same pixel processing unit is increased. Therefore, the processing efficiency can be enhanced at the time of rendering a large graphic, when the rasterizing method is used in which horizontal scan is continued without changing scan lines until reaching the boundary of a graphic. The nine to 15th embodiments are directed to the examples of dispositions of stamps. Needless to say, the same applies to dispositions of texture stamps.

As regards the blocks described in the above embodiments, the vertical and horizontal dispositions may be transposed. For example, the vertical and horizontal dispositions of the matrix of (8×4) stamps and texture stamps may be transposed so as to form a matrix of (4×8) stamps and texture stamps, and the embodiments are also applicable to this case.

In the above-described embodiments, one stamp comprises (4×4) pixels. However, the number of pixels that are included in one stamp is not limited. For example, one stamp may comprise one pixel. In this case, if the term "stamp" in the descriptions of the embodiments is interpreted as referring to "pixel", the embodiments are similarly applicable. In addition, the term "texture stamp" in the descriptions of the embodiments can be interpreted as referring to "texel". It is preferable, however, to make the number of texels in each texture stamp equal to the number of pixels in each stamp.

Figure 45:
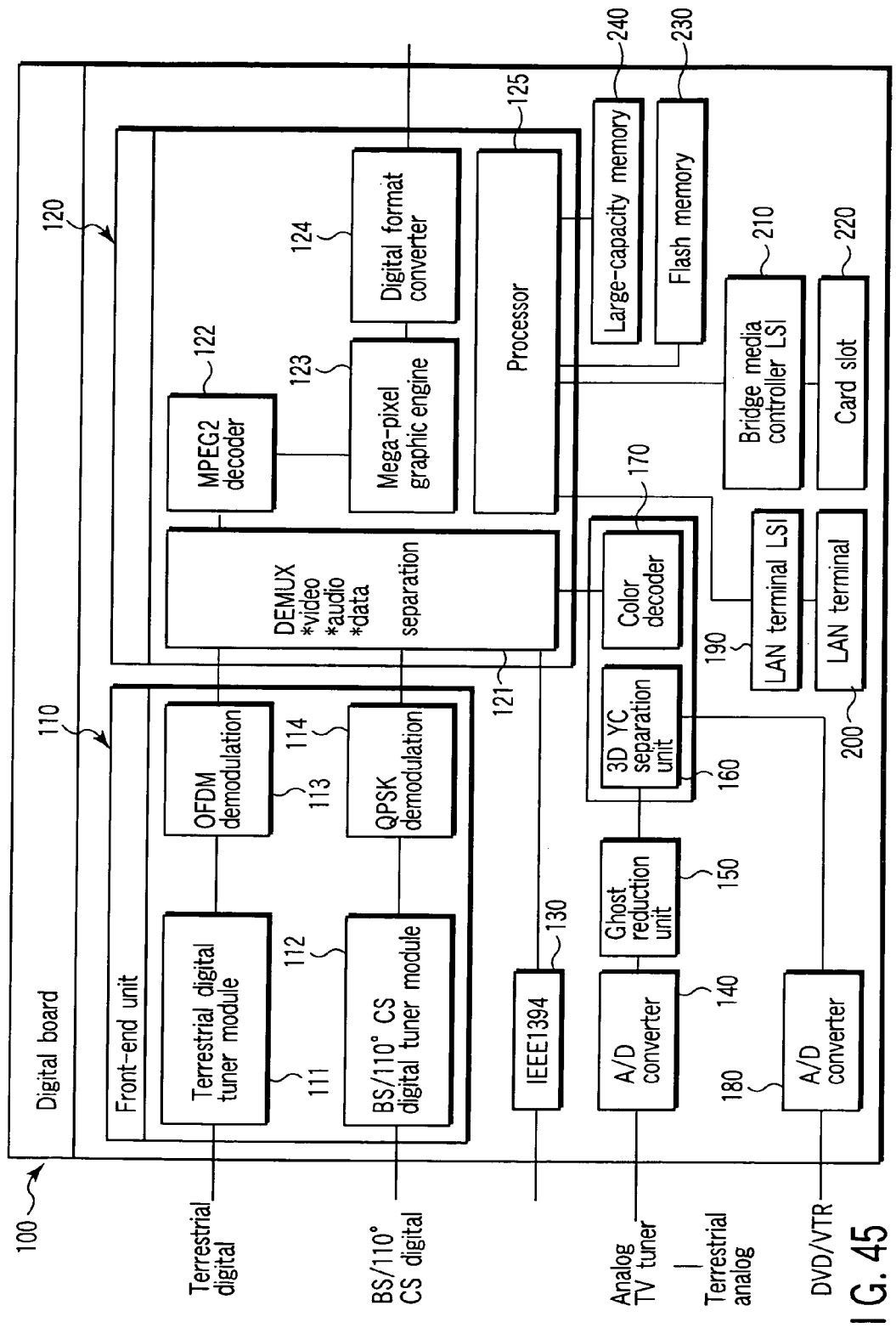
FIG. 45 is a block diagram of a digital TV including the image rendering apparatus according to the first to 15th embodiments of the invention.

The image rendering apparatuses according to the first to 15th embodiments are applicable to, e.g. game machines, home servers, TVs, mobile information terminals, etc. FIG. 45 is a block diagram of a digital board included in a digital TV that incorporates the image processing apparatus according to the first to 15th embodiments. The digital board is employed to control communication information such as video/audio. As is shown in FIG. 45, the digital board 100 comprises a front-end unit 110, an image rendering processor system 120, a digital input unit 130, A/D converters 140 and 180, a ghost reduction unit 150, a 3D YC separation unit 160, a color decoder 170, a LAN terminal LSI 190, a LAN terminal 200, a bridge media controller LSI 210, a card slot 220, a flash memory 230, and a large-capacity memory (e.g. dynamic random access memory (DRAM)) 240. The front-end unit 110 includes digital tuner modules 111 and 112, an OFDM (Orthogonal Frequency Division Multiplex) demodulation unit 113, and a QPSK (Quadrature Phase Shift Keying) demodulation unit 114.

The image rendering processor system 120 comprises a transmission/reception circuit 121, an MPEG2 decoder 122, a graphic engine 123, a digital format converter 124, and a processor 125. For example, the graphic engine 123 and processor 125 correspond to the graphic processor 50 and host processor 20, which have been described in connection with the first to 15th embodiments.

In the above structure, terrestrial digital broadcasting waves, BS (Broadcast Satellite) digital broadcasting waves and 110-degree CS digital broadcasting waves are demodulated by the front-end unit 110. In addition, terrestrial analog broadcasting waves and DVD/VTR signals are decoded by the 3D YC separation unit 160 and color decoder 170. The demodulated/decoded signals are input to the image rendering processor system 120 and are separated into video, audio and data by the transmission/reception circuit 121. As regards the video, video information is input to the graphic engine 123 via the MPEG2 decoder 122. The graphic engine 123 then renders objects as described in the embodiments.

Figure 46:
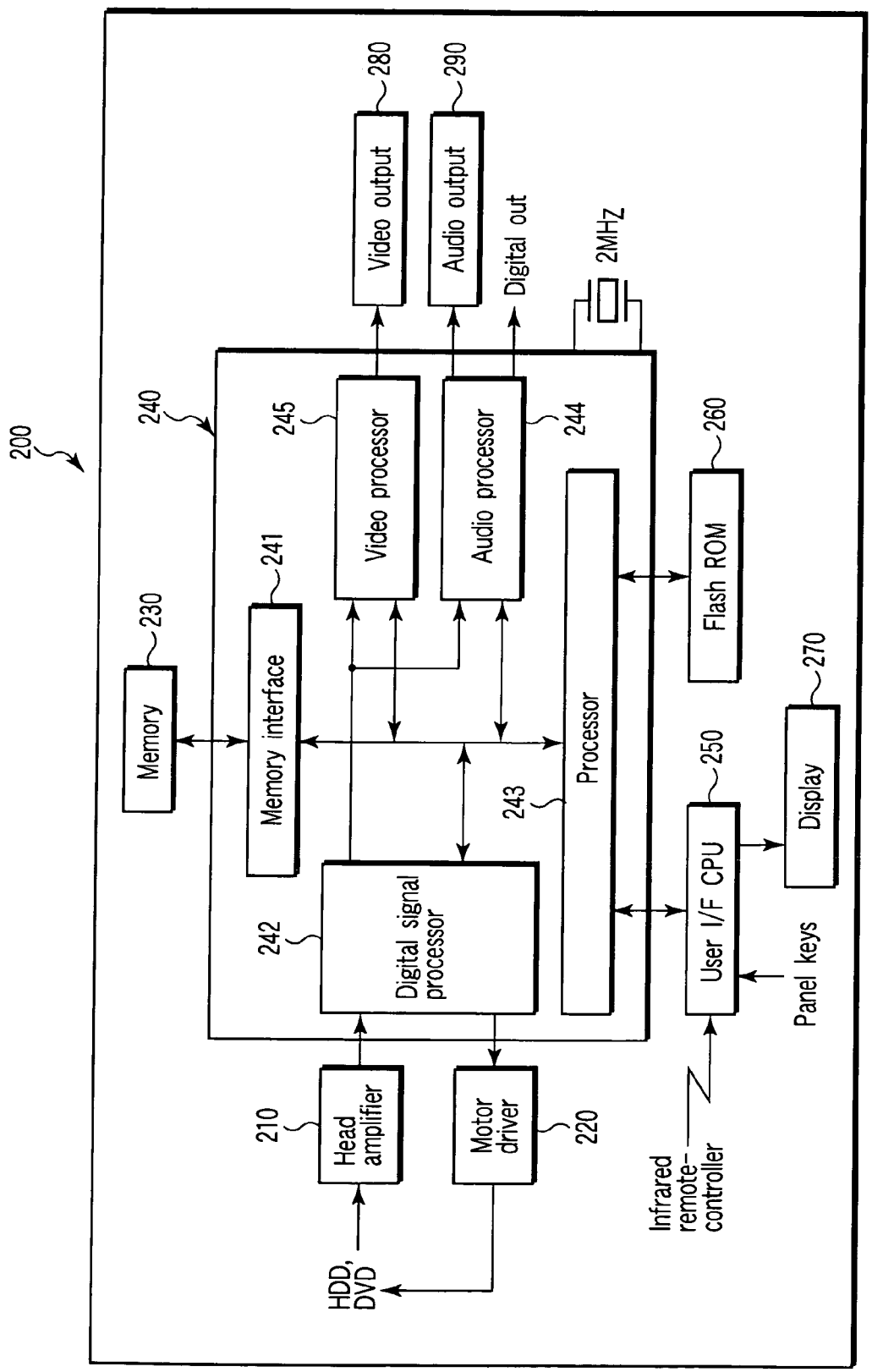
FIG. 46 is a block diagram of a recording/reproducing apparatus including the image processing apparatus according to the first to 15th embodiments of the invention.

FIG. 46 is a block diagram of a recording/reproducing apparatus that includes the image processing apparatus according to the first to 15th embodiments. As is shown in FIG. 46, a recording/reproducing apparatus 200 comprises a head amplifier 210, a motor driver 220, a memory 230, an image information control circuit 240, a user I/F CPU 250, a flash memory 260, a display 270, a video output unit 280, and an audio output unit 290.

The image information control circuit 240 includes a memory interface 241, a digital signal processor 242, a processor 243, an audio processor 244, and a video processor 245. For example, the video processor 245 and digital signal processor 242 correspond to the graphic processor 50 and host processor 20 that have been described in the first to 15th embodiments.

With the above structure, video data that is read out with the head amplifier 210 is input to the image information control circuit 240. Then, graphic information is input from the digital signal processor 242 to the video processor. The video processor 245 renders objects as described in the embodiments.

The rendering apparatuses described in connection with the first to 15th embodiments can also be realized by software using a computer. FIG. 47 is a block diagram of a computer which realizes the rendering apparatus.

As is shown in FIG. 47, the computer 300 that is used for image rendering comprises a CPU 310, a memory 320, a data input/output unit 330, a driver circuit 340, and a display 350.

The memory 320 stores an image rendering program, frame buffer (pixel) data, and texture (texel) data. The data input/output unit 330 controls data transmission/reception between the computer 300 and the outside. The driver circuit 340 displays images on the display 350 based on processing results of the CPU 310. The CPU 310 can execute the same functions as the rasterizer 55 and pixel processing units PPU0 to PPU31, which have been described in the first to 15th embodiments. Specifically, according to the graphic rendering program, the CPU 310 functions as pixel generating means for generating stamps (pixels) corresponding to input graphic information, and as a plurality of rendering means, each of which executes rendering operations for a plurality of stamps (pixels) generated by the pixel generating means, which are positioned substantially equidistantly and isotropically within a rendering area. Further, the CPU 310 functions as read-out means for reading out texture stamps (texels) from storage means, and as adding means for adding texture stamps (texels), which are read out by the read-out means, to the stamps (pixels).

The CPU 310 acquires graphic information from outside, and reads out the graphic rendering program from the memory 320. The graphic rendering program executes the process, for example, as illustrated in the flow chart of FIG. 5 in connection with the first embodiment, or in the flow chart of FIG. 10 in connection with the 2nd embodiment. In the graphic rendering program, the relationship between the positions of stamps and the rendering means which process the stamps and the relationship between the positions of texture stamps and the memory areas which store the texture stamps are defined. These relationships, as described in the first to 15th embodiments, are defined such that the stamps (or texture stamps) are positioned substantially equidistantly and isotropically.

To start with, according to the graphic information and the graphic rendering program, the CPU 310 generates stamps corresponding to the graphic information. The CPU 310 executes parallel rendering operations for a plurality of stamps. In the CPU 310, the sections for processing the respective pixels are associated with the positions of the respective stamps, as described in the first to 15th embodiments. Where necessary, the CPU 310 reads out texture data from the memory 320 according to the graphic rendering program, and adds the texture data to the corresponding pixels. If the rendering operations are completed, the CPU 310 stores the pixel data in the memory 320.

As has been described above, the first to 15th embodiments can be realized by the computer using the graphic rendering program. The graphic rendering program may be stored in recording medium. Thereby, the program can freely be carried, and the graphic rendering method according to the embodiments can be implemented in various hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rendering apparatus comprising:
a rasterizer which generates pixels corresponding to graphics to be rendered, the pixels being obtained by dividing a graphic rendering area in a matrix, the graphic rendering area including a plurality of pixel groups each including N pixels arranged in a matrix (where N is greater than or equal to 8);
pixel processing units each of which executes rendering operations for each of the N pixels in each one of the pixel groups, the pixels rendered by the same pixel processing unit being positioned substantially equidistantly and isotropically within the rendering area wherein the three pixels in vicinity to each other rendered by the same pixel processing unit form a first triangle when $N=2^{2n+2}$ (where n is a natural number, not less than 1) and form a second triangle when $N=2^{2n+1}$ within the graphic rendering area, the length of the shortest side of the first triangle is greater than $N^{1/2}$, the length of the shortest side of the second triangle is $N^{1/2}$, and the average length of the three sides of the second triangle is smaller than $(N^{1/2}(2+2^{1/2})/3)$; and
memories which are provided in association with the respective pixel processing units and store data of the pixels rendered by the associated pixel processing units.

2. The apparatus according to claim 1, wherein each of the memories further stores data of texels obtained by dividing an image in a matrix, the image being to be added to the graphics,
the texels stored in the same memory are positioned substantially equidistantly and isotropically within the image, and
the apparatus further comprises
read-out circuits which are provided in association with the respective pixel processing units and read out the data of the texels to be added to the pixels handled by the associated pixel processing unit from any one of the memories; and
texture units which are provided in association with the respective pixel processing units and add the texels read out by the associated read-out circuit to the pixels.

3. The apparatus according to claim 2, wherein addresses of areas in the memories which store the data of the texels are successively assigned in an order of the memories in units of the texels.

4. The apparatus according to claim 2, wherein addresses of areas in the memories which store the data of the texels are successively assigned in an order of the memories in units of a maximum data width of the texels, and
in cases where a data width of the texels is less than the maximum data width, successive addresses are assigned to the texels in each of the memories, an upper limit of the successive address in each of the memories being given by the maximum data width.

5. The apparatus according to claim 1, wherein addresses of areas in the memories which store the data of the pixels are successively assigned in an order of the memories in units of the pixels.

6. The apparatus according to claim 1, wherein addresses of areas in the memories which store the data of the pixels are successively assigned in an order of the memories in units of a maximum data width of the pixels, and
in cases where a data width of the pixels is less than the maximum data width, successive addresses are assigned to the pixels in each of the memories, an upper limit of the successive addresses in each of the memories being given by the maximum data width.

7. A rendering apparatus comprising:
a rasterizer which generates pixels corresponding to graphics to be rendered, the pixels being obtained by dividing a graphic rendering area in a matrix, the graphic rendering area including a plurality of pixel groups each including N pixels arranged in a matrix (where N is greater than or equal to 8);
pixel processing units each of which executes rendering operations for each of the N pixels in each one of the pixel groups, the pixels rendered by the same pixel processing unit having such a relationship that six proximate pixels to a given pixel are positioned at vertices of a substantially regular hexagon in the rendering area wherein the three pixels in vicinity to each other rendered by the same pixel processing unit form a first triangle when $N=2^{2n+2}$ (where n is a natural number, not less than 1) and form a second triangle when $N=2^{2n+1}$ within the graphic rendering area, the length of the shortest side of the first triangle is greater than $N^{1/2}$, the length of the shortest side of the second triangle is $N^{1/2}$, and the average length of the three sides of the second triangle is smaller than $(N^{1/2}(2+2^{1/2})/3)$; and
memories which are provided in association with the respective pixel processing units and store data of the pixels rendered by the associated pixel processing units.

8. The apparatus according to claim 7, wherein each of the memories further stores data of texels obtained by dividing an image in a matrix, the image being to be added to the graphics,
the texels stored in the same memory have such a relationship that six proximate texels to a given texel are positioned at vertices of a substantially regular hexagon in the image, and
the apparatus further comprises
read-out circuits which are provided in association with the respective pixel processing units and read out, from any one of the memories, the data of the texels to be added to the pixels which are handled by the associated pixel processing unit; and texture units which are provided in association with the respective pixel processing units and add the texels which are read out by the associated read-out circuit, to the pixels.

9. The apparatus according to claim 8, wherein addresses of areas in the memories which store the data of the texels are successively assigned in an order of the memories in units of the texels.

10. The apparatus according to claim 8, wherein addresses of areas in the memories which store the data of the texels are successively assigned in an order of the memories in units of a maximum data width of the texels, and
in cases where a data width of the texels is less than the maximum data width, successive addresses are assigned to the texels in each of the memories, an upper limit of the successive address in each of the memories being given by the maximum data width.

11. The apparatus according to claim 7, wherein addresses of areas in the memories which store the data of the pixels are successively assigned in an order of the memories in units of the pixels.

12. The apparatus according to claim 7, wherein addresses of areas in the memories which store the data of the pixels are successively assigned in an order of the memories in units of a maximum data width of the pixels, and
in cases where a data width of the pixels is less than the maximum data width, successive addresses are assigned to the pixels in each of the memories, an upper limit of the successive address in each of the memories being given by the maximum data width.

13. A rendering apparatus comprising:
a rasterizer which generates pixels corresponding to graphics to be rendered, the pixels being obtained by dividing a graphic rendering area in a matrix, the graphic rendering area including a plurality of pixel groups each including N pixels arranged in a matrix (where N is greater than or equal to 8);
pixel processing units each of which executes rendering operations for each of the N pixels in each one of the pixel groups, the pixels rendered by the same pixel processing unit having such a relationship that three proximate pixels are positioned at vertices of a substantially regular triangle in the rendering area, wherein the three pixels in vicinity to each other rendered by the same pixel processing unit form a first triangle when $N=2^{2n+2}$ (where n is a natural number, not less than 1) and form a second triangle when $N=2^{2n+1}$ within the graphic rendering area, the length of the shortest side of the first triangle is greater than $N^{1/2}$, the length of the shortest side of the second triangle is $N^{1/2}$, and the average length of the three sides of the second triangle is smaller than $(N^{1/2}(2+2^{1/2})/3)$; and
memories which are provided in association with the respective pixel processing units and store data of the pixels rendered by the associated pixel processing units.

14. The apparatus according to claim 13, wherein addresses of areas in the memories which store the data of the pixels, are successively assigned in an order of the memories in units of the pixels.

15. The apparatus according to claim 13, wherein addresses of areas in the memories which store the data of the pixels are successively assigned in an order of the memories in units of a maximum data of the pixels, and
in cases where a data width of the pixels is less than the maximum data width, successive addresses are assigned to the pixels in each of the memories, an upper limit of the successive address in each of the memories being given by the maximum data width.

16. The apparatus according to claim 13, wherein each of the memories further stores data of texels obtained by dividing an image in a matrix, the image being to be added to the graphics,
the texels stored in the same memory have such a relationship that three proximate texels are positioned at vertices of a substantially regular triangle in the image, and
the apparatus further comprises
read-out circuits which are provided in association with the respective pixel processing units and read out, from any one of the memories, the data of the texels to be added to the pixels which are handled by the associated pixel processing unit; and
texture units which are provided in association with the respective pixel processing units and add the texels which are read out by the associated read-out circuit, to the pixels.

17. The apparatus according to claim 16, wherein addresses of areas in the memories which store the data of the texels are successively assigned in an order of the memories in units of the texels.

18. The apparatus according to claim 16, wherein addresses of areas in the memories which store the data of the texels are successively assigned in an order of the memories in units of a maximum data width of the texels, and
in cases where a data width of the texels is less than the maximum data width, successive addresses are assigned to the texels in each of the memories, an upper limit of the successive address in each of the memories being given by the maximum data width.

19. A rendering method using a rendering apparatus which includes a rasterizer which generates pixels, pixel processing units which execute rendering operations for the pixels, and memories which are provided in association with the respective pixel processing units and store data of the pixels rendered by the associated pixel processing units, the method comprising:
generating, by the rasterizer, pixels on the basis of graphic information;
inputting, by the rasterizer, the generated pixels to the pixel processing units in accordance with positions occupied by the generated pixels in a rendering area, the graphic rendering area including a plurality of pixel groups each including N pixels arranged in a matrix (where N is greater than or equal to 8), the pixels rendered by the same pixel processing unit being positioned substantially equidistantly and isotropically within the rendering area;
executing a rendering operation for the input pixels by the pixel processing units, wherein the three pixels in vicinity to each other rendered by the same pixel processing unit form a first triangle when $N=2^{2n+2}$ (where n is a natural number, not less than 1) and form a second triangle when $N=2^{2n+1}$ within the graphic rendering area, the length of the shortest side of the first triangle is greater than $N^{1/2}$, the length of the shortest side of the second triangle is $N^{1/2}$, and the average length of the three sides of the second triangle is smaller than $(N^{1/2}(2+2^{1/2})/3)$; and
storing the rendered pixel data in memories provided in association with the respective pixel processing units.

20. The method according to claim 19, wherein the executing the rendering operation includes
reading data of texels from any one of the memories by read-out circuits; and adding the texels to the pixels which are input to the pixel processing units.

21. A non-transitory computer readable medium comprising instructions that cause a processor to:
generate pixels in accordance with input graphics information;
execute a rendering operation for the pixels; and
store data of the rendered pixels in N memories (where N is greater than or equal to 8), the pixels stored in the same memory being positioned substantially equidistantly and isotropically within a graphic rendering area wherein the three pixels in vicinity to each other stored in the same memory form a first triangle when $N=2^{2n+2}$ (where n is a natural number, not less than 1) and form a second triangle when $N=2^{2n+1}$ within the graphic rendering area, the length of the shortest side of the first triangle is greater than $N^{1/2}$, the length of the shortest side of the second triangle is $N^{1/2}$, and the average length of the three sides of the second triangle is smaller than $(N^{1/2}(2+2^{1/2})/3)$.

22. The computer readable medium according to claim 21 wherein the instructions cause the processor to store data of texels in the memories, the texels being obtained by dividing an image, the texels stored in the same memory being positioned substantially equidistantly and isotropically within the image;
read out the data of the texels from the memories; and
add the texels which are read out from the memories to the pixels.

* * * * *